(12) United States Patent
Yamamoto et al.

(10) Patent No.: US 9,311,727 B2
(45) Date of Patent: Apr. 12, 2016

(54) DEVICE, SYSTEM, METHOD AND COMPUTER-READABLE STORAGE MEDIUM FOR ANALYZING TENNIS SWING MOTION

(71) Applicant: DUNLOP SPORTS CO. LTD., Kobe-shi, Hyogo (JP)

(72) Inventors: Yosuke Yamamoto, Kobe (JP); Hironori Takihara, Kobe (JP); Kuniyasu Horiuchi, Kobe (JP)

(73) Assignee: Dunlop Sports Co. Ltd., Kobe-shi (JP)

( * ) Notice: Subject to any disclaimer, the term of this patent is extended or adjusted under 35 U.S.C. 154(b) by 102 days.

(21) Appl. No.: 13/652,143

(22) Filed: Oct. 15, 2012

(65) Prior Publication Data
US 2013/0127866 A1 May 23, 2013

(30) Foreign Application Priority Data

Oct. 14, 2011 (JP) ................. 2011-226495
Oct. 12, 2012 (JP) ................. 2012-227091
Oct. 12, 2012 (JP) ................. 2012-227271
Oct. 12, 2012 (JP) ................. 2012-227272

(51) Int. Cl.
*G06T 11/20* (2006.01)
*A63B 69/38* (2006.01)
*G01P 15/18* (2013.01)
*A63B 71/06* (2006.01)
(Continued)

(52) U.S. Cl.
CPC .............. *G06T 11/206* (2013.01); *A63B 69/38* (2013.01); *G01P 15/18* (2013.01); *A63B 24/0003* (2013.01); *A63B 71/0619* (2013.01); *A63B 2220/31* (2013.01); *A63B 2220/34* (2013.01); *A63B 2220/36* (2013.01); *A63B 2220/44* (2013.01); *G09B 19/0038* (2013.01)

(58) Field of Classification Search
None
See application file for complete search history.

(56) References Cited

U.S. PATENT DOCUMENTS 4,967,596 A * 11/1990 Rilling et al. ................... 73/492
7,602,301 B1 10/2009 Stirling et al.
(Continued)

FOREIGN PATENT DOCUMENTS

JP 2002-126147 A 5/2002
JP 2006-263340 A 10/2006
JP 2009-125499 A 6/2009

OTHER PUBLICATIONS

Damien Connaghan et al., Recognition of Tennis Strokes using Key Postures, Jun. 23-24, 2010, Signals and Systems Conference (ISSC 2010).*

(Continued)

*Primary Examiner* — Barry Drennan
*Assistant Examiner* — Diana Hickey
(74) *Attorney, Agent, or Firm* — Birch, Stewart, Kolasch & Birch, LLP

(57) ABSTRACT

A tennis swing movement analyzing apparatus of the present invention includes an acquisition unit configured to acquire sampling data obtained by sampling a swing movement of a tennis racket by a user; a calculation unit configured to, based on the sampling data, calculate an indicator selected from among the velocity, the acceleration, the angular velocity, and the position of the tennis racket or a ball hit by the tennis racket and an arbitrary combination thereof; and a screen creation unit configured to create a GUI screen displaying a graph area that is divided into a plurality of areas respectively indicating types of swings and displaying the indicator in the graph area.

16 Claims, 36 Drawing Sheets

(51) Int. Cl.
  *A63B 24/00* (2006.01)
  *G09B 19/00* (2006.01)

(56) References Cited

U.S. PATENT DOCUMENTS

| | | |
|---|---|---|
| 2003/0024311 A1 | 2/2003 | Perkins |
| 2004/0259651 A1 | 12/2004 | Storek |
| 2005/0054457 A1 | 3/2005 | Eyestone et al. |
| 2005/0261073 A1 | 11/2005 | Farrington, Jr. et al. |
| 2006/0166737 A1* | 7/2006 | Bentley .......................... 463/30 |
| 2010/0103095 A1* | 4/2010 | Yamamoto et al. ........... 345/156 |

OTHER PUBLICATIONS

Yuri Iijima et al, Measurement and analysis of tennis swing motion using 3D gyro sensor, Aug. 18-21, 2010, SICE Annual Conference 2010 pp. 274-277.*

* cited by examiner

Fig.25

| Recommended racket | Racket name | Highest grip velocity | Highest grip acceleration | Highest head velocity | Highest head acceleration Ah | Highest head velocity component ratio | Highest racket angular velocity | Swing type |
|---|---|---|---|---|---|---|---|---|
| ○ | A | ** | ** | ** | ** | ** | ** | Drive |
| × | B | ** | ** | ** | ** | ** | ** | Topspin |
| × | C | ** | ** | ** | ** | ** | ** | Drive |
| ○ | D | ** | ** | ** | ** | ** | ** | Flat |
| × | E | ** | ** | ** | ** | ** | ** | Slice |

| Recommended racket | Racket name | Highest grip velocity | Highest grip acceleration | Highest head velocity | Highest head acceleration Ah | Head velocity component ratio | Rracket angular velocity | Swing type |
|---|---|---|---|---|---|---|---|---|
| ○ | A | ** | ** | ** | ** | ** | ** | Drive |
| × | B | ** | ** | ** | ** | ** | ** | Topspin |
| × | C | ** | ** | ** | ** | ** | ** | Drive |
| ○ | D | ** | ** | ** | ** | ** | ** | Flat |
| × | E | ** | ** | ** | ** | ** | ** | Slice |

T1

DEVICE, SYSTEM, METHOD AND COMPUTER-READABLE STORAGE MEDIUM FOR ANALYZING TENNIS SWING MOTION

CROSS REFERENCE TO RELATED APPLICATIONS

This application claims priorities to Japanese Patent Applications No. 2011-226495 filed on Oct. 14, 2011, No. 2012-227091 filed on Oct. 12, 2012, No. 2012-227271 filed on Oct. 12, 2012 and No. 2012-227272 filed on Oct. 12, 2012, which are hereby incorporated by reference in their entirety.

TECHNICAL FIELD

The present invention relates to an analyzing apparatus for analyzing a user's tennis racket swing movement, and to an analyzing system, an analyzing method, and a recording medium with an analyzing program for the same.

BACKGROUND ART

Conventionally, there is known to be technology for analyzing the velocity and the like of a tennis racket based on sampling data obtained by sampling a user's tennis racket swing movement in order to be of use in improving the user's tennis racket swing movement or selecting a tennis racket suited to the user (see Patent Documents 1 and 2). Specifically, Patent Document 1 discloses an apparatus for measuring the velocity of a racket swung by a user, and displaying the measured value to the user on a display unit along with candidate rackets that are suited to the user, which are selected according to the measured value. Also, Patent Document 2 discloses an apparatus for detecting not only the swing velocity, but also the racket trajectory, the racket face orientation, and the like, and displaying the detected values to the user on a display unit along with information that indicates whether the swing movement is good or poor, what should be done to improve the swing movement, and the like, which are determined according to the detected values.

CITATION LIST

Patent Literature

Patent Literature 1: JP 2006-263340A
Patent Literature 2: JP 2009-125499A
Patent Literature 3: JP 2002-126147A

SUMMARY OF INVENTION

Patent Documents 1 and 2 do not particularly mention a specific method for displaying the values of the racket velocity and the like, and the various types of information derived from these values. However, such information is worthwhile for the user to be aware of in consideration of improving the tennis racket swing movement or selecting a tennis racket that is suited to the user. Accordingly, it is important to provide a GUI (Graphical User Interface) that allows the user to intuitively understand such information.

A first object of the present invention is to provide an analyzing apparatus for presenting a GUI that displays indicators related to a user's tennis racket swing movement in a form that is intuitively understandable to the user, and an analyzing system, an analyzing method, and a recording medium with an analyzing program for the same.

A tennis swing movement analyzing apparatus according to aspect A1 of the present invention includes: an acquisition unit configured to acquire sampling data obtained by sampling a swing movement of a tennis racket by a user; a calculation unit configured to, based on the sampling data, calculate an indicator selected from among the velocity, the acceleration, the angular velocity, and the position of the tennis racket or a ball hit by the tennis racket and an arbitrary combination thereof; and a screen creation unit configured to create a GUI screen displaying a graph area that is divided into a plurality of areas respectively indicating types of swings and displaying the indicator in the graph area.

An analyzing apparatus according to aspect A2 of the present invention is the analyzing apparatus according to aspect A1, wherein the GUI screen displays an auxiliary line for indicating a boundary between the plurality of areas in the graph area.

An analyzing apparatus according to aspect A3 of the present invention is the analyzing apparatus according to aspect A1, wherein the GUI screen displays the plurality of areas included in the graph area in different display formats.

An analyzing apparatus according to aspect A4 of the present invention is the analyzing apparatus according to aspect A1, wherein the graph area is an area in which a first direction component of the indicator corresponds to a first axis, and a second direction component of the indicator, the second direction being orthogonal to the first direction, corresponds to a second axis that is orthogonal to the first axis.

An analyzing apparatus according to aspect A5 of the present invention is the analyzing apparatus according to aspect A4, wherein the indicator is the velocity of the tennis racket.

An analyzing apparatus according to aspect A6 of the present invention is the analyzing apparatus according to aspect A1, wherein the calculation unit is configured to calculate a plurality of types of the indicators including a first indicator and a second indicator, and the graph area is an area in which the first indicator corresponds to a first axis, and the second indicator corresponds to a second axis that is orthogonal to the first axis.

An analyzing apparatus according to aspect A7 of the present invention is the analyzing apparatus according to aspect A1, wherein the calculation unit is configured to calculate the indicator for each unit of the swing movement, and the GUI screen displays a plurality of the indicators in the graph area at the same time, the plurality of the indicators respectively corresponding to a plurality of units of the swing movement.

An analyzing apparatus according to aspect A8 of the present invention is the analyzing apparatus according to aspect A7, wherein the acquisition unit is configured to acquire the sampling data obtained by sampling the swing movement of different tennis rackets by the user. The calculation unit is configured to calculate the indicator based on the sampling data for each unit of the swing movement belonging to the different tennis rackets.

A tennis swing movement analyzing system according to aspect A9 of the present invention includes: the analyzing apparatus according to aspect A1; and a sampling apparatus configured to generate the sampling data by sampling the swing movement, and transmit the sampling data to the acquisition unit.

A tennis swing movement analyzing apparatus according to aspect A10 of the present invention includes: an acquisition unit configured to acquire sampling data obtained by sampling a swing movement of a tennis racket by a user; a calculation unit configured to calculate an indicator for each unit of the swing movement based on the sampling data, the indicator being selected from among the velocity, the acceleration, the angular velocity, and the position of the tennis racket or a ball hit by the tennis racket and an arbitrary combination thereof; and a screen creation unit configured to create a GUI screen displaying a graph area and a plurality of the indicators in the graph area at the same time, the indicators in the graph area respectively corresponding to a plurality of units of the swing movement.

A tennis swing movement analyzing system according to aspect A11 of the present invention includes: the analyzing apparatus according to aspect A10; and a sampling apparatus configured to generate the sampling data by sampling the swing movement, and transmit the sampling data to the acquisition unit.

A non-transitory computer-readable recording medium according to aspect A12 of the present invention stores a tennis swing movement analyzing program for causing a computer to execute the steps of: acquiring sampling data obtained by sampling a swing movement of a tennis racket by a user; calculating, based on the sampling data, an indicator selected from among the velocity, the acceleration, the angular velocity, and the position of the tennis racket or a ball hit by the tennis racket and an arbitrary combination thereof; and creating a GUI screen displaying a graph area that is divided into a plurality of areas respectively indicating types of swings and displaying the indicator in the graph area.

A non-transitory computer-readable recording medium according to aspect A13 of the present invention stores a tennis swing movement analyzing program for causing a computer to execute the steps of: acquiring sampling data obtained by sampling a swing movement of a tennis racket by a user; calculating an indicator for each unit of the swing movement based on the sampling data, the indicator being selected from among the velocity, the acceleration, the angular velocity, and the position of the tennis racket or a ball hit by the tennis racket and an arbitrary combination thereof; and creating a GUI screen displaying a graph area and a plurality of the indicators in the graph area at the same time, the indicators in the graph area respectively corresponding to a plurality of units of the swing movement.

A tennis swing movement analyzing method according to aspect A14 of the present invention includes the steps of: acquiring sampling data obtained by sampling a swing movement of a tennis racket by a user; calculating, based on the sampling data, an indicator selected from among the velocity, the acceleration, the angular velocity, and the position of the tennis racket or a ball hit by the tennis racket and an arbitrary combination thereof; and creating a GUI screen displaying a graph area that is divided into a plurality of areas respectively indicating types of swings and displaying the indicator in the graph area.

A tennis swing movement analyzing method according to aspect A15 of the present invention includes the steps of: acquiring sampling data obtained by sampling a swing movement of a tennis racket by a user; calculating an indicator for each unit of the swing movement based on the sampling data, the indicator being selected from among the velocity, the acceleration, the angular velocity, and the position of the tennis racket or a ball hit by the tennis racket and an arbitrary combination thereof; and creating a GUI screen displaying a graph area and a plurality of the indicators in the graph area at the same time, the indicators in the graph area respectively corresponding to a plurality of units of the swing movement.

According to aspects A1 to A15 of the present invention, it is possible to present a GUI that displays indicators related to a user's tennis racket swing movement in a form that is intuitively understandable to the user.

Incidentally, Patent Document 1 discloses an apparatus for measuring the velocity of a racket swung by a user, selecting candidate rackets suited to the user from the viewpoint of racket weight and the like according to the swing velocity, and presenting the candidate rackets to the user. Also, Patent Document 2 discloses an apparatus for presenting a user with information that indicates whether the user's swing movement is good or poor, what should be done to improve the swing movement, and the like by comparing measured values of not only the swing velocity, but also the racket trajectory, the racket face orientation, and the like with ideal data.

However, although candidate rackets are presented by the apparatus in Patent Document 1, it is envisioned that the user will then swing the candidate rackets, and select a racket suited to himself from among the presented candidates according to how he feels and a coach's advice. In other words, the user must in the end largely rely on intuitive determination criteria such as his own feelings, and it remains that the selection of a racket suited to himself is difficult due to insufficient information for a determination. Moreover, in Patent Document 1, it is envisioned that the user will use his own racket or the like as the racket used to measure the swing velocity and the like, that is to say, it is envisioned that the user will swing a single racket when measuring the swing velocity and the like. Accordingly, the apparatus of Patent Document 1 is not suited to the case where the user checks his compatibility with various rackets as he actually swings them, and finds a racket suited to himself among the various rackets.

Also, the apparatus of Patent Document 2 is an apparatus that is used in the case of coaching in order to improve a user's swing movement, not the case of the selection of a racket suited to the user, and measured values such as the swing velocity are merely compared with ideal data, as described above. In other words, there is no evaluation of variation between measured values, and there is no evaluation of the stability of the user's swing movement.

Another object of the present invention is to provide an analyzing apparatus for presenting determination material sufficient for selecting a tennis racket that is suited to a user from among various tennis rackets, and an analyzing system, an analyzing method, and a recording medium with an analyzing program for the same, or to provide an analyzing apparatus that is suited to evaluating the stability of a user's tennis racket swing movement, and an analyzing system, an analyzing method, and a recording medium with an analyzing program for the same.

A tennis swing movement analyzing apparatus according to aspect B1 of the present invention includes an acquisition unit, a calculation unit, a creation unit, and an output unit. The acquisition unit is configured to acquire sampling data obtained by sampling a swing movement of a tennis racket by a user. The calculation unit is configured to calculate an indicator for each unit of the swing movement based on the sampling data. This indicator is selected from among the position, the velocity, the acceleration, and the angular velocity of the tennis racket or a ball hit by the tennis racket and an arbitrary combination thereof. The creation unit is configured to create comparison data that is at least one of data for comparing a plurality of the indicators respectively corresponding to a plurality of units of the swing movement and data regarding a result of the comparison. The output unit is configured to output the comparison data.

A tennis swing movement analyzing apparatus according to aspect B2 of the present invention is the analyzing apparatus according to aspect B1, wherein the acquisition unit is configured to acquire the sampling data obtained by sampling the swing movement of different tennis rackets by a user. The calculation unit is configured to calculate the indicator based on the sampling data for each unit of the swing movement belonging to the different tennis rackets.

A tennis swing movement analyzing apparatus according to aspect B3 of the present invention is the analyzing apparatus according to aspect B2, wherein the creation unit is configured to create, as the comparison data that is data for comparing the plurality of indicators, data for displaying the plurality of indicators at the same time in the form in which the indicators are associated with respectively corresponding ones of the tennis rackets.

A tennis swing movement analyzing apparatus according to aspect B4 of the present invention is the analyzing apparatus according to aspect B2, wherein the creation unit is configured to create, as the comparison data that is data for comparing the plurality of indicators, data for displaying the plurality of indicators at the same time in graph form and in the form in which the indicators are associated with respectively corresponding ones of the tennis rackets.

A tennis swing movement analyzing apparatus according to aspect B5 of the present invention is the analyzing apparatus according to aspect B2, wherein the creation unit is configured to compare the plurality of indicators, select one or a plurality of specific tennis rackets that are suited to the user from among the different tennis rackets, and create data for indicating that the specific tennis racket is suited to the user as the comparison data that is data regarding a result of the comparison of the plurality of indicators.

A tennis swing movement analyzing apparatus according to aspect B6 of the present invention is the analyzing apparatus according to aspect B1, wherein the creation unit is configured to create data for displaying the plurality of indicators at the same time as the comparison data that is data for comparing the plurality of indicators.

A tennis swing movement analyzing apparatus according to aspect B7 of the present invention is the analyzing apparatus according to aspect B1, wherein the creation unit is configured to create data for displaying the plurality of indicators at the same time in graph form as the comparison data that is data for comparing the plurality of indicators.

A tennis swing movement analyzing apparatus according to aspect B8 of the present invention is the analyzing apparatus according to aspect B1, wherein the creation unit is configured to compare the plurality of indicators, determine variation between the plurality of indicators, and create, as the comparison data that is data regarding a result of the comparison of the plurality of indicators, at least one of data for indicating the variation and data for indicating whether a tennis racket is suited to the user in accordance with the variation.

A tennis swing movement analyzing apparatus according to aspect B9 of the present invention is the analyzing apparatus according to aspect B1, wherein the acquisition unit is configured to acquire, as the sampling data, a time series image group obtained by shooting a swing movement situation. The calculation unit is configured to calculate the indicator for each unit of the swing movement by performing image processing on the image group along a time axis.

A tennis swing movement analyzing apparatus according to aspect B10 of the present invention is the analyzing apparatus according to aspect B1, wherein the indicator is selected from among grip velocity, grip acceleration, head velocity, head acceleration, head velocity component ratio, swing trajectory, and racket angular velocity.

A tennis swing movement analyzing system according to aspect B11 of the present invention includes the analyzing apparatus according to aspect B1 and a sampling apparatus. The sampling apparatus is configured to generate the sampling data by sampling the swing movement, and transmit the sampling data to the acquisition unit.

A non-transitory computer-readable recording medium according to aspect B12 of the present invention stores a tennis swing movement analyzing program for causing a computer to execute the steps of: acquiring sampling data obtained by sampling a swing movement of a tennis racket by a user; calculating an indicator for each unit of the swing movement based on the sampling data; creating comparison data that is at least one of data for comparing a plurality of the indicators respectively corresponding to a plurality of units of the swing movement and data regarding a result of the comparison; and outputting the comparison data. The indicator is selected from among the position, the velocity, the acceleration, and the angular velocity of the tennis racket or a ball hit by the tennis racket and an arbitrary combination thereof.

A tennis swing movement analyzing method according to aspect B13 of the present invention includes the steps of: acquiring sampling data obtained by sampling a swing movement of a tennis racket by a user; calculating an indicator for each unit of the swing movement based on the sampling data; creating comparison data that is at least one of data for comparing a plurality of the indicators respectively corresponding to a plurality of units of the swing movement and data regarding a result of the comparison; and outputting the comparison data. The indicator is selected from among the position, the velocity, the acceleration, and the angular velocity of the tennis racket or a ball hit by the tennis racket and an arbitrary combination thereof.

According to aspects B1 to B13 of the present invention, it is possible to present determination material sufficient for selecting a tennis racket that is suited to a user from among various tennis rackets. Alternatively, it is possible to evaluate the stability of a user's tennis racket swing movement.

Incidentally, a tennis swing differs from player to player. A swing is influenced by the specifications of the tennis racket. For example, attempting to hit a ball at high speed with a racket that has a low coefficient of restitution will cause the player to strain. On the other hand, attempting to control the velocity when hitting a ball with a racket whose coefficient of restitution is too high will cause looseness in the player's hand. It is important to have a match between the player and the racket. Accurate fitting is made possible by appropriate swing analysis. Appropriate swing analysis can contribute to an improvement in the player's skill.

Swing analysis can also contribute to the research and development of tennis rackets. Furthermore, swing analysis can also contribute to the promotion of racket sales.

Patent Document 3 discloses an apparatus for analyzing racket behavior based on images obtained by filming a swing with three high-speed cameras. However, the measuring apparatus recited in Patent Document 3 is large and complicated. Such a measuring apparatus is not suited to fitting at a tennis club or the like.

Patent Document 1 discloses a swing speed measuring method. With this method, a magnet is attached to the tip of a racket. The swing speed can be calculated by detecting the passage of this magnet with a sensor. However, with the method recited in Patent Document 1, it is only possible to measure the swing speed of a practice swing without hitting a ball. The velocity of a swing for hitting a tennis ball cannot be measured with this method.

Patent Document 2 discloses a method for analyzing a swing using a triaxial acceleration sensor and a triaxial gyroscope. However, it is not clear how the sensors are used in the method recited in Patent Document 2.

Another object of the present invention is to provide an apparatus that can precisely analyze a swing with a simple configuration, and a method for analyzing a swing using this apparatus.

A tennis swing analyzing apparatus according to aspect C1 of the present invention is an analyzing apparatus configured to analyze a tennis swing in a groundstroke, a volley, or a serve, including:

a triaxial acceleration sensor attached to a tennis racket including a grip and a head, and configured to measure acceleration in each direction of three axes when a swing for hitting a tennis ball is performed with the tennis racket;

a triaxial gyroscope attached to the tennis racket and configured to measure angular velocity about each of three axes when the swing for hitting a tennis ball is performed; and an analyzing device.

The analyzing device has:

a reception function for receiving data related to the acceleration and the angular velocity from the triaxial acceleration sensor and the triaxial gyroscope;

a coordinate axis conversion function for converting a relative coordinate axis of the acceleration into an absolute coordinate axis based on the angular velocity; and a calculation function for calculating a swing indicator based on acceleration resulting from the coordinate axis conversion.

It is preferable that the indicator is any of grip acceleration, grip velocity, head velocity, head acceleration, head velocity component ratio, and swing trajectory. It is particularly preferable that the indicator is any of grip acceleration, grip velocity, head velocity, head acceleration, and head velocity component ratio immediately before impact between the tennis racket and the tennis ball.

It is preferable that the triaxial acceleration sensor and the triaxial gyroscope are attached to an end of the grip, and the analyzing device further has a calculation function for calculating the head velocity, the head acceleration, the head velocity component ratio, or the swing trajectory based on the grip velocity.

A tennis swing analyzing method according to aspect C2 of the present invention is an analyzing method for analyzing a tennis swing in a groundstroke, a volley, or a serve, including the steps of:

when a swing for hitting a tennis ball is performed with a tennis racket that includes a grip and a head and has a triaxial acceleration sensor and a triaxial gyroscope attached thereto, measuring acceleration in each direction of three axes with the triaxial acceleration sensor and measuring angular velocity about each of three axes with the triaxial gyroscope;

converting a relative coordinate axis of the acceleration into an absolute coordinate axis based on the angular velocity; and calculating a swing indicator with an analyzing device based on acceleration resulting from the coordinate axis conversion.

It is preferable that the indicator is any of grip acceleration, grip velocity, head velocity, head acceleration, head velocity component ratio, and swing trajectory. It is particularly preferable that the indicator is any of grip acceleration, grip velocity, head velocity, head acceleration, and head velocity component ratio immediately before impact between the tennis racket and the tennis ball.

It is preferable that this analyzing method further includes a step of calculating the head velocity, the head acceleration, the head velocity component ratio, or the swing trajectory based on the grip velocity.

A fitting method according to aspect C3 of the present invention uses the above-described analyzing method. This fitting method includes a step of determining whether the tennis racket is suitable based on the indicator.

It is preferable that the fitting method according to aspect C3 of the present invention includes a step of displaying a graph with a display unit, one head velocity component being a vertical axis of the graph, and another head velocity component being a horizontal axis of the graph.

It is preferable that the fitting method according to aspect C3 of the present invention includes a step of classifying a swing type based on the head velocity component ratio.

It is preferable that a direction of the one velocity component and a direction of the other velocity component form a 90° angle, a plurality of concentric arcs centered about an origin of the vertical axis and the horizontal axis are described in the graph, and the radii of the arcs indicate head velocity calculated based on the one head velocity component and the other head velocity component.

It is preferable that in the step of displaying the graph, a point indicating a head velocity component value is displayed in the graph for each swing performed with a plurality of tennis rackets by the same player.

It is preferable that in the step of displaying the graph, a point indicating a head velocity component value is displayed in the graph for each of a plurality of swings performed with one tennis racket by the same player.

It is preferable to further include the step of determining whether the tennis racket is suitable based on at least one of a comparison of variation in head velocity component values during swings indicated in the graph and a comparison of the head velocities during swings indicated in the graph.

A tennis player coaching method according to aspect C4 of the present invention uses the above-described analyzing method. This coaching method includes a step of determining whether a swing performed by the tennis player is good based on the indicator.

It is preferable that the tennis player coaching method according to aspect C4 of the present invention includes a step of displaying a graph with a display unit, one head velocity component being a vertical axis of the graph, and another head velocity component being a horizontal axis of the graph.

It is preferable that the tennis player coaching method according to aspect C4 of the present invention includes a step of determining a tendency of a type of swing performed by the tennis player based on the head velocity component ratio.

It is preferable that a direction of the one velocity component and a direction of the other velocity component form a 90° angle, a plurality of concentric arcs centered about an origin of the vertical axis and the horizontal axis are described in the graph, and the radii of the arcs indicate head velocity calculated based on the one head velocity component and the other head velocity component.

It is preferable that in the step of displaying the graph, a point indicating a head velocity component value during a swing made by the tennis player and a point indicating a head velocity component value of a desired swing are displayed in the graph.

It is preferable that in the step of displaying the graph, points indicating head velocity component values during swings performed by the tennis player at a plurality of different time instants are displayed in the graph.

A non-transitory computer-readable recording medium according to aspect C5 of the present invention stores a tennis swing analyzing program that can cause a computer to execute the steps of:

receiving, when a swing for hitting a tennis ball is performed with a tennis racket that includes a grip and a head, data regarding acceleration of the tennis racket in each direction of three axes in a relative coordinate system to the tennis racket, and data regarding angular velocity of the tennis racket about each of three axes in the relative coordinate system;

converting a relative coordinate axis of the acceleration into an absolute coordinate axis based on the angular velocity; and calculating a swing indicator based on acceleration resulting from the coordinate axis conversion.

It is preferable that the indicator is any of grip acceleration, grip velocity, head velocity, head acceleration, head velocity component ratio, and swing trajectory. It is particularly preferable that the indicator is any of grip acceleration, grip velocity, head velocity, head acceleration, and head velocity component ratio immediately before impact between the tennis racket and the tennis ball.

According to aspects C1 to C5 of the present invention, it is possible to perform tennis swing analysis simply and precisely.

BRIEF DESCRIPTION OF DRAWINGS

FIG. 25 is a diagram showing a table list of various evaluation indicators;

FIG. 36 is a diagram showing a table list of various indicators displayed in an analysis result screen.

Figure 1:
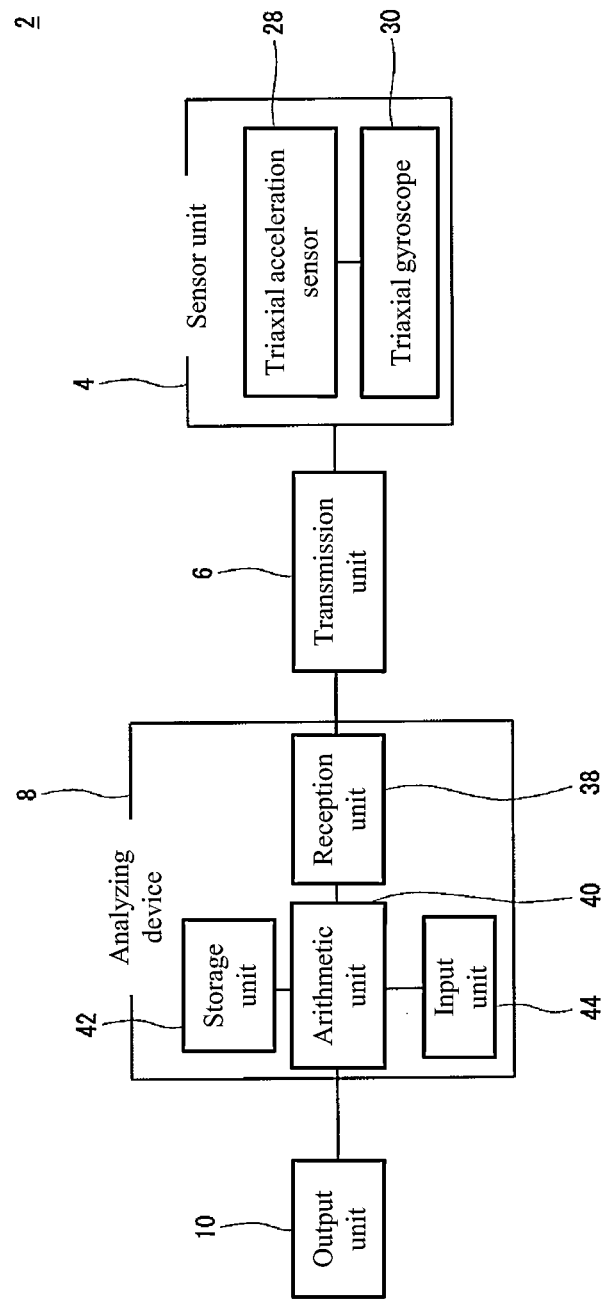
FIG. 1 is a conceptual diagram showing a tennis swing analyzing apparatus according to a first embodiment of the present invention.

REFERENCE SIGNS LIST 201 measuring device (sampling apparatus)
202 analyzing apparatus
250 player (user)
210 tennis racket
225 communication unit (acquisition unit)
2231 analyzing program
224a calculation unit
224b screen creation unit (creation unit)
200 analyzing system
G1-G4 graph area
401 analyzing system
402 analyzing apparatus
403 imaging system (sampling apparatus)
407 player (user)
410 tennis racket
421a calculation unit
421b creation unit
422a analyzing program
424 display unit (output unit)
425 communication unit (acquisition unit)

DESCRIPTION OF EMBODIMENTS

Hereinafter, the present invention will be described in detail by way of various preferred embodiments with reference to the drawings as appropriate.

1. First Embodiment

Figure 2:
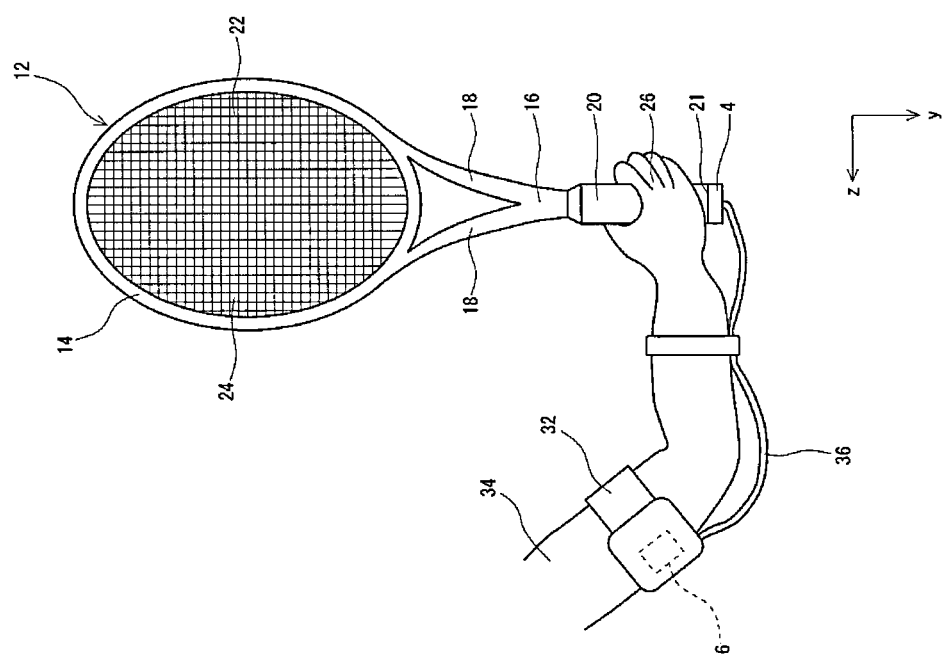
FIG. 2 is a front view of a sensor unit and a transmission unit of the analyzing apparatus in FIG. 1 along with a tennis racket.

A tennis swing analyzing apparatus 2 according to a first embodiment shown in FIGS. 1 and 2 includes a sensor unit 4, a transmission unit 6, an analyzing device 8, and an output unit 10. In FIG. 2, a portion of the analyzing apparatus 2 is shown along with a tennis racket 12. The tennis racket 12 includes a head 14, a shaft 16, a pair of left and right throats 18 that extend from the head 14 to the shaft 16, and a grip 20 that is continuous with the shaft 16. The racket 12 further includes a string 22 that is vertically and horizontally stretched across the head 14. A face 24 is formed by this string 22.

In FIG. 2, the grip 20 is gripped by a player's right hand 26. As shown in FIG. 2, the lengthwise direction of the shaft 16 conforms to the y axis direction. The y axis direction is also parallel with the face 24. The direction from the head 14 to the grip 20 is the positive y axis direction. The z axis direction is also parallel with the face 24. The z axis is orthogonal to the y axis. If the face 24 shown in FIG. 2 is considered to be the face of a clock, the direction from the three o'clock position to the nine o'clock position would be the positive z axis direction. Although not shown in FIG. 2, the x axis direction is perpendicular to the face 24. The x axis is orthogonal to the y axis, and is orthogonal to the z axis as well. The direction from the back side of the head 14 to the front side in the thickness direction is the positive x axis direction. The front side is the side that comes into contact with a tennis ball during a forehand stroke. The x axis, the y axis, and the z axis are axes based on the racket 12. Also, (x,y,z) coordinates defined by these axes are coordinates based on the racket 12. The x, y, and z axis directions vary according to the orientation of the racket 12. The x axis, the y axis, and the z axis are relative coordinate axes. The (x,y,z) coordinates defined by these axes are relative coordinates.

As is clear from FIG. 2, the sensor unit 4 is attached to an end 21 of the grip 20. At this position, the sensor unit 4 does not hinder the player's swing. As shown in FIG. 1, the sensor unit 4 includes a triaxial acceleration sensor 28 and a triaxial gyroscope 30.

The triaxial acceleration sensor 28 can measure acceleration in the x axis direction, the y axis direction, and the z axis direction in relative coordinates. The triaxial gyroscope 30 can measure angular velocity about the x axis, about the y axis, and about the z axis in relative coordinates. However, in order to analyze a swing of the racket for sending the ball to the opponent's side, the movement velocity and the like of the racket need to be based on the ground and the space where the tennis court and the like are fixed. In other words, the movement velocity and the like of the racket should be based on absolute coordinates that are based on the fixed ground and the space, not on the above-described relative coordinates to the moving racket itself. The conversion of acceleration in relative coordinate axes into acceleration in absolute coordinate axes will be described later. The racket swing referred to here includes swings in not only a groundstroke, but also in a volley and a serve, as will be described later.

As shown in FIG. 2, the transmission unit 6 is fixed to an upper arm 34 by a band 32. At this position, the transmission unit 6 does not hinder the player's swing. The sensor unit 4 and the transmission unit 6 are connected by a cable 36. The transmission unit 6 receives data measured by the triaxial acceleration sensor 28 and the triaxial gyroscope 30 from the sensor unit 4 via the cable 36. The transmission unit 6 wirelessly transmits this data to the analyzing device 8. Note that a battery (not shown) for driving the sensor unit 4 and the transmission unit 6 is also fixed to the upper arm 34 by the band 32. The method for transmitting data measured by the sensor unit 4 to the analyzing device 8 is not limited to wireless transmission, and various types of means can be employed. For example, the data may be transmitted via a wire. In this case, a data transmission cable may be connected from the transmission unit 6 to the analyzing device 8 over the player's back or the like, for example. Alternatively, the data may be transmitted using a USB (Universal Serial Bus) memory. In this case, the data may be transferred when a USB memory mounted to the sensor unit 4 during a swing is attached to a USB drive of the analyzing device 8 after measurement ended, for example. Another memory card, memory card adapter, or the like may be used in place of this USB memory. Various known data transfer means other than those described above can also be employed.

The analyzing device 8 includes a reception unit 38, an arithmetic unit 40, a storage unit 42, and an input unit 44. The reception unit 38 receives data that was wirelessly transmitted from the transmission unit 6. The reception unit transmits this data to the arithmetic unit 40. The arithmetic unit 40 is typically a computer CPU. The arithmetic unit 40 stores the received data in the storage unit 42. The arithmetic unit 40 furthermore performs various types of arithmetic operations based on this data and also stores the results of the arithmetic operations in the storage unit 42. These operations are executed based on commands in a control program (tennis swing analyzing program) incorporated in the analyzing device 8 serving as a computer. The storage unit 42 may be a RAM or may be a hard disk. Alternatively, the storage unit 42 may be an external recording medium.

The output unit 10 is typically a monitor. The arithmetic unit 40 causes measurement results and arithmetic operation results to be displayed on the output unit 10. The output unit 10 may be a printer, a plotter, or the like. A configuration is possible in which an operator selects results from among measurement results and arithmetic operation results using the input unit 44, and only the selected results are output to the output unit 10. Examples of the input unit 44 include a keyboard, a mouse, and a touch panel.

Figure 3:
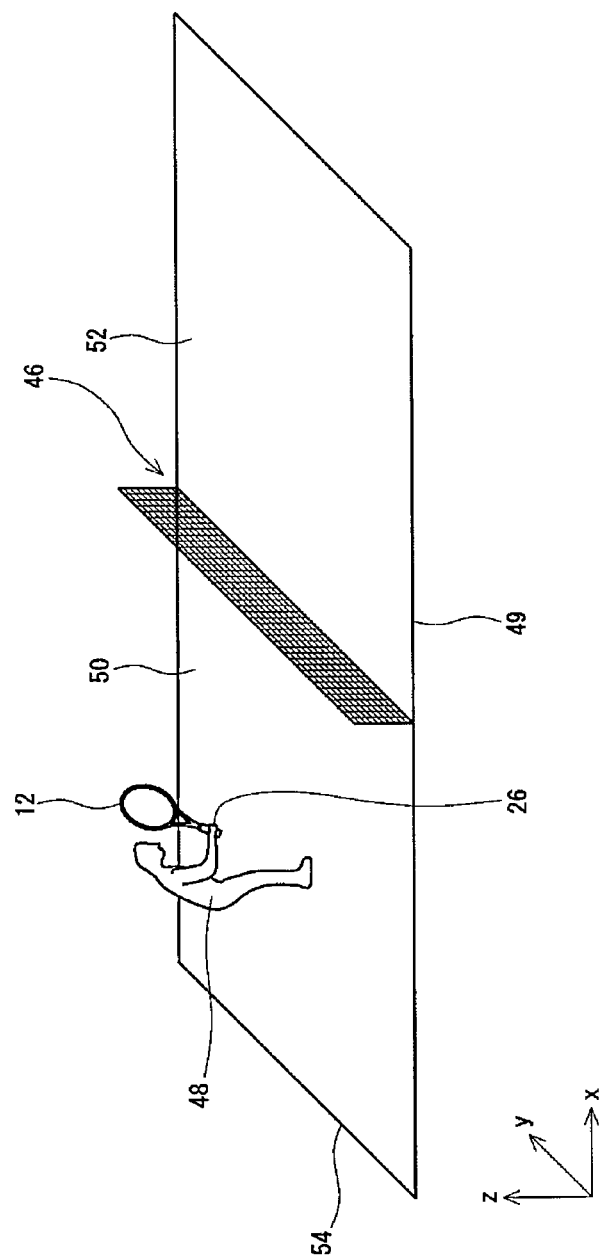
FIG. 3 is a perspective view of a tennis court on which a swing analyzing method using the apparatus in FIG. 1 is implemented.

FIG. 3 is a perspective view of a tennis court 46 on which the swing analyzing method using the apparatus 2 in FIG. 1 is implemented. A player 48 who performs a swing is shown in FIG. 3. This player 48 is right-handed. The player 48 is gripping the racket 12 with the right hand 26. The player 48 makes a forehand groundstroke with the right hand 26.

As shown in FIG. 3, the direction of a sideline 49 of the tennis court 46 conforms to the x axis direction. The direction from the player 48's own side 50 to an opponent's side 52 is the positive x axis direction. The direction of end lines 54 of the tennis court 46 conforms to the y axis direction. The direction from right to left from the viewpoint of the player 48 when facing the opponent's side 52 is the positive y axis direction. The z axis direction is the vertical direction. The upward direction is the positive z axis direction. These x, y, and z axes are axes based on the tennis court 46. In other words, these x, y, and z axes are axes based on the ground. These x, y, and z axes are absolute coordinate axes. Also, (x,y,z) coordinates defined by these axes are absolute coordinates.

Figure 4:
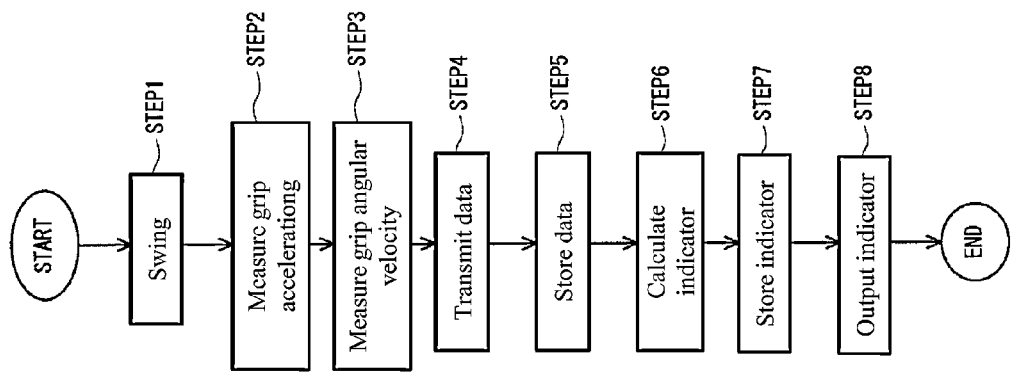
FIG. 4 is a flowchart showing an example of the swing analyzing method using the apparatus in FIG. 1.

FIG. 4 is a flowchart showing an example of a swing analyzing method that uses the apparatus in FIG. 1. In this method, the player 48 swings the racket 12 (STEP1). This swing is not a so-called practice swing. The player 48 hits a tennis ball with this swing. The tennis ball that is to be hit is supplied to the player 48's own side 50. It is preferable that the tennis ball is supplied at a certain velocity in a certain direction by a ball supplying apparatus. The player 48 endeavors to hit the tennis ball back to the opponent's side 52. If the hit tennis ball does not fall on the opponent's side 52, that swing is not subjected to subsequent analysis. Even if the hit tennis ball falls on the opponent's side 52, that swing is not subjected to subsequent analysis if it was clearly a mishit.

During the swing, the triaxial acceleration sensor 28 measures grip accelerations A(gx), A(gy), and A(gz) in the relative x axis direction, the relative y axis direction, and the relative z axis direction at a certain time interval (STEP2). At the same time, the triaxial gyroscope 30 measures grip angular velocities ω(gx), ω(gy), and ω(gz) about the relative x axis, about the relative y axis, and about the relative z axis at a certain time interval (STEP3). Data indicating the grip accelerations A(gx), A(gy), and A(gz) and the grip angular velocities ω(gx), ω(gy), and ω(gz) is transmitted from the transmission unit 6 to the reception unit 38 of the analyzing device 8 from moment to moment (STEP4). The arithmetic unit 40 stores this data in the storage unit 42 (STEP5).

In accordance with a command in the control program, the arithmetic unit 40 calculates swing indicators using part or all of the data indicating the grip accelerations A(gx), A(gy), and A(gz) and the grip angular velocities ω(gx), ω(gy), and ω(gz) (STEP6). Examples of the indicators include, the grip acceleration, the grip velocity, the head velocity, the head acceleration, the head velocity component ratio, the swing trajectory, and the racket angular velocity. The arithmetic unit 40 stores data indicating the obtained indicators in the storage unit 42 (STEP7). The arithmetic unit 40 furthermore outputs predetermined indicators to the output unit 10 based on a designation from the input unit 44 (STEP8). These output results are used in a determination whether the racket 12 is suited to the player 48.

As described above, data indicating the grip accelerations A(gx), A(gy), and A(gz) and the grip angular velocities ω(gx), ω(gy), and ω(gz) is obtained at a certain time interval. For example, this data is obtained every 1/500 sec. Time instants suited to a determination of whether there is a match between the player 48 and the racket 12 are selected from among the time instants at which the data was obtained. One example of a time instant suited to match determination is the time instant when the head velocity is the highest. The head velocity gradually rises from when the swing starts. The head 14 then rapidly decelerates upon impact with the tennis ball. The time instant immediately before this deceleration is the time instant at which the head velocity is the highest.

The following describes a specific example of methods for calculating various indicators.

Grip Acceleration

Grip accelerations per time instant for the absolute coordinate axes x, y, and z are calculated based on data indicating the grip accelerations A(gx), A(gy), and A(gz) per time instant for the relative coordinate axes x, y, and z and the grip angular velocities ω(gx), ω(gy), and ω(gz) per time instant for the relative coordinate axes x, y, and z that were measured. These grip accelerations A(gx), A(gy), and A(gz) are converted by the arithmetic unit 40 into grip accelerations AA(gx), AA(gy), and AA(gz) per time instant for the absolute coordinate axes x, y, and z. Quaternions used in this conversion are expressed by the following mathematical expressions.

$$Q=[\cos(\theta); \omega(gx)/\theta*\sin(\theta/2), \omega(gy)/\theta*\sin(\theta/2), \omega(gz)/\theta*\sin(\theta/2)]$$

$$R=[\cos(\theta); -\omega(gx)/\theta*\sin(\theta/2), -\omega(gy)/\theta*\sin(\theta/2), -\omega(gz)/\theta*\sin(\theta/2)]$$

The value of θ in these mathematical expressions is obtained by the following mathematical expression.

$$\theta=SQRT(\omega(gx)^2+\omega(gy)^2+\omega(gz)^2)$$

In this conversion, the relative coordinate axes of the grip accelerations A(gx), A(gy), and A(gz) are converted into absolute coordinate axes based on the grip angular velocities ω(gx), ω(gy), and ω(gz).

The grip acceleration AA(g) per time instant is calculated by the arithmetic unit 40 based on the grip accelerations AA(gx), AA(gy), and AA(gz) per time instant for the absolute coordinate axes x, y, and z. This calculation is performed based on the following mathematical expression.

$$AA(g)=SQRT(AA(gx)^2+AA(gy)^2+AA(gz)^2)$$

This grip acceleration AA(g) per time instant is stored in the storage unit 42.

The arithmetic unit 40 selects the highest grip acceleration AA(g) from among the grip accelerations AA(g) per time instant that were stored in the storage unit 42. The arithmetic unit 40 then outputs this highest grip acceleration AA(g) to the output unit 10. If the highest grip acceleration AA(g) is high, it means that the player 48 had little arm strain and hand looseness, and that the player 48 was able to forcefully hit the tennis ball. If the highest grip acceleration AA(g) is high, it means that that racket 12 is a good match for the player 48. Whether that racket 12 is suited to the player 48 can be determined based on the highest grip acceleration AA(g). There are cases where this determination is made by a person such as an instructor. However, the determination references and the determination itself can be programmed in advance as part of the operations of the analyzing device 8.

In fitting, a racket 12 whose highest grip acceleration AA(g) is greater than the highest grip acceleration AA(g) of a reference racket is recommended to the player 48. The reference racket is the racket regularly used by the player 48. There are cases where this recommendation of a racket in fitting is made by a person. However, this recommendation of a racket can also be programmed in advance as part of the operations of the analyzing device 8. The recommended racket may be displayed on the output unit 10 along with a reason for the recommendation.

Plural highest grip accelerations AA(g) may be obtained by making plural swings. The average value of the highest grip accelerations AA(g) is calculated by the arithmetic unit 40. It is preferable that this average value is output to the output unit 10.

Grip Velocity

The grip velocity is calculated by the arithmetic unit 40 based on the above-described grip accelerations AA(gx), AA(gy), and AA(gz) per time instant for the absolute coordinate axes x, y, and z. Specifically, grip velocities V(gx), V(gy), and V(gz) per time instant for the absolute coordinate axes x, y, and z are calculated based on the following mathematical expressions.

$$V(gx)=AA(gx)*T$$

$$V(gy)=AA(gy)*T$$

$$V(gz)=AA(gz)*T$$

In the above mathematical expressions, T denotes the time.

The grip velocity V(g) per time instant is calculated by the arithmetic unit 40 based on the grip velocities V(gx), V(gy), and V(gz) per time instant for the absolute coordinate axes x, y, and z. This calculation is performed based on the following mathematical expression.

$$V(g)=SQRT(V(gx)^2+V(gy)^2+V(gz)^2)$$

The grip velocity V(g) per time instant is stored in the storage unit 42.

The arithmetic unit 40 selects the highest grip velocity V(g) from among the grip velocities V(g) per time instant that were stored in the storage unit 42. The arithmetic unit 40 then outputs this highest grip velocity V(g) to the output unit 10. If the highest grip velocity V(g) is high, it means that the player 48 had little arm strain and hand looseness. If the highest grip velocity V(g) is high, it means that that racket 12 is a good match for the player 48. Whether that racket 12 is suited to the player 48 can be determined based on the highest grip velocity V(g). There are cases where this determination and the later-described racket recommendation during fitting are made by a person such as an instructor. However, the determination references, the determination, and the recommendation of a racket can be programmed in advance as part of the operations of the analyzing device 8, as described above.

In fitting, a racket 12 whose highest grip velocity V(g) is greater than the highest grip velocity V(g) of a reference racket is recommended to the player 48. The reference racket is the racket regularly used by the player 48.

Plural highest grip velocities V(g) may be obtained by making plural swings. The average value of the highest grip velocities V(g) is calculated by the arithmetic unit 40. It is preferable that this average value is output to the output unit 10.

Head Velocity

The head velocity per time instant for the absolute coordinate axes x, y, and z is calculated based on data indicating the grip accelerations A(gx), A(gy), and A(gz) per time instant for the relative coordinate axes x, y, and z, data indicating the grip angular velocities ω(gx), ω(gy), and ω(gz) per time instant for the relative coordinate axes x, y, and z, and data indicating the racket length. The data indicating the racket length is appropriately input to the analyzing apparatus 2 by the operator. Specifically, first the arithmetic unit 40 calculates the grip velocities V(gx), V(gy), and V(gz) per time instant for the absolute coordinate axes x, y, and z using the above-described mathematical expressions. The arithmetic unit 40 then calculates a rotation matrix RM using the above-described quaternions. The arithmetic unit 40 furthermore calculates a velocity vector Vr from rotation per time instant in the absolute coordinate axes x, y, and z, based on the following mathematical expression.

$$Vr = \text{cross}(\omega, tV) * RM$$

In this mathematical expression, cross(ω,tV) is the exterior product of the angular velocity vector ω per time instant for the relative coordinate axes x, y, and z and the racket length vector tV.

Subsequently, the arithmetic unit 40 calculates head velocities V(hx), V(hy), and V(hz) per time instant, which are components of the absolute coordinate axes x, y, and z, using the following mathematical expressions.

$$V(hx) = V(gx) + Vr(x)$$

$$V(hy) = V(gy) + Vr(y)$$

$$V(hz) = V(gz) + Vr(z)$$

The magnitude V(h) of the head velocity per time instant in the xyz absolute coordinate system is then calculated by the arithmetic unit 40 based on the head velocities V(hx), V(hy), and V(hz) per time instant for the absolute coordinate axes x, y, and z. This calculation is performed based on the following mathematical expression.

$$V(h) = SQRT(V(hx)^2 + V(hy)^2 + V(hz)^2)$$

This head velocity V(h) per time instant is stored in the storage unit 42.

The arithmetic unit 40 selects the highest head velocity V(h) from among the head velocities V(h) per time instant that were stored in the storage unit 42. The arithmetic unit 40 then outputs this highest head velocity V(h) to the output unit 10. If the highest head velocity V(h) is high, it means that the player 48 was able to forcefully hit the tennis ball. If the highest head velocity V(h) is high, it means that that racket 12 is a good match for the player 48. Whether that racket 12 is suited to the player 48 can be determined based on the highest head velocity V(h). There are cases where this determination is made by a person. However, the determination references and the determination itself can be programmed in advance as part of the operations of the analyzing device 8, as described above.

With this analyzing method, the head velocity can be calculated based on the grip velocity. Accordingly, the triaxial acceleration sensor 28 and the triaxial gyroscope 30 do not need to be attached to the head 14. However, these sensors 28 and 30 may be attached to the head 14.

In fitting, a racket 12 whose highest head velocity V(h) is greater than the highest head velocity V(h) of a reference racket is recommended to the player 48. The reference racket is the racket regularly used by the player 48. There are cases where this recommendation of a racket is made by a person. However, this recommendation of a racket can be programmed in advance as part of the operations of the analyzing device 8, as described above.

Plural highest head velocities V(h) may be obtained by making plural swings. The average value of the highest head velocities V(h) is calculated by the arithmetic unit 40. It is preferable that this average value is output to the output unit 10.

Head Acceleration

The head acceleration per time instant for the absolute coordinate axes x, y, and z is obtained by performing temporal differentiation on the above-described head velocities V(hx), V(hy), and V(hz) per time instant for the absolute coordinate axes x, y, and z. The head acceleration AA(h) per time instant is calculated by the arithmetic unit 40 based on the head accelerations AA(hx), AA(hy), and AA(hz) per time instant for the absolute coordinate axes x, y, and z. This calculation is performed based on the following mathematical expression.

$$AA(h) = SQRT(AA(hx)^2 + AA(hy)^2 + AA(hz)^2)$$

This head acceleration AA(h) per time instant is stored in the storage unit 42.

The arithmetic unit 40 selects the highest head acceleration AA(h) from among the head accelerations AA(h) per time instant that were stored in the storage unit 42. The arithmetic unit 40 then outputs this highest head acceleration AA(h) to the output unit 10. If the highest head acceleration AA(h) is high, it means that the player 48 was able to forcefully hit the tennis ball by applying greater kinetic energy. If the highest head acceleration AA(h) is high, it means that that racket 12 is a good match for the player 48. Whether that racket 12 is suited to the player 48 can be determined based on the highest head acceleration AA(h). There are cases where this determination is made by a person. However, the determination references and the determination itself can be programmed in advance as part of the operations of the analyzing device 8.

With this analyzing method, the head acceleration can be calculated based on the grip velocity. Accordingly, the triaxial acceleration sensor 28 and the triaxial gyroscope 30 do not need to be attached to the head 14. However, these sensors 28 and 30 may be attached to the head 14.

In fitting, a racket 12 whose highest head acceleration AA(h) is greater than the highest head acceleration AA(h) of a reference racket is recommended to the player 48. The reference racket is the racket regularly used by the player 48. There are cases where this recommendation of a racket is made by a person. However, this recommendation of a racket can be programmed in advance as part of the operations of the analyzing device 8, as described above.

Plural highest head accelerations AA(h) may be obtained by making plural swings. In this case, the average value of the highest head accelerations AA(h) is calculated by the arithmetic unit 40. It is preferable that this average value is output to the output unit 10.

Head Velocity Component Ratio

The head velocity component ratio I is calculated based on data indicating the grip accelerations A(gx), A(gy), and A(gz) per time instant for the relative coordinate axes x, y, and z, data indicating the grip angular velocities ω(gx), ω(gy), and ω(gz) per time instant for the relative coordinate axes x, y, and z, and the racket length. First, head velocities V(hx) and V(hz) per time instant for the absolute coordinate axes x and z are calculated using the above-described mathematical expressions. The arithmetic unit 40 then calculates the head velocity component ratio I based on the following mathematical expression.

$$I = V(hz)/V(hx)$$

The head velocity component ratio I is correlated with the type of swing made by the player 48. With a swing in which the head velocity component ratio I at the time instant at which the head velocity V(h) is the highest has a high absolute value and is a positive value, topspin tends to be applied to the tennis ball. With a swing in which the head velocity component ratio I has a high absolute value and is a negative value, slice spin tends to be applied to the tennis ball. With a swing in which the head velocity component ratio I has an absolute value close to zero, spin tends to not be applied to the tennis ball.

With this analyzing method, the head velocity component ratio I can be calculated based on the grip velocity. Accordingly, the triaxial acceleration sensor 28 and the triaxial gyroscope 30 do not need to be attached to the head 14. However, these sensors 28 and 30 may be attached to the head 14.

Figure 5:
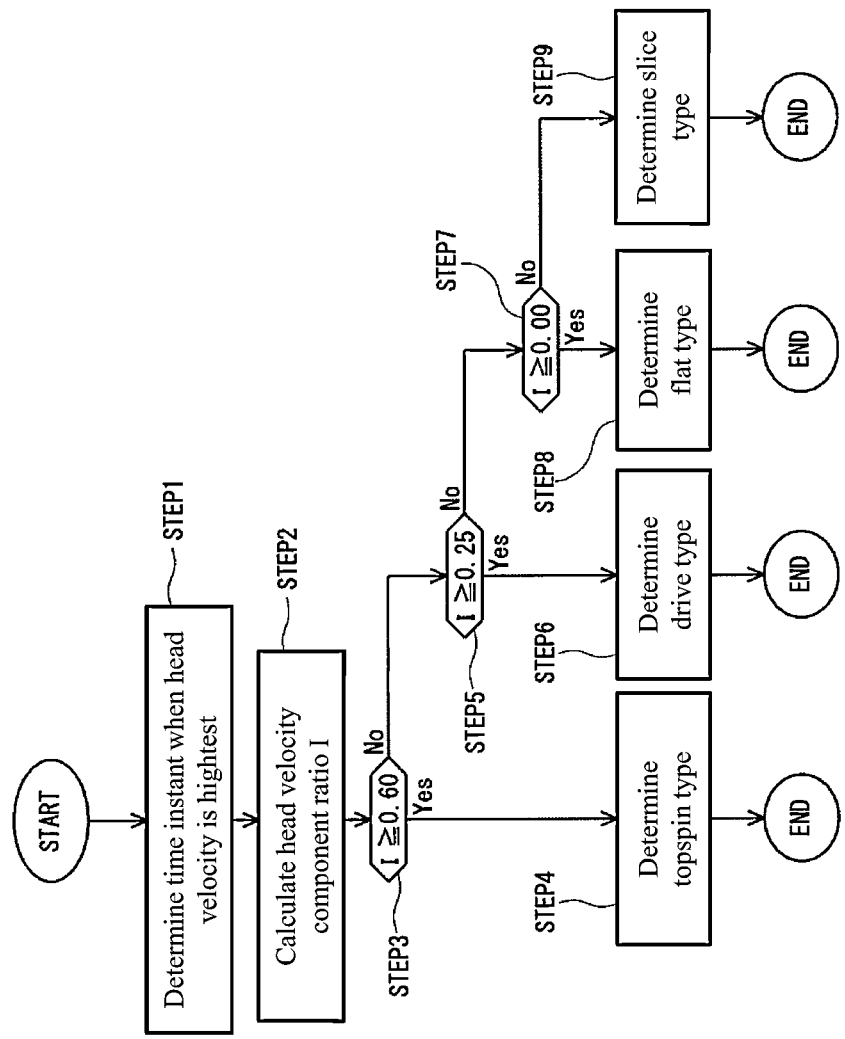
FIG. 5 is a flowchart showing a swing type determination method.

FIG. 5 is a flowchart showing a swing type determination method. This flow is performed by the arithmetic unit 40 shown in FIG. 1. In this flow, the arithmetic unit 40 determines the time instant at which the head velocity V(h) is the highest (STEP1). The arithmetic unit 40 calculates the head velocity component ratio I at that time instant (STEP2).

The arithmetic unit 40 determines whether the head velocity component ratio I is greater than or equal to 0.60 (STEP3). If the head velocity component ratio I is greater than or equal to 0.60, it is determined that the swing is of the topspin type (STEP4). If the head velocity component ratio I is not greater than or equal to 0.60, the arithmetic unit 40 determines whether the head velocity component ratio I is greater than or equal to 0.25 (STEP5). If the head velocity component ratio I is greater than or equal to 0.25, it is determined that the swing is of the drive type (STEP6). If the head velocity component ratio I is not greater than or equal to 0.25, the arithmetic unit 40 determines whether the head velocity component ratio I is greater than or equal to 0.00 (STEP7). If the head velocity component ratio I is greater than or equal to 0.00, it is determined that the swing is of the flat type (STEP8). If the head velocity component ratio I is not greater than or equal to 0.00, it is determined that the swing is of the slice type (STEP9).

The determination result is output to the output unit 10. With this analyzing method, whether that racket 12 is suited to the player 48 can be determined based on the head velocity component ratio I. The player 48 can select a racket 12 that is suited to his type of swing. There are cases where the determination regarding the swing type classification and the determination regarding whether the racket is suited to the player based on the determination result are made by a person. However, the determination references and the determination itself can be programmed in advance as part of the operations of the analyzing device 8.

Plural head velocity component ratios I may be obtained by making plural swings. The average value of the head velocity component ratios I is calculated by the arithmetic unit 40. It is preferable that this average value is output to the output unit 10.

Figure 6:
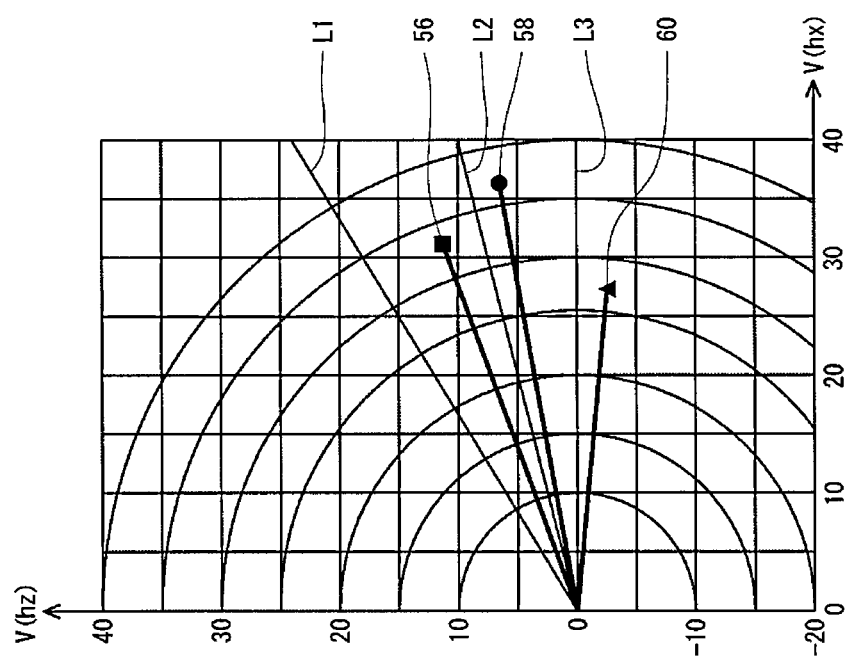
FIG. 6 is an example of a graph output to an output unit.

FIG. 6 is a graph that is output to the output unit 10. In this graph, the horizontal axis indicates the head velocity V(hx) in the x axis direction at the time instant at which the head velocity V(h) is the highest. The vertical axis indicates the head velocity V(hz) in the z axis direction at the time instant at which the head velocity V(h) is the highest. A distance L from the origin (0,0) to a point (V(hx),V(hz)) on the graph is calculated using the following mathematical expression.

$$L = SQRT(V(hx)^2 + V(hz)^2)$$

This distance L is a head velocity V'(h) when it is assumed that the head velocity V(hy) in the y axis direction is zero. Many arcs are drawn in FIG. 6. The center of each arc is the origin (0,0). The radius of each arc indicates the head velocity V'(h).

A straight line L1 shown in FIG. 6 is expressed by the following mathematical expression.

$$V(hz) = 0.60 * V(hx)$$

A straight line L2 is expressed by the following mathematical expression.

$$V(hz) = 0.25 * V(hx)$$

A straight line L3 is expressed by the following mathematical expression.

$$V(hz) = 0.00$$

A first point 56, a second point 58, and third point 60 are shown in FIG. 6. The first point 56 is indicated by a filled square. The second point 58 is indicated by a filled circle. The third point 60 is indicated by a filled triangle. The first point 56 indicates the point (V(hx),V(hz)) at which a first racket was swung. The second point 58 indicates the point (V(hx), V(hz)) at which a second racket was swung. The third point 60 indicates the point (V(hx),V(hz)) at which a third racket was swung.

The first point 56 lies between the straight line L1 and the straight line L2. The second point 58 lies between the straight line L2 and the straight line L3. The third point 60 is positioned below the straight line L3. The distance from the origin (0,0) to the second point 58 is greater than the distance from the origin (0,0) to the first point 56. The distance from the origin (0,0) to the second point 58 is greater than the distance from the origin (0,0) to the third point 60.

The following is revealed from FIG. 6.

(1) The swing made with the first racket is of the drive type.

(2) The swing made with the second racket is of the flat type.

(3) The swing made with the third racket is of the slice type.

(4) The head velocity V'(h) of the swing made with the second racket is the highest.

Whether that racket 12 is suited to the player 48 can be determined based on these pieces of information. Racket 12 fitting is performed based on these pieces of information.

There are cases where this swing type classification is made by a person. However, the classification references and the classification itself can be programmed in advance as part of the operations of the analyzing device 8.

Figure 7:
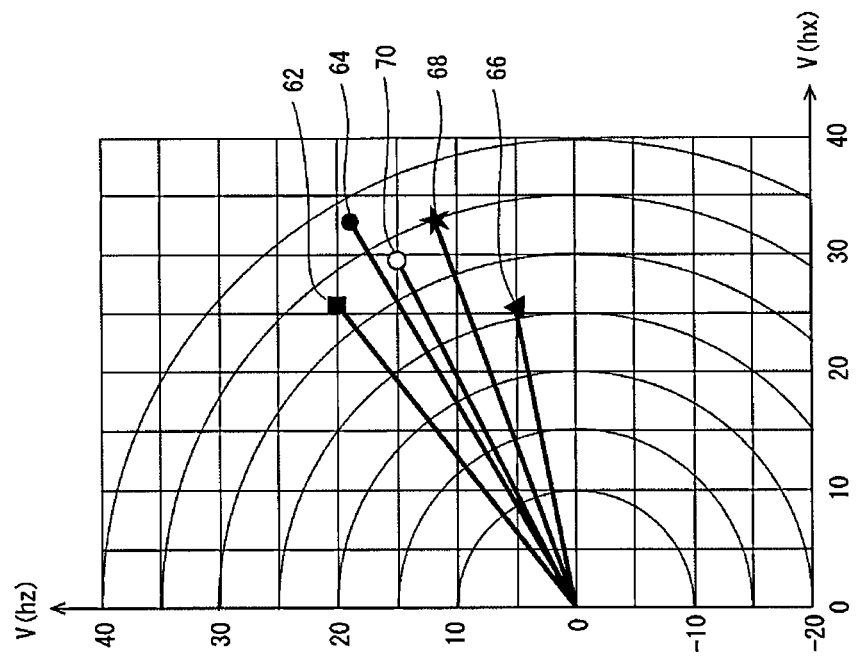
FIG. 7 is another example of a graph output to the output unit.

FIG. 7 is a graph that is output to the output unit 10. Similarly to FIG. 6, in this graph, the horizontal axis indicates the head velocity V(hx) in the x axis direction at the time instant at which the head velocity V(h) is the highest. The vertical axis indicates the head velocity V(hz) in the z axis direction at the time instant at which the head velocity V(h) is the highest. Also, the radius of each arc in this figure indicates the head velocity V' (h). The method for calculating the distance L from the origin (0,0) to a point on the graph is the same as the calculation method that was described above using FIG. 6. Accordingly, the calculation method will not be described here.

In FIG. 7, a first point 62 is indicated by a filled square, a second point 64 is indicated by a filled circle, a third point 66 is indicated by a filled triangle, a fourth point 68 is indicated by a filled star, and a fifth point 70 is indicated by a hollow circle. The first point 62 indicates the point when a first racket was swung, the second point 64 indicates the point when a second racket was swung, the third point 66 indicates the point when a third racket was swung, the fourth point 68 indicates the point when a fourth racket was swung, and the fifth point 70 indicates the point when a reference racket was swung. As described above, the reference racket is the racket regularly used by the player 48. All five of these rackets were swung by the one player 48. These points are specified by (V(hx),V(hz)) on the graph. The points are each specified by average velocities V(hx) and V(hz) from five swings. The number of swings is of course not limited to five.

The distance from the origin (0,0) to the first point 62 is substantially the same as the distance from the origin (0,0) to the fifth point 70. The distance from the origin (0,0) to the third point 66 is less than the distance from the origin (0,0) to the fifth point 70. The distance from the origin (0,0) to the second point 64 and the distance from the origin (0,0) to the fourth point 68 are both greater than the distance from the origin (0,0) to the fifth point 70. A straight line connecting the origin (0,0) and the first point 62 is positioned even higher than a straight line connecting the origin (0,0) and the fifth point 70 than a straight line connecting the origin (0,0) and the second point 64 is. A straight line connecting the origin (0,0) and the third point 66 is positioned even lower than a straight line connecting the origin (0,0) and the fifth point 70 than a straight line connecting the origin (0,0) and the fourth point 68 is.

The following is revealed from FIG. 7.

(1) The head velocity V' (h) of the swing made with the second racket and the head velocity V' (h) of the swing made with the fourth racket are both greater than the head velocity V' (h) of the swing made with the reference racket.

(2) The head velocity V' (h) of the swing made with the first racket and the head velocity V' (h) of the swing made with the third racket are both less than the head velocity V' (h) of the swing made with the reference racket.

(3) The swing made with the second racket is more of the drive type than the swing made with the reference racket is, but the swing made with the first racket is even more of the drive type than the swing made with the second racket is.

(4) The swing made with the fourth racket is more of the slice type than the swing made with the reference racket is, but the swing made with the third racket is even more of the slice type than the swing made with the fourth racket is.

The determination result is output to the output unit 10. With this analyzing method, whether that racket 12 is suited to the player 48 can be determined based on the head velocity component ratio I. The racket 12 that is recommended to the player 48 is one that is suited to his type of swing and further obtains a head velocity greater than the highest head velocity obtained with the reference racket. There are cases where this determination and racket recommendation are made by a person. However, the determination references, the determination itself, and the racket recommendation can be programmed in advance as part of the operations of the analyzing device 8, as described above.

FIGS. 8 to 11 are each a graph that is output to the output unit 10. FIGS. 8 to 11 each show the results from the one player 48 swinging one tennis racket five times. The tennis rackets in FIGS. 8 to 11 are mutually different tennis rackets. The number of swings is of course not limited to five. Similarly to FIG. 6, in these graphs, the horizontal axis indicates the head velocity V(hx) in the x axis direction at the time instant at which the head velocity V(h) is the highest. The vertical axis indicates the head velocity V(hz) in the z axis direction at the time instant at which the head velocity V(h) is the highest. Also, the radius of each arc in this figure indicates the head velocity V' (h). The method for calculating the distance from the origin (0,0) to a point on the graph is the same as the calculation method that was described above using FIG. 6. Accordingly, the calculation method will not be described here.

Figure 8:
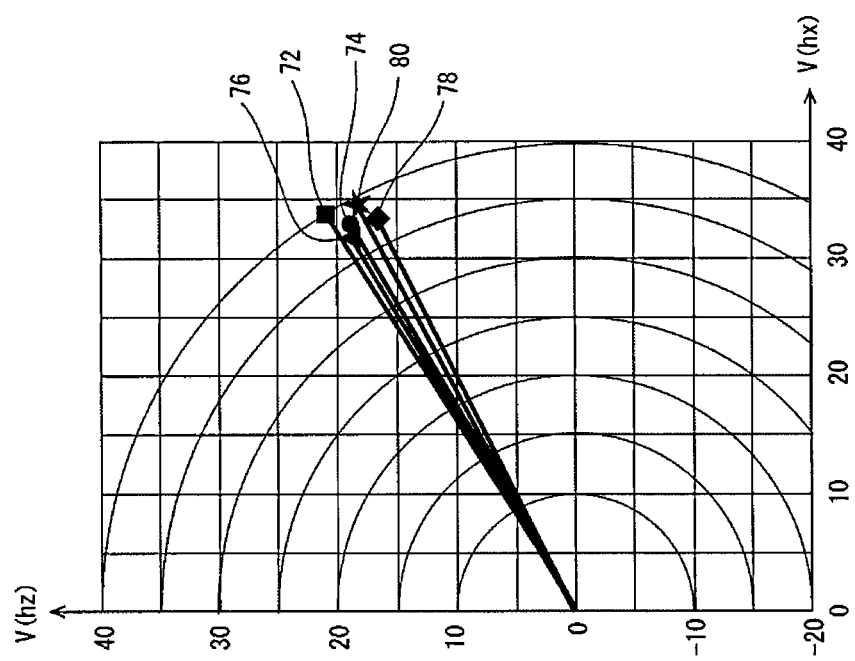
FIG. 8 is yet another example of a graph output to the output unit.
Figure 9:
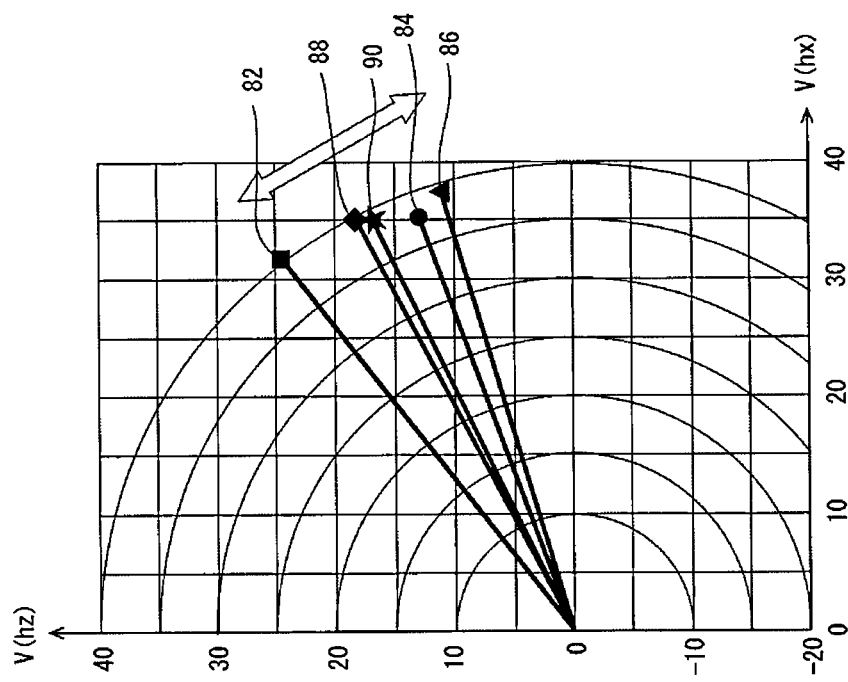
FIG. 9 is still another example of a graph output to the output unit.
Figure 10:
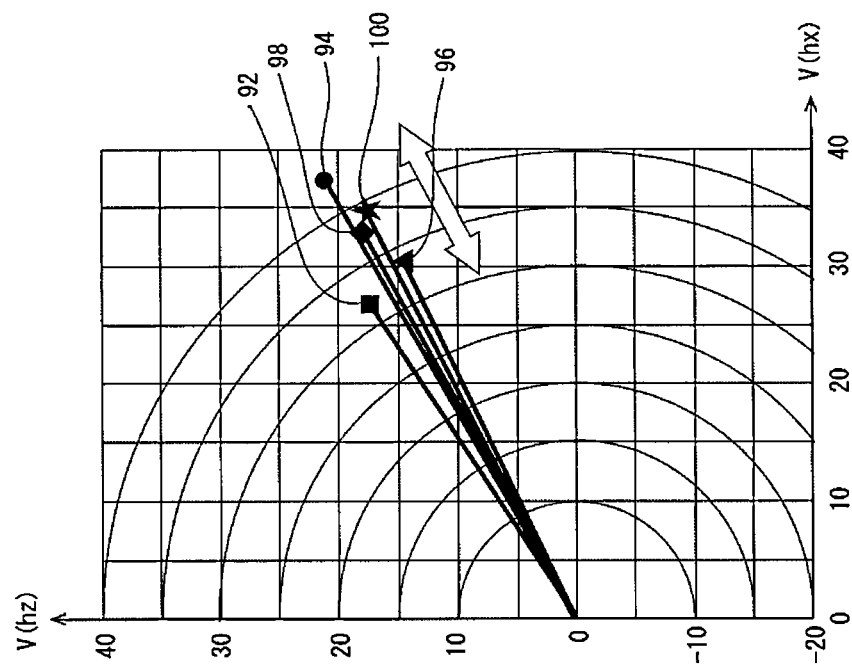
FIG. 10 is still another example of a graph output to the output unit.
Figure 11:
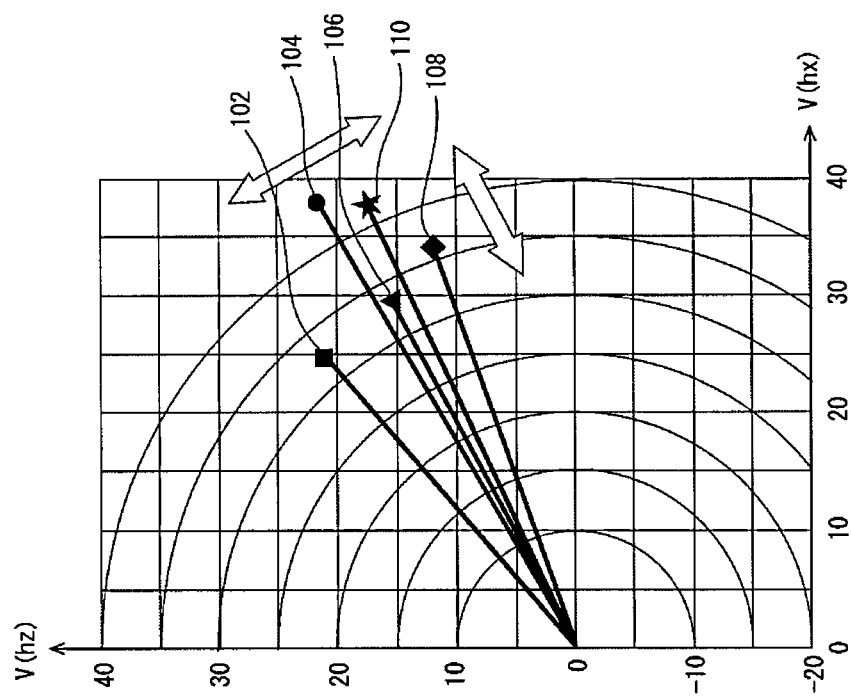
FIG. 11 is still another example of a graph output to the output unit.

FIG. 8 shows points 72, 74, 76, 78, and 80 indicating swings made with a first racket. FIG. 9 shows points 82, 84, 86, 88, and 90 indicating swings made with a second racket. FIG. 10 shows points 92, 94, 96, 98, and 100 indicating swings made with a third racket. FIG. 11 shows points 102, 104, 106, 108, and 110 indicating swings made with a fourth racket.

In FIG. 8, the first point 72 is indicated by a filled square, the second point 74 is indicated by a filled circle, the third point 76 is indicated by a filled triangle, the fourth point 78 is indicated by a filled diamond, and the fifth point 80 is indicated by a filled star. In FIG. 9, the first point 82 is indicated by a filled square, the second point 84 is indicated by a filled circle, the third point 86 is indicated by a filled triangle, the fourth point 88 is indicated by a filled diamond, and the fifth point 90 is indicated by a filled star. In FIG. 10, the first point 92 is indicated by a filled square, the second point 94 is indicated by a filled circle, the third point 96 is indicated by a filled triangle, the fourth point 98 is indicated by a filled diamond, and the fifth point 100 is indicated by a filled star. In FIG. 11, the first point 102 is indicated by a filled square, the second point 104 is indicated by a filled circle, the third point 106 is indicated by a filled triangle, the fourth point 108 is indicated by a filled diamond, and the fifth point 110 is indicated by a filled star. These points are specified by (V(hx), V(hz)) on the graph.

In FIG. 8, the distance from the origin (0,0) to the first point 72, the distance from the origin (0,0) to the second point 74, the distance from the origin (0,0) to the third point 76, the distance from the origin (0,0) to the fourth point 78, and the distance from the origin (0,0) to the fifth point 80 are all substantially the same. In other words, the points 72, 74, 76, 78, and 80 are all grouped in the direction of the arc radius. Also, the points 72, 74, 76, 78, and 80 are all also grouped in the direction of the arc circumference.

In FIG. 9, the distance from the origin (0,0) to the first point 82, the distance from the origin (0,0) to the second point 84, the distance from the origin (0,0) to the third point 86, the distance from the origin (0,0) to the fourth point 88, and the distance from the origin (0,0) to the fifth point 90 are all substantially the same. In other words, the points 82, 84, 86,

88, and 90 are all grouped in the direction of the arc radius. On the other hand, the points 82, 84, 86, 88, and 90 are all separated from each other in the direction of the arc circumference, as shown by a hollow arrow. In other words, the points 82, 84, 86, 88, and 90 are all dispersed in the direction of the arc circumference.

In FIG. 10, the distance from the origin (0,0) to the first point 92, the distance from the origin (0,0) to the second point 94, the distance from the origin (0,0) to the third point 96, the distance from the origin (0,0) to the fourth point 98, and the distance from the origin (0,0) to the fifth point 100 are greatly different from each other. In other words, the points 92, 94, 96, 98, and 100 are all dispersed in the direction of the arc radius, as shown by a hollow arrow. On the other hand, the points 92, 94, 96, 98, and 100 are all grouped in the direction of the arc circumference.

In FIG. 11, the distance from the origin (0,0) to the first point 102, the distance from the origin (0,0) to the second point 104, the distance from the origin (0,0) to the third point 106, the distance from the origin (0,0) to the fourth point 108, and the distance from the origin (0,0) to the fifth point 110 are greatly different from each other. In other words, the points 102, 104, 106, 108, and 110 are all dispersed in the direction of the arc radius, as shown by a hollow arrow. Also, the points 102, 104, 106, 108, and 110 are all likewise dispersed in the direction of the arc circumference, as shown by a hollow arrow.

The following is revealed from FIGS. 8 to 11.

(1) As is clear from FIG. 8, with the swing made with the first racket, there is little variation in the head velocity V' (h), and there is also little variation in the topspin and slice directions.

(2) As is clear from FIG. 9, with the swing made with the second racket, there is little variation in the head velocity V' (h), but there is a large amount of variation in the topspin and slice directions.

(3) As is clear from FIG. 10, with the swing made with the third racket, there is a large amount of variation in the head velocity V' (h), but there is little variation in the topspin and slice directions.

(4) As is clear from FIG. 11, with the swing made with the fourth racket, there is a large amount of variation in the head velocity V' (h), and there is a large amount of variation in the topspin and slice directions.

The determination result is output to the output unit 10. Swing stability can be evaluated using FIGS. 8 to 11. With this analyzing method, whether the corresponding racket 12 is suited to the player 48 can be determined based on a head velocity component. The racket 12 that is recommended to the player 48 is the one for which there is little variation in the head velocity V' (h) and little variation in the topspin and slice directions, that is to say, the first racket. In this case, an absolute variation reference and a relative variation reference may be employed as references for evaluating the racket that is to be recommended. For example, a reference value of the range of variation in the head velocity V' (h), and a reference value of the range of variation in the topspin and slice directions are predetermined as the absolute references. A racket that does not exceed these reference values may be recommended. With respect to the relative reference, a configuration is possible in which, for example, the racket that has the lowest value for the range of variation in the head velocity V' (h) and the lowest value for the range of variation in the topspin and slice directions is recommended from among multiple evaluation target rackets, or a predetermined number of rackets for which these values are lower are recommended from among multiple evaluation target rackets. Here, the range of variation in the topspin and slice directions may be indicated by, for example, the separation angle between the straight lines from the origin (0,0) to the measured points (points indicating the velocity component values) in the graphs of FIGS. 8 to 11. There are cases where this determination and racket recommendation are made by a person. However, the determination references, the determination itself, and the racket recommendation can be programmed in advance as part of the operations of the analyzing device 8, as described above.

Swing Trajectory

The swing trajectory is calculated based on data indicating the grip accelerations A(gx), A(gy), and A(gz) per time instant for the relative coordinate axes x, y, and z, data indicating the grip angular velocities ω(gx), ω(gy), and ω(gz) per time instant for the relative coordinate axes x, y, and z, and the racket length. First, the arithmetic unit 40 calculates the grip velocities V(gx), V(gy), and V(gz) per time instant for the absolute coordinate axes x, y, and z using the above-described mathematical expressions. The arithmetic unit 40 then calculates grip positions P(gx), P(gy), and P(gz) per time instant based on these grip velocities using the following mathematical expressions.

$$P(gx)=V(gx)*T$$

$$P(gy)=V(gy)*T$$

$$P(gz)=V(gz)*T$$

In the above mathematical expressions, T denotes the time.

The arithmetic unit 40 calculates a relative position P(h) of the top of the head 14 using the following mathematical expression.

$$P(h)=tV*RM$$

In this mathematical expression, tV is the racket length vector, and RM is the above-described rotation matrix. The arithmetic unit 40 also calculates the absolute coordinates (Xt,Yt,Zt) of the head 14 per time instant using the following mathematical expression.

$$(Xt,Yt,Zt)=P(g)+P(h)$$

The arithmetic unit 40 also calculates a movement distance Jx of the head 14 in the absolute coordinate axis x direction from times t0 to t using the following mathematical expression.

$$Jx=(Xt-Xt0)$$

The arithmetic unit 40 also calculates a movement distance Jy of the head 14 in the absolute coordinate axis y direction from times t0 to t using the following mathematical expression.

$$Jy=(Yt-Yt0)$$

The movement distances Jx and Jy are stored in the storage unit 42.

Movement distances Jx and Jy in various time zones can be measured. For example, the movement distances Jx and Jy from t seconds before impact to impact can be measured. Also, the movement distances Jx and Jy from impact to t seconds after impact can be measured.

The trajectory of the racket 12 is revealed using the movement distances Jx and Jy. Whether that racket 12 is suited to the player 48 can be determined based on this trajectory. The racket 12 that describes an ideal trajectory is the racket 12 that is a good match for that player 48. There are cases where this determination is made by a person. However, the determination references and the determination itself can be programmed in advance as part of the operations of the analyzing device 8, as described above.

With this analyzing method, the trajectory of the head 14 can be calculated based on the grip velocity. Accordingly, the triaxial acceleration sensor 28 and the triaxial gyroscope 30 do not need to be attached to the head 14. However, these sensors 28 and 30 may be attached to the head 14.

Plural movement distances Jx and Jy may be obtained by making plural swings. The average values of the movement distances Jx and Jy are calculated by the arithmetic unit 40. It is preferable that these average values are output to the output unit 10.

Racket Angular Velocity

The racket angular velocity is calculated based on data indicating the grip angular velocities $\omega(gx)$, $\omega(gy)$, and $\omega(gz)$ per time instant for the relative coordinate axes x, y, and z. In particular, the analysis of racket angular velocity is performed using the grip angular velocity $\omega(gy)$ about the relative coordinate axis y.

Figure 12:
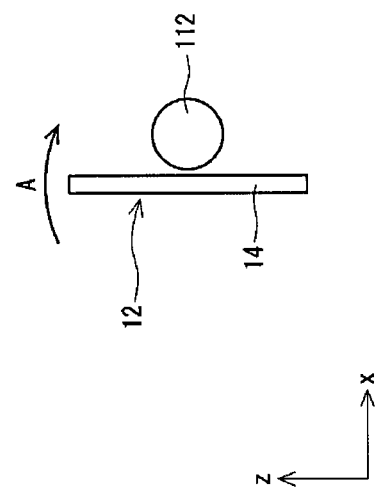
FIG. 12 is a front view of a tennis racket used in the measurement of racket angular velocity, along with a tennis ball.

FIG. 12 shows the tennis racket 12 used in the measurement of racket angular velocity. FIG. 12 shows the head 14 when viewed along the relative coordinate axis y direction. FIG. 12 also shows a tennis ball 112 immediately before impact with the racket 12. An arrow A in this figure shows the rotation direction of the head 14. The angular velocity of this rotation is the above-described grip angular velocity $\omega(gy)$. This grip angular velocity $\omega(gy)$ is output by the arithmetic unit 40 to the output unit 10.

If the grip angular velocity $\omega(gy)$ has a positive value, it means that the swing is of the swing type in which the tennis ball 112 is hit while the face 24 is closed. If the grip angular velocity $\omega(gy)$ has a negative value, it means that the swing is of the swing type in which the tennis ball 112 is hit while the face 24 is open. The player 48 can select a racket 12 that is suited to his type of swing. There are cases where the determination regarding the classification of the player's swing type and the determination regarding whether the racket is suited to the player based on the determination result are made by a person. However, the classification references and the classification itself can be programmed in advance as part of the operations of the analyzing device 8, as described above.

Plural grip angular velocities $\omega(gy)$ may be obtained by making plural swings. The average value of these grip angular velocities $\omega(gy)$ is calculated by the arithmetic unit 40. It is preferable that this average value is output to the output unit 10.

In the racket fitting described above, plural rackets are swung by the player 48. These rackets can be selected in advance such that specific characteristics are different between them. Examples include rackets having different types of string, rackets having different string tensions, rackets having different frame sizes, and rackets having different frame masses.

The swing described here includes swings in not only a groundstroke, but also in a volley and a serve. A groundstroke is when a tennis ball that has bounced off the ground of the tennis court one time is hit. A volley is when a tennis ball that was hit by the other player is directly hit before falling to the ground of the tennis court. A serve is when a player tosses a tennis ball upward and then directly hits it toward the opponent's side 52 before it falls to the ground of the tennis court.

In both a swing during a volley and a swing during a serve, indicators such as the grip acceleration, the grip velocity, the head velocity, the head acceleration, the head velocity component ratio, the swing trajectory, and the racket angular velocity can be obtained from measured values from the triaxial acceleration sensor 28 and the triaxial gyroscope 30. References similar to the determination references for racket fitting in the case of a groundstroke can be applied as the determination references in the case of a volley and a serve as well. Specifically, the racket that is recommended to the player 48 is one that has high values for the highest grip acceleration, the highest grip velocity, the highest head velocity, and the highest head acceleration. If the head velocity component ratio is used as the basis, the racket that is preferable to the player 48 is one that is suited to the type of swing made by the player 48. Also, the racket that is recommended to the player 48 has little variation in the head velocity component ratio. Furthermore, the racket that is recommended to the player 48 has little variations in both of the highest head velocity and the highest head acceleration. Moreover, the racket 12 that describes an ideal swing trajectory is the racket that is a good match for the player 48. There are cases where this determination and the recommendation of a racket during fitting are made by a person such as an instructor. However, the determination references, the determination, and the recommendation of a racket can be programmed in advance as part of the operations of the analyzing device 8, as described above. Furthermore, the description given above regarding the reference values of the range of variation (absolute references and relative references) applies here as well.

The embodiment described above takes the example of applying the analyzing apparatus 2 and the analyzing method to the fitting of a racket. However, the analyzing apparatus 2 and the analyzing method are not limited to the fitting of a racket, and can also be applied to, for example, the coaching of a student (player 48) at a tennis school or the like. The indicators such as the grip acceleration, the grip velocity, the head velocity, the head acceleration, the head velocity component ratio, the swing trajectory, and the racket angular velocity that are obtained by the analyzing apparatus 2 and the analyzing method can also be said to express features of the swing made by the player 48. Appropriate coaching can be expected if it is based on data objectively expressing swing features.

One example of coaching that uses the analyzing apparatus 2 and the analyzing method includes a comparison of desired swing data and data regarding a swing made by the player 48. For example, the analyzing apparatus 2 and the analyzing method obtain indicators of a desired swing such as the grip acceleration, the grip velocity, the head velocity, the head acceleration, the head velocity component ratio, the swing trajectory, and the racket angular velocity, and also obtain these indicators for a swing made by the player 48. A comparison of the indicators of the desired swing and the indicators of the swing made by the player qualitatively reveals differences between the these swings. For example, differences in the grip acceleration, the grip velocity, the head velocity, the head acceleration, the racket angular velocity, and the like between the two swings can be expressed with numerical values. Also, points indicating head velocity component values of the desired swing and each swing made by the player 48 can be displayed on graphs similar to those of FIGS. 6 to 11. Differences in the head velocity, the type of swing, and the like between the two swings are revealed from these graphs. For example, whether the swing made by the player 48 tends to be a drive or tends to be a slice can be determined by comparing it with the desired swing. A comparison using qualitative data such as that described above makes it possible to determine whether the swing made by the player 48 is good or poor based on the desired swing. Points regarding swing correction can be accurately presented to the player 48 based on the determination results. The player 48 can get an accurate mental picture of the swing that is to be desired. This makes it possible to expect effective and appropriate coaching.

Another example of coaching that uses the analyzing apparatus 2 and the analyzing method includes a comparison between data regarding plural swings made by the same player 48 at different times. For example, this includes a comparison between data from before and after coaching provided by an instructor to the player 48. This coaching includes, for example, the indication of and instruction regarding corrections to the swing made by the player 48, corrections methods, and the like. In this case as well, it is possible to compare swing indicators such as the grip acceleration, the grip velocity, the head velocity, the head acceleration, the head velocity component ratio, the swing trajectory, and the racket angular velocity. Also, change in the head velocity, the type of swing, and the like before and after coaching can be clarified from graphs similar to those of FIGS. 6 to 11. Comparing this qualitative data from before and after coaching makes it possible to clarify confirmation of the result of the instruction. Specifically, player 48 can precisely determine whether he has made a swing as instructed. As a result, it is possible to provide feedback for further instruction and the like, thus enabling a rise in the improvement speed of the player 48.

The analyzing method according to the first embodiment can be applied to racket frame fitting, string tension fitting, tennis coaching, and the like.

2. Second Embodiment

The following describes an analyzing apparatus, an analyzing system, and an analyzing program for analyzing a user's tennis racket swing movement according to a second embodiment of the present invention, with reference to the drawings.

2-1. Analyzing System Configuration

Figure 13:
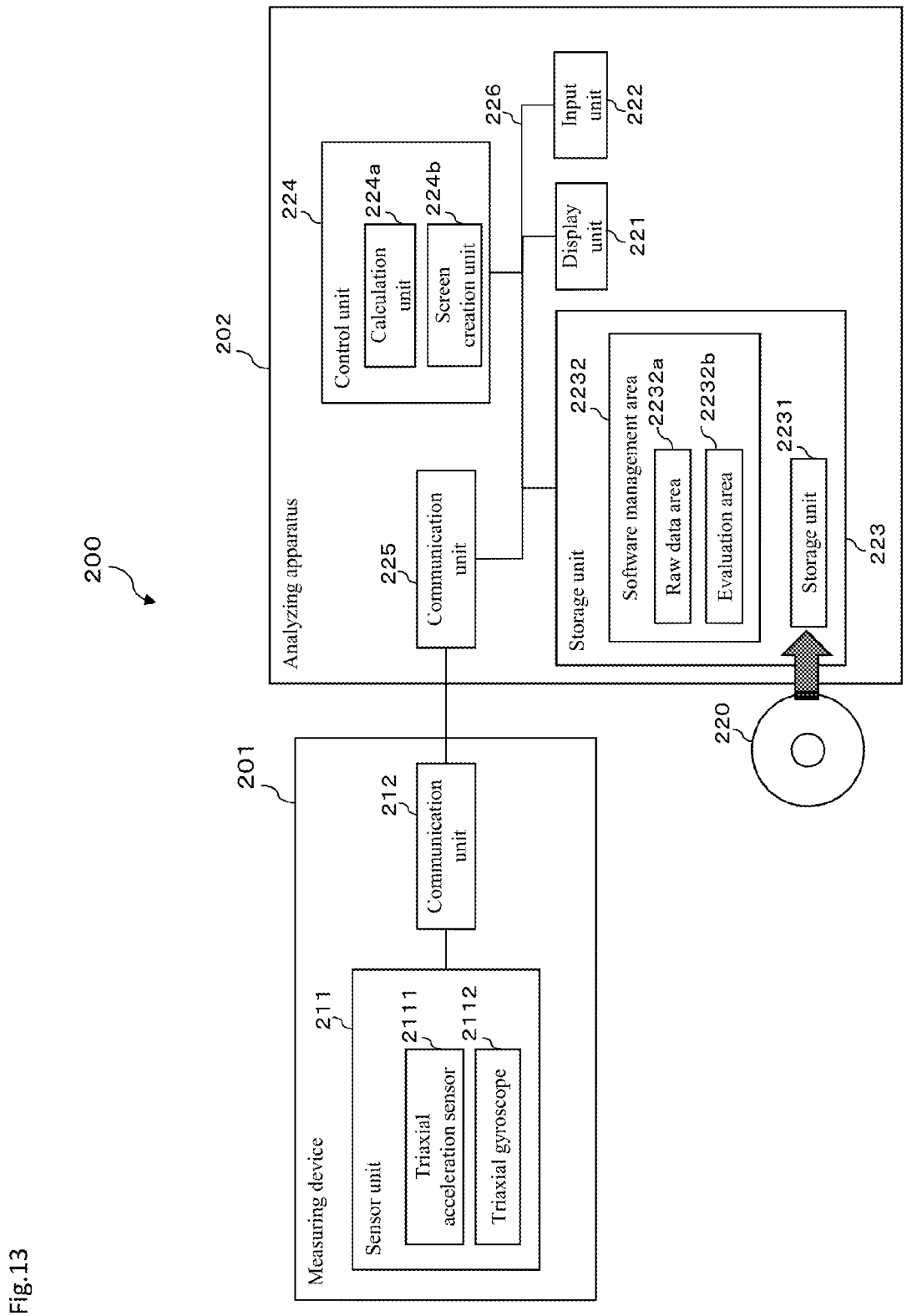
FIG. 13 is a block diagram showing a configuration of an analyzing system according to a second embodiment of the present invention.

As shown in FIG. 13, an analyzing system 200 according to an embodiment of the present invention includes a measuring device 201 that samples a user's swing movement of a tennis racket 210, and an analyzing apparatus 202 that analyzes a user's swing movement of the tennis racket 210 based on sampling data sent from the measuring device 201. In order to analyze the user's swing movement of a tennis racket 210 and mainly assist the user in the fitting of a tennis racket 210, the analyzing apparatus 202 presents a GUI that displays evaluation indicators related to the swing movement in a form that is intuitively understandable to the user. In other words, the analyzing system 200 is a system for assisting the user in selecting a tennis racket 210 that is suited to himself from among various tennis rackets 210, and would be mainly installed in tennis goods stores in which tennis rackets 210 are sold, tennis schools, and the like. Note that the term "swing" includes any action for swinging the tennis racket 210, such as not only a groundstroke, but also a volley, a serve, and the like. A groundstroke is when a tennis ball that has bounced off the ground of the tennis court one time is hit.

2-1-1. Measuring Device

Figure 14:
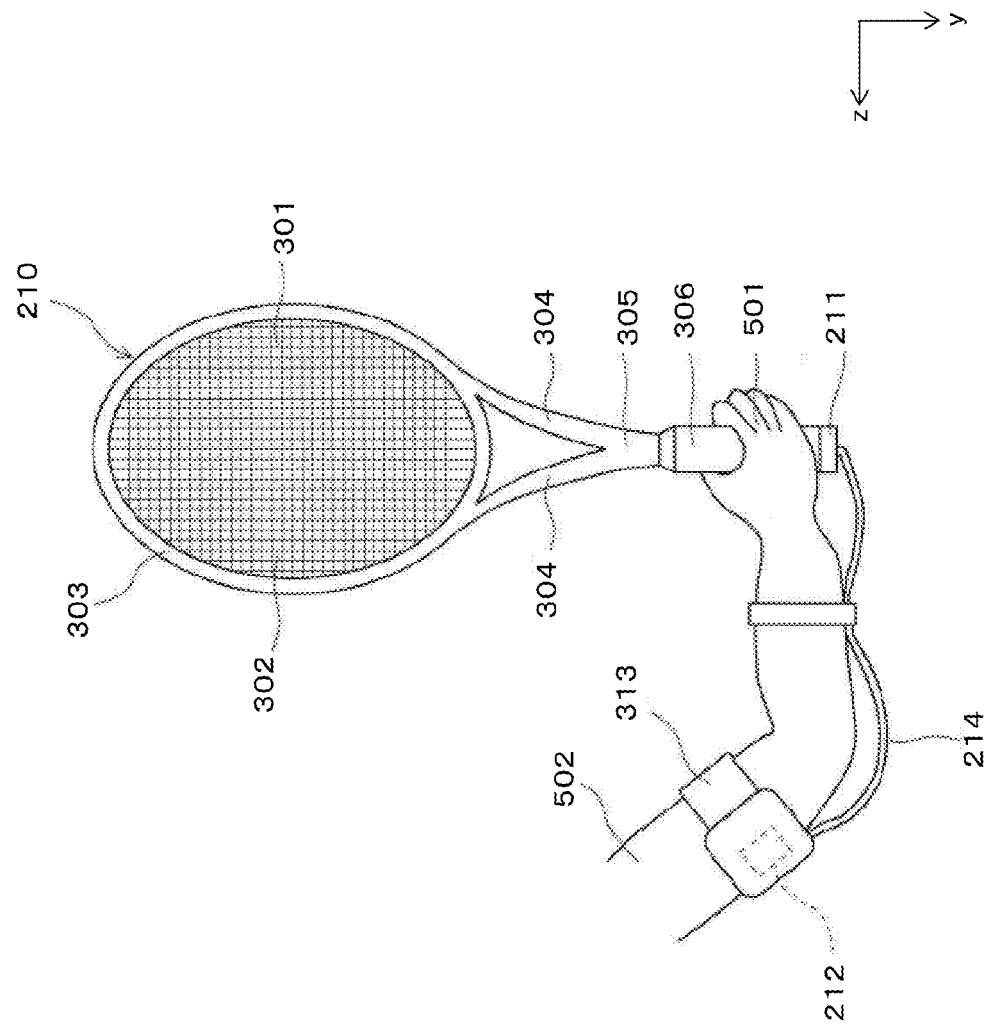
FIG. 14 is a diagram showing a configuration of a measuring device.

First, the measuring device 201 will be described with reference to FIG. 14 as well. As shown in FIG. 14, the measuring device 201 includes a sensor unit 211 that is attached to the tennis racket 210, and a communication unit 212 for transmitting measurement data sampled by the sensor unit 211 (sampling data) to the analyzing apparatus 202. The tennis racket 210 used here is a general tennis racket that has a head 303 with a face 302 formed by a string 301 that is vertically and horizontally stretched across the head 303. A pair of left and right throats 304 extends from one end of the head 303 to a shaft 305. Also, a grip 306 that is gripped by a player is connected to the shaft 305.

The sensor unit 211 of the measuring device 201 is attached to an end portion of the grip 306 so as to not hinder swing movements, and the communication unit 212 is attached to an upper arm 502 of a hand 501 that grips the grip 306 (the right hand in the example of FIG. 14). The sensor unit 211 includes a triaxial acceleration sensor 2111 and a triaxial gyroscope 2112 that respectively measure acceleration and angular velocity of the grip 306 in relative coordinates (x,y,z) that are based on the racket 210. As for the xyz relative coordinate system, the lengthwise direction of the shaft 305 of the racket 210 conforms to the y axis direction. The y axis direction is also parallel with the face 302. Also, the direction from the head 303 to the grip 306 is the positive y axis direction. The z axis direction is also parallel with the face 302, but the z axis is orthogonal to the y axis, and if the face 302 shown in FIG. 14 is considered to be the face of a clock, the direction from the three o'clock position to the nine o'clock position would be the positive z axis direction. Also, although not shown in FIG. 14, the x axis direction is orthogonal to the y axis and the z axis, and is perpendicular to the face 302. Moreover, the direction from the back side of the head 303 to the front side in the thickness direction is the positive x axis direction. The front side is the side that comes into contact with a tennis ball during a forehand stroke. These x, y, and z axes are relative axes to the racket 210, and the x, y, and z axes directions vary according to the position of the racket 210.

Figure 15:
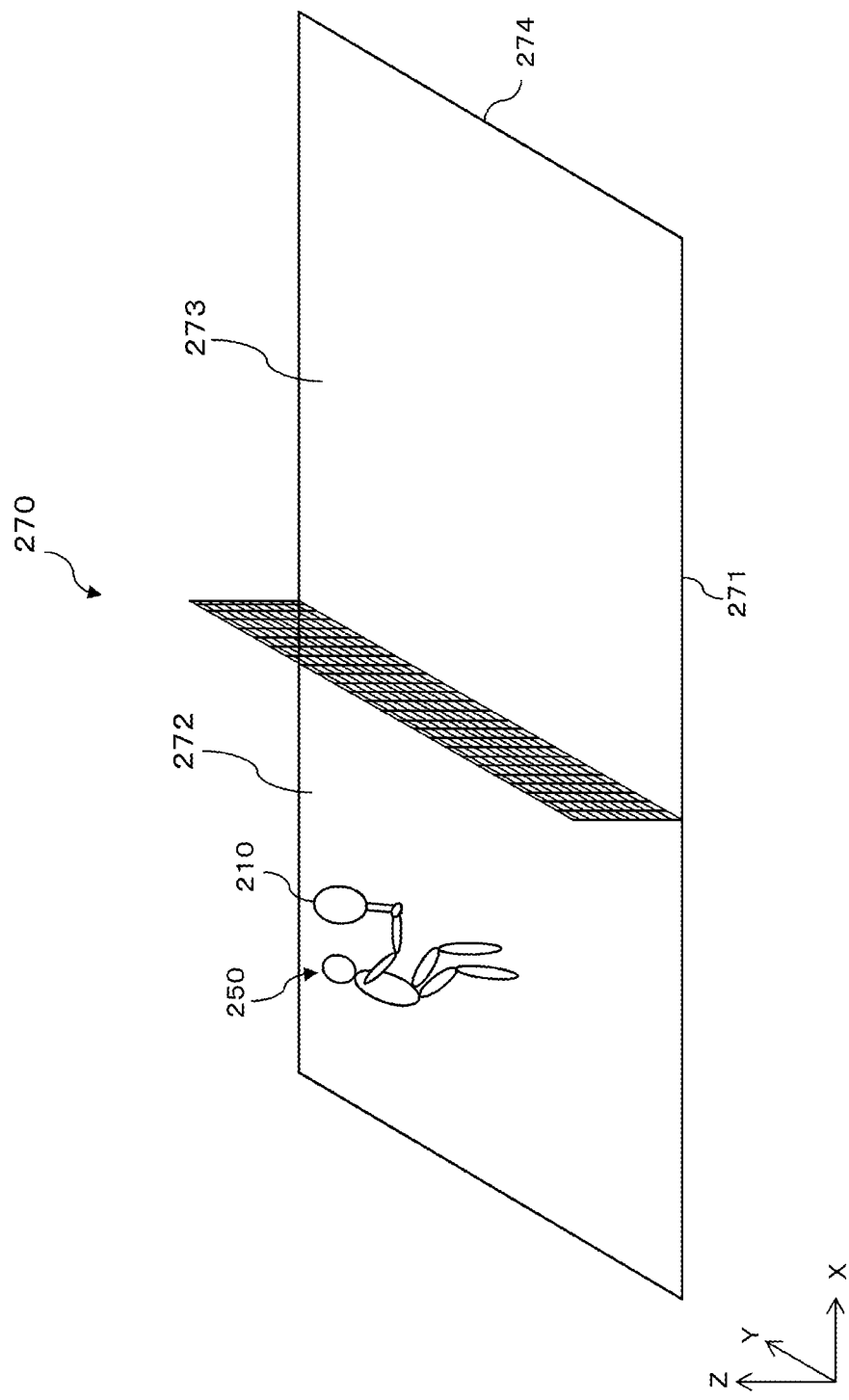
FIG. 15 is a perspective view of a tennis court.

In order to analyze the swing movement of the tennis racket 210 for returning a tennis ball that comes from straight ahead, evaluation indicators such as the velocity and the like of the racket 210 that are to be subjected to analysis need to be based on the fixed ground and space such as the tennis court. In other words, the velocity and the like of the racket 210 should be based on absolute coordinates (X,Y,Z) that are based on the fixed ground and space, not on the above-described relative coordinates (x,y,z). For this reason, the XYZ absolute coordinate system to the tennis court is also defined in the present embodiment. FIG. 15 is a perspective view showing a tennis court 270 where the analyzing system 200 is installed. A player 250 who performs a swing movement is shown in FIG. 15. This player 250 is right-handed, and is gripping the racket 210 with the right hand 501.

As shown in FIG. 15, the direction of a sideline 271 of the tennis court 270 conforms to the X axis direction. The direction from the player 250's own side 272 to an opponent's side 273 is the positive X axis direction. The direction of end lines 274 of the tennis court 270 conforms to the Y axis direction, and the direction from right to left from the viewpoint of the player 250 when facing the opponent's side 273 is the positive Y axis direction. Also, the Z axis direction is the vertical direction, and the upward direction is the positive Z axis direction. These X, Y, and Z axes are absolute axes based on the tennis court 270.

Returning to FIGS. 13 and 14, the measuring device 201 will continue to be described below. As shown in FIG. 14, the communication unit 212 is fixed to the upper arm 502 by a band 313 so as to not hinder swing movements made by the player 250. The sensor unit 211 and the communication unit 212 are connected by a cable 214, and thus the communication unit 212 receives data measured by the triaxial acceleration sensor 2111 and the triaxial gyroscope 2112 from the sensor unit 211 via the cable 214. The communication unit 212 wirelessly transmits this sampling data to the analyzing apparatus 202, but various types of communication systems can be applied. For example, it is possible to use near field communication via the so-called BlueTooth (registered trademark) system, a UWB (Ultra Wide Band) system, a wireless LAN (Local Area Network), or the like. Note that a battery (not shown) for driving the sensor unit 211 and the communication unit 212 is also fixed to the upper arm 502 by the band 313.

2-1-2. Analyzing Apparatus

The following describes the analyzing apparatus 202. The analyzing apparatus 202 is manufactured by an analyzing program 2231 that is stored on a computer-readable recording medium 220 such as a CD-ROM, a DVD-ROM, a Blu-ray disc, or a USB memory being installed in a general-purpose personal computer. The analyzing program 2231 is software for creating a later-described GUI screen by processing sampling data sent from the measuring system 1, and displaying the GUI screen on a display unit 221. The analyzing program 2231 causes the analyzing apparatus 202 to execute later-described operations.

The analyzing apparatus 202 has the display unit 221, an input unit 222, a storage unit 223, a control unit 224, and a communication unit 225. These units are connected to each other via a bus line 226, and thus can communicate with each other. In the present embodiment, the display unit 221 can be configured by a liquid crystal display or the like, and is a user interface for displaying a later-described screen and the like to the player 250 and the operator of the analyzing apparatus 202. Also, the input unit 222 can be configured by a mouse, a keyboard, a touch panel, or the like, and is a user interface for receiving user operations performed on the analyzing apparatus 202.

The storage unit 223 is configured from a storage device such as a hard disk, has the analyzing program 2231 stored therein, and has a software management area 2232 allocated therein. The software management area 2232 is an area that is to be used by the analyzing program 2231. A raw data area 2232a and an evaluation area 2232b are allocated in the software management area 2232. The roles of the areas 2232a and 2232b will be described later.

Also, the control unit 224 can be configured from a CPU, a ROM, a RAM, and the like. The control unit 24 virtually operates as a calculation unit 224a and a screen creation unit 224b as shown in FIG. 13 by reading out and executing the analyzing program 2231 stored in the storage unit 223. Operations of the units 224a and 224b will be described later.

Also, the communication unit 225 functions as a communication interface for receiving data from the communication unit 212 of the measuring device 201 as well as receiving data from an external storage apparatus such as a USB memory. Additionally, a printer, a plotter, and the like can be connected to the communication unit 225 as necessary.

2-2. Analyzing Method

The following describes analysis processing performed by the analyzing system 200 for analyzing a swing movement mainly for tennis racket 210 fitting. The analysis processing of the present embodiment includes three steps. Specifically, the three steps are a sampling step in which the measuring device 201 samples measured values of the acceleration and the angular velocity of the racket 210, a calculation step in which the analyzing apparatus 202 calculates swing movement evaluation indicators based on the sampling data obtained in the sampling step, and a screen creation step in which the analyzing apparatus 202 creates a GUI screen displaying a graph of the evaluation indicators. These steps will be described below in order.

2-2-1. Sampling Step

First, as for the sampling step, the user who is searching for a tennis racket 210 that is suited to himself is placed on the tennis court 270 as the player 250. The player 250 is then continuously supplied with tennis balls from another player or a tennis ball machine placed on the opponent's side 273. Note that it is preferable that the balls are supplied to the player 250 in a constant direction and at a constant velocity. While endeavoring to return the balls to the opponent's side 273, the player 250 swings the racket 210 held in his hand so as to continuously return the coming balls. In other words, the swing movements performed by the player 250 that are to be subjected to analysis by the analyzing system 200 are not so-called practice swings.

Figure 16:
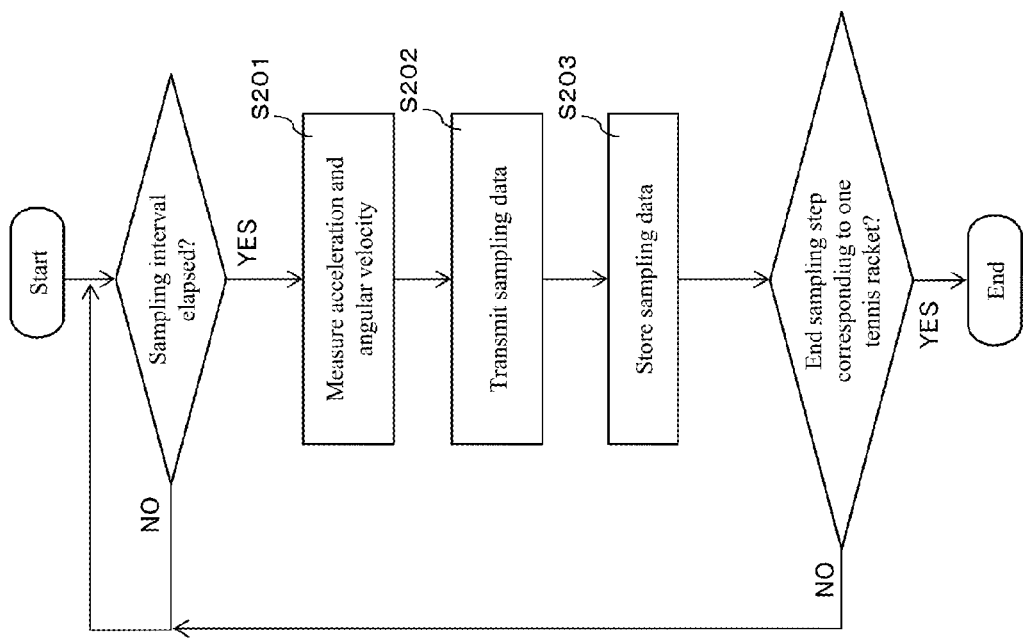
FIG. 16 is a flowchart showing a flow of processing in a swing movement sampling step.

Then, while the player 250 is performing the above-described swing movements, the measuring device 201 measures the acceleration and the angular velocity of the grip 306 of the tennis racket 210. Specifically, as shown in FIG. 16, at a predetermined sampling interval, the triaxial acceleration sensor 2111 measures $A(gx)$, $A(gy)$, and $A(gz)$, which are the x-axis, y-axis, and z-axis components of the acceleration of the grip 11 in the xyz relative coordinate system, and the triaxial gyroscope 2112 measures $\omega(gx)$, $\omega(gy)$, and $\omega(gz)$, which are the x-axis, y-axis, and z-axis components of the angular velocity of the grip 11 (step S201) in the xyz relative coordinate system. Although there are no particular limitations on the sampling interval, data can be obtained every $1/1000$ to $1/500$ sec, for example. The thus-measured data indicating the grip accelerations $A(gx)$, $A(gy)$, and $A(gz)$ and the grip angular velocities $\omega(gx)$, $\omega(gy)$, and $\omega(gz)$ is transmitted from the communication unit 212 to the communication unit 225 of the analyzing apparatus 202 from moment to moment (step S202). The data transmitted in this way is also stored in the raw data area 2321 of the storage unit 223 by the control unit 224 (step S203).

Note that the above-described swing movement is normally performed repeatedly with different types of candidate rackets 210. The different types of rackets 210 referred to here include, for example, rackets 210 that have different frame sizes, masses, or the like, and rackets 210 that have different types of string 301. In the present embodiment, the swing movement is performed a predetermined sample number of times (e.g., 5 times) for each racket 210, and data indicating the grip accelerations $A(gx)$, $A(gy)$, and $A(gz)$ and the grip angular velocities $\omega(gx)$, $\omega(gy)$, and $\omega(gz)$ is sampled for the predetermined sample number of swing movements. This is done in order to accurately evaluate compatibility between the user and each racket 210 by averaging data regarding plural swing movements performed with the same racket 210. This also enables evaluating the stability of the swing movement performed with a specific racket 210. Accordingly, it is preferable that the sample number is approximately 3 to 10, for example. Note that in the present embodiment, if a hit ball does not fall on the opponent's side 273, that swing movement is excluded from the sample number count and not subjected to the subsequent analysis. Similarly, even when a hit tennis ball falls on the opponent's side 273, if it is clearly a mishit, that swing movement is excluded from the sample number count and not subjected to the subsequent analysis.

The control unit 224 determines start and end times of the predetermined sample number of swing movements corresponding to one racket 210, and stores the sampling data transmitted from the sensor unit 211 in the raw data area 2232a in a manner so as to be separated for each racket 210. This is because in the analyzing apparatus 202, sampling data corresponding to one racket 210 is the unit of swing movement analysis. Note that the processing in FIG. 16 starts at the time of the start of swing movement corresponding to one racket 210, and ends at the time when such swing movement ends. In other words, the processing of FIG. 16 is repeatedly executed for each unit of swing movement analysis. Note that although there are no particular limitations on the method by which the analyzing apparatus 202 determines the start and end times of swing movement corresponding to one racket 210, one conceivable example is a method in which the operator inputs the start/end times via the input unit 222. It should also be noted that the operator referred to here may be the player 250 himself, a salesclerk at a tennis goods store, a coach at a tennis school, or the like. Note that a configuration is possible in which the sampling data is not transmitted from the sensor unit 211 to the analyzing apparatus 202 from moment to moment as measurement is performed, but rather is temporarily saved in a predetermined storage unit provided in the sensor unit 211, and then collectively transmitted to the analyzing apparatus 202 when swing movement corresponding to one or plural rackets 210 has ended.

2-2-2. Evaluation Indicator Calculation Step

The following describes the evaluation indicator calculation step. Each time the sampling step corresponding to one racket 210 ends, the calculation unit 224a of the control unit 224 calculates swing movement evaluation indicators by referencing part or all of the data indicating the grip accelerations A(gx), A(gy), and A(gz) and the grip angular velocities ω(gx), ω(gy), and ω(gz) stored in the raw data area 2232a of the storage unit 223. The evaluation indicator referred to here is the velocity, the acceleration, the angular velocity, or the position of the tennis racket 210, or a variable defined by an arbitrary combination of these values, and may be expressed quantitatively, or may be expressed qualitatively using "high", "moderate", and "low", or the like. Also, "arbitrary combination" refers to the combining of physical quantities in an arbitrary form while performing a calculation such as multiplication by a coefficient or addition/subtraction/multiplication/division one or multiple times. In other words, the evaluation indicator can be thought to be a variable defined using a physical quantity that indicates the behavior of the tennis racket 210 during a swing movement. Evaluation indicators in the present embodiment include the grip acceleration, the grip velocity, the head velocity, the head acceleration, the head velocity component ratio, and the swing trajectory in the XYZ absolute coordinate system, and the racket angular velocity in the xyz relative coordinate system. These evaluation indicators will be described below.

Grip Acceleration

The grip acceleration in the XYZ absolute coordinate system is calculated based on the data indicating the grip accelerations A(gx), A(gy), and A(gz) in the xyz relative coordinate system and the grip angular velocities ω(gx), ω(gy), and ω(gz) in the xyz relative coordinate system. More specifically, the calculation unit 224a converts the grip accelerations A(gx), A(gy), and A(gz) per time instant into A(gX), A(gY), and A(gZ), which are the X-axis, Y-axis, and Z-axis components of the grip acceleration per time instant, based on the grip angular velocities ω(gx), ω(gy), and ω(gz) per time instant. The quaternions used in this conversion are expressed by the following mathematical expressions.

$$Q=[\cos(\theta); \omega(gx)/\theta^*\sin(\theta/2), \omega(gy)/\omega^*\sin(\theta/2), \omega(gz)/\theta^*\sin(\theta/2)]$$

$$R=[\cos(\theta); -\omega(gx)/\theta^*\sin(\theta/2), -\omega(gy)/\theta^*\sin(\theta/2), -\omega(gz)/\theta^*\sin(\theta/2)]$$

The value of θ in these mathematical expressions is obtained by the following mathematical expression.

$$\theta=SQRT(\omega(gx)^2+\omega(gy)^2+\omega(gz)^2)$$

Next, the calculation unit 224a calculates the magnitude A(g) of the grip acceleration per time instant in the XYZ absolute coordinate system based on the grip accelerations A(gX), A(gY), and A(gZ) per time instant in the XYZ absolute coordinate system. This calculation is performed based on the following mathematical expression.

$$A(g)=SQRT(A(gX)^2+A(gY)^2+A(gZ)^2)$$

Then, from among the magnitudes A(g) of the grip acceleration per time instant, the calculation unit 224a selects the magnitude A(g) at which the later-described magnitude V(h) of the head velocity is the highest, as the highest grip acceleration AA(g). The calculation unit 224a then stores the grip accelerations A(gX), A(gY), and A(gZ) per time instant, the magnitudes A(g) of the grip acceleration per time instant, and the highest grip acceleration AA (g) in the evaluation area 2322 as evaluation indicators.

Grip Velocity

The grip velocity in the XYZ absolute coordinate system is calculated based on the data indicating the grip accelerations A(gX), A(gY), and A(gZ) in the XYZ absolute coordinate system. More specifically, the calculation unit 224a calculates V(gX), V(gY), and V(gZ), which are the X-axis, Y-axis, and Z-axis components of the grip velocity per time instant, based on the following mathematical expressions.

$$\Delta V(gX)=A(gX)^*\Delta T$$

$$\Delta V(gY)=A(gY)^*\Delta T$$

$$\Delta V(gZ)=A(gZ)^*\Delta T$$

In the above mathematical expressions, ΔT indicates a micro time (the above-described sampling interval), and ΔV(gX), ΔV(gY), and ΔV(gZ) indicate the amount of increase in V(gX), V(gY), and V(gZ) in the micro time ΔT. The value of ΔT is appropriately input to the analyzing apparatus 202 by the operator.

Subsequently, the calculation unit 224a calculates the magnitude V(g) of the grip velocity per time instant in the XYZ absolute coordinate based on the grip velocities V(gX), V(gY), and V(gZ) per time instant in the XYZ absolute coordinate system. This calculation is performed based on the following mathematical expression.

$$V(g)=SQRT(V(gX)^2+V(gY)^2+V(gZ)^2)$$

Then, from among the magnitudes V(g) of the grip velocity per time instant, the calculation unit 224a selects the magnitude V(g) at which the later-described magnitude V(h) of the head velocity is the highest, as the highest grip velocity VV(g). The calculation unit 224a then stores the grip velocities V(gX), V(gY), and V(gZ) per time instant, the magnitudes V(g) of the grip velocity per time instant, and the highest grip velocity VV(g) in the evaluation area 2232b as evaluation indicators.

Head Velocity

The head velocity in the XYZ absolute coordinate system is calculated based on data indicating the grip accelerations A(gx), A(gy), and A(gz) in the xyz relative coordinate system, the grip angular velocities ω(gx), ω(gy), and ω(gz) in the xyz relative coordinate axis system, and the racket length. The data indicating the racket length is appropriately input to the analyzing apparatus 202 by the operator. Specifically, first, the calculation unit 224a calculates the grip velocities V(gX), V(gY), and V(gZ) per time instant in the XYZ absolute coordinate system using the above-described mathematical expressions. The calculation unit 224a then calculates the rotation matrix RM using the above-described quaternions. The calculation unit 224a furthermore calculates a velocity vector Vr from rotation per time instant in the XYZ absolute coordinate system based on the following mathematical expression.

$$Vr=cross(\omega,tV)^*RM$$

In this mathematical expression, cross(ω,tV) is the exterior product of the angular velocity vector ω per time instant in the xyz relative coordinate system and the racket length vector tV.

Subsequently, the calculation unit 224a calculates V(hX), V(hY), and V(hZ), which are the X-axis, Y-axis, and Z-axis components of the head velocity per time instant, using the following mathematical expressions.

$$V(hX)=V(gX)+Vr(X)$$

$$V(hY)=V(gY)+Vr(Y)$$

$$V(hZ)=V(gZ)+Vr(Z)$$

Subsequently, the calculation unit 224a calculates the magnitude V(h) of the head velocity per time instant in the XYZ absolute coordinate system based on the head velocities V(hX), V(hY), and V(hZ) per time instant in the XYZ absolute coordinate system. This calculation is performed based on the following mathematical expression.

$$V(h)=SQRT(V(hX)^2+V(hY)^2+V(hZ)^2)$$

The calculation unit 224a then selects the highest magnitude V(h) among the magnitudes V(h) of the head velocity per time instant as the highest head velocity VV(h). The calculation unit 224a then stores the head velocities V(hX), V(hY), and V(hZ) per time instant, the magnitudes V(h) of the head velocity per time instant, and the highest head velocity VV(h) in the evaluation area 2232b as evaluation indicators. Note that the head velocity gradually increases from when the swing movement starts, and then rapidly decreases upon impact between the tennis racket 210 and the tennis ball. Accordingly, the time instant at which the highest head velocity VV(h) is obtained is the time instant immediately before impact, which is thought to be the time instant that is suited to determining compatibility between the player 250 and the racket 210. Note that although the head velocities in the absolute coordinate system are calculated based on the measured values of the grip velocity and the grip angular velocity in the relative coordinate system, a configuration is possible in which the sensor unit 211 is attached to the tip of the head 303 and measures head acceleration in the relative coordinate system, and the head velocity in the absolute coordinate system is obtained based on values obtained by converting the head acceleration into the absolute coordinate system.

Head Acceleration

The head acceleration in the XYZ absolute coordinate system is calculated based on the head velocities V(hX), V(hY), and V(hZ) in the XYZ absolute coordinate system. More specifically, the calculation unit 224a calculates A(hX), A(hY), and A(hZ), which are the X-axis, Y-axis, and Z-axis components of the head acceleration per time instant, by performing temporal differentiation on V(hX), V(hY), and V(hZ), which are the X-axis, Y-axis, and Z-axis components of the head velocity per time instant.

Subsequently, the calculation unit 224a calculates the magnitude A(h) of the head acceleration per time instant in the XYZ absolute coordinate system based on the head accelerations A(hX), A(hY), and A(hZ) per time instant in the XYZ absolute coordinate system. This calculation is performed based on the following mathematical expression.

$$A(h)=SQRT(A(hX)^2+A(hY)^2+A(hZ)^2)$$

From among the magnitudes A(h) of the head acceleration per time instant, the calculation unit 224a selects the magnitude A(h) at which the magnitude V(h) of the head velocity is the highest (immediately before impact), as the highest head acceleration AA(h). The calculation unit 224a then stores the head accelerations A(hX), A(hY), and A(hZ) per time instant, the magnitudes A(h) of the head acceleration per time instant, and the highest head acceleration AA(h) in the evaluation area 2232b as evaluation indicators. Note that although the head acceleration in the absolute coordinate system is calculated based on the measured values of the grip velocity and the grip angular velocity in the relative coordinate system, a configuration is possible in which the sensor unit 211 is attached to the tip of the head 303 and measures head acceleration in the relative coordinate system, and this head acceleration is converted into the absolute coordinate system.

Head Velocity Component Ratio

The head velocity component ratio I in the XYZ absolute coordinate system is calculated based on data indicating the grip accelerations A(gx), A(gy), and A(gz) in the xyz relative coordinate system, the grip angular velocities ω(gx), ω(gy), and ω(gz) in the xyz relative coordinate axis system, and the racket length. Specifically, first, the calculation unit 224a calculates V(hX) and V(hZ), which are the X-axis and Z-axis components of the head velocity per time instant in the XYZ absolute coordinate system using the previously-described mathematical expressions. Subsequently, the calculation unit 224a calculates the head velocity component ratio I per time instant in the XYZ absolute coordinate system based on the following mathematical expression.

$$I=V(hZ)/V(hX)$$

From among the head velocity component ratios I per time instant, the calculation unit 224a selects the head velocity component ratio I at which the magnitude V(h) of the head velocity is the highest (immediately before impact), as the highest head velocity component ratio II. The calculation unit 224a then stores the head velocity component ratios I per time instant and the highest head velocity component ratio II in the evaluation area 2232b as evaluation indicators. Note that although the head velocity component ratios are calculated based on the measured values of the grip velocity and the grip angular velocity in the relative coordinate system, a configuration is possible in which the sensor unit 211 is attached to the tip of the head 303 and measures head acceleration in the relative coordinate system, and the head velocity component ratio I is obtained based on values obtained by converting the head acceleration into the absolute coordinate system.

Swing Trajectory

The swing trajectory in the XYZ absolute coordinate system is calculated based on data indicating the grip accelerations A(gx), A(gy), and A(gz) in the xyz relative coordinate system, the grip angular velocities ω(gx), ω(gy), and ω(gz) in the xyz relative coordinate axis system, and the racket length. Specifically, first, the calculation unit 224a calculates the grip velocities V(gX), V(gY), and V(gZ) per time instant in the XYZ absolute coordinate system using the above-described mathematical expressions. Subsequently, the calculation unit 224a calculates P(gX), P(gY), and P(gZ), which are the X-axis, Y-axis, and Z-axis components of the position of the grip 306 per time instant, based on the grip velocities V(gX), V(gY), and V(gZ) using the following mathematical expressions.

$$\Delta P(gX)=V(gX)*\Delta T$$

$$\Delta P(gY)=V(gY)*\Delta T$$

$$\Delta P(gZ)=V(gZ)*\Delta T$$

In the above mathematical expressions, ΔT indicates a micro time (the above-described sampling interval), and ΔP(gX), ΔP(gY), and ΔP(gZ) indicate the amount of increase in P(gX), P(gY), and P(gZ) in the micro time ΔT.

The calculation unit 224a also calculates a relative position P(h) of the top of the head 303 per time instant with respect to the grip 306 using the following mathematical expression.

$$P(h)=tV*RM$$

In this mathematical expression, tV is the above-described racket length vector, and RM is the above-described rotation matrix. The calculation unit 224a calculates the absolute coordinates (Xt,Yt,Zt) of the top of the head 303 per time instant using the following mathematical expression, and stores them in the evaluation area 2232b as an evaluation indicator. The absolute coordinates (Xt,Yt,Zt) per time instant refers to the trajectory of the racket 210.

$$(Xt,Yt,Zt)=P(g)+P(h)$$

The calculation unit 224a calculates the movement distance $J_X$ of the head 303 in the absolute coordinate axis X direction from times t0 to t using the following mathematical expression.

$$J_X=(Xt-Xt0)$$

The calculation unit 224a calculates the movement distance $J_Y$ of the head 303 in the absolute coordinate axis Y direction from times t0 to t using the following mathematical expression.

$$J_Y=(Yt-Yt0)$$

The calculation unit 224a calculates the movement distance $J_Z$ of the head 303 in the absolute coordinate axis Z direction from times to t0 t using the following mathematical expression.

$$J_Z=(Zt-Zt0)$$

The movement distances $J_X$, $J_Y$, and $J_Z$ are stored in the evaluation area 2232b as evaluation indicators.

Movement distances $J_X$, $J_Y$, and $J_Z$ in various time zones can be calculated. For example, the movement distances $J_X$, $J_Y$, and $J_Z$ from t seconds before impact to impact can be calculated. Also, the movement distances $J_X$, $J_Y$, and $J_Z$ from impact to t seconds after impact can be calculated.

Racket Angular Velocity

The racket angular velocity in the xyz relative coordinate system is the grip angular velocity ω(gy) about the y axis, which is a measured value obtained by the triaxial gyroscope 2112. Accordingly the grip angular velocity ω(gy) per time instant is stored in the evaluation area 2232b as the racket angular velocity per time instant, which is an evaluation indicator. Also, from among the grip angular velocities ω(gy) per time instant, the calculation unit 224a selects the grip angular velocity ω(gy) at which the magnitude V(h) of the head velocity is the highest, as the highest racket angular velocity ωω, and stores it in the evaluation area 2232b as an evaluation indicator.

Note that as already described, the swing movement is performed the predetermined sample number of times for each racket 210 in the sampling step. Accordingly, if the sample number is greater than 1, the above-described evaluation indicators are calculated multiple times for each racket 210. In this case, the calculation unit 224a obtains an average for each type of evaluation indicator for each racket 210, and also stores the average values in the evaluation area 2232b as evaluation indicators.

2-2-3. GUI Screen Creation Step

Figure 17:
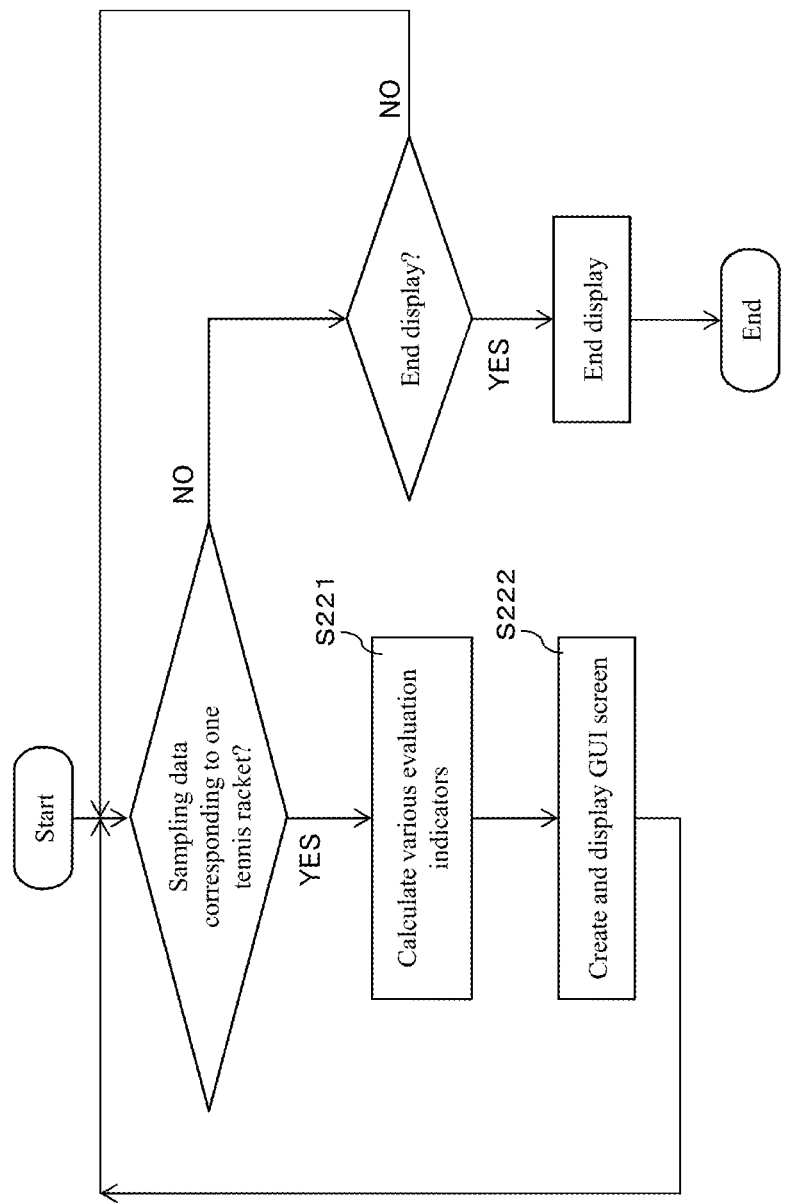
FIG. 17 is a flowchart showing a flow of processing in an evaluation indicator calculation step and a GUI screen creation step.

The following describes the GUI screen creation step, describing the above-described evaluation indicator calculation step as well, with reference to FIG. 17. The processing shown in FIG. 17 starts at the time of the end of the sampling step corresponding to the first racket 210.

First, in step S221, the screen creation unit 224b of the control unit 224 calculates the various evaluation indicators described above based on sampling data corresponding to one racket 210.

Subsequently, in step S222, the screen creation unit 224b creates a GUI screen in which the various evaluation indicators that were calculated in step S221 and stored in the evaluation area 2232b are directly displayed or appropriately manipulated and displayed in various formats such as a table format or a graph format, and displays the GUI screen on the display unit 221. Examples of the various items displayed in the GUI screen will be described later.

As shown in FIG. 17, the above-described steps S221 and S222 are repeatedly executed on the sampling data corresponding to each racket 210 before the operator inputs an instruction to end the display of the GUI screen via the input unit 222. When the operator inputs an instruction to end the display of the GUI screen via the input unit 220, the control unit 224 ends the display of the GUI screen on the display unit 221, and ends the processing shown in FIG. 17. At that time, the swing movement analysis processing also ends.

Note that in the GUI screen displayed immediately after the execution of step S222 on the sampling data corresponding to the first racket 210, the various evaluation indicators corresponding to the sampling data for that one racket 210 are displayed in a table format or a graph format. Thereafter, the GUI screen on the display unit 221 is updated to a new screen each time step S222 is repeated. Specifically, each time the GUI screen is updated, in the GUI screen, the number of data rows in a later-described table list T1 increases, the number of bold lines plotted in later-described graph areas G1 and G2 increases, the number of later-described graph areas G3 increases, and the number of points plotted in the later-described graph area G4 increases. Accordingly, if only the swing movements of one racket 210 are sampled, there will be one row in the later-described table list T1, there will be only one bold line plotted in the later-described graph areas G1 and G2, there will also be only one later-described graph area G3, and there will also be only one point plotted in the graph area G4. In this way, sampling only the swing movements for one racket 210 is useful in analyzing and improving swing movements made by the player 250 using a specific racket (e.g., the player's own racket).

2-3. Various Items in GUI Screen

The following describes various items displayed in the GUI screen.

2-3-1. Table List of Evaluation Indicators

The screen creation unit 224b displays the table list T1 shown in FIG. 25 in the GUI screen by appropriately referencing the evaluation indicators stored in the evaluation area 232. The table list T1 is provided with fields for displaying the highest grip velocity VV(g), the highest grip acceleration AA(g), the highest head velocity VV(h), the highest head acceleration AA(h), the highest head velocity component ratio II, and the highest racket angular velocity ωω. As described above, these evaluation indicators are derived the sample number of times for each racket 210, but their average values are displayed in the table list T1.

Here, if the highest grip velocity VV(g) is high, it means that the player 250 had little arm strain and hand looseness, and this therefore means that that racket 210 is a good match for the player 250. Accordingly, the highest grip velocity VV(g) is material for determining whether that racket 210 is suited to the player 250. In fitting, a racket 210 whose highest grip velocity VV(g) is greater than the highest grip velocity VV(g) of a reference racket is recommended to the player 250. The reference racket is the racket regularly used by the player 250, for example. Accordingly, if the player 250's own racket is one of the tennis rackets 210 used during swing movement measurement (referred to hereinafter as the target racket group), it is possible to select a new racket 210 by comparing it with the player's current racket. The same follows for the other items displayed in the GUI screen.

Also, if the highest grip acceleration AA(g) is high, it means that the player 250 had little arm strain and hand looseness and that the player 250 was able to forcefully hit the tennis ball, and this therefore means that that racket 210 is a good match for the player 250. Accordingly, the highest grip acceleration AA(g) is material for determining whether that racket 210 is suited to the player 250. In fitting, a racket 210 whose highest grip acceleration AA(g) is greater than the highest grip acceleration AA(g) of the reference racket is recommended to the player 250.

Also, if the highest head velocity VV(h) is high, it means that the player 250 was able to forcefully hit the tennis ball, and this therefore means that that racket 210 is a good match for the player 250. Accordingly, the highest head velocity VV(h) is material for determining whether that racket 210 is suited to the player 250. In fitting, a racket 210 whose highest head velocity VV(h) is greater than the highest head velocity VV(h) of the reference racket is recommended to the player 250.

Also, if the highest head acceleration AA(h) is high, it means that the player 250 was able to forcefully hit the tennis ball by applying greater kinetic energy, and this therefore means that that racket 210 is a good match for the player 250. Accordingly, the highest head acceleration AA(h) is material for determining whether that racket 210 is suited to the player 250. In fitting, a racket 210 whose highest head acceleration AA(h) is greater than the highest head acceleration AA(h) of the reference racket is recommended to the player 250.

Also, the highest head velocity component ratio II is correlated with the type of swing made by the player 250. Here, the following can generally be said. Specifically, with a swing in which the highest head velocity component ratio II has a high absolute value and is a positive value, topspin tends to be applied to the tennis ball. With a swing in which the highest head velocity component ratio II has a high absolute value and is a negative value, slice spin tends to be applied to the tennis ball. With a swing in which the highest head velocity component ratio II has an absolute value close to zero, spin tends to not be applied to the tennis ball.

As shown in FIG. 25, the table list T1 is provided with a field that shows the highest head velocity component ratio II itself as well as a field that shows the type of swing that can be determined based on the highest head velocity component ratio II. Accordingly, viewing the table list T1 enables selecting a racket 210 that is suited to the type of swing made by the player 250. Note that the type of swing is determined by the calculation unit 224a using the following algorithm. Specifically, the calculation unit 224a determines whether the highest head velocity component ratio II is greater than or equal to 0.60, greater than or equal to 0.25 and less than 0.60, greater than or equal to 0.00 and less than 0.25, or less than 0.00. If the highest head velocity component ratio II is greater than or equal to 0.60, the swing type is determined to be the topspin type; if greater than or equal to 0.25 and less than 0.60, the swing type is determined to be the drive type; if greater than or equal to 0.00 and less than 0.25, the swing type is determined to be the flat type; and if less than 0.00, the swing type is determined to be the slice type.

Also, if the highest racket angular velocity $\omega\omega$ is a positive value, it means that the swing is of the swing type in which the tennis ball is hit while the face 302 is closed. Note that with the highest racket angular velocity $\omega\omega$, the positive direction is the clockwise direction when viewing the racket 210 from the direction facing the grip 306 from the head 303 along the axis of the grip 306. Also, if the highest racket angular velocity $\omega\omega$ is a negative value, it means that the swing is of the swing type in which the tennis ball is hit while the face 302 is open. Accordingly, viewing the value of the highest racket angular velocity $\omega\omega$ in the table list T1 enables selecting a racket 210 that is suited to the type of swing made by the player 250. Also, similarly to the case of the type of swing based on the highest head velocity component ratio II, the table list T1 may be provided with a field showing the highest racket angular velocity $\omega\omega$ itself as well as a field showing the type of swing based on the highest racket angular velocity $\omega\omega$. Note that since the type of swing based on the highest head velocity component ratio II and the highest racket angular velocity $\omega\omega$ caw is obtained by qualitatively evaluating the highest head velocity component ratio II and the highest racket angular velocity $\omega\omega$, in this sense it can be said that these types of swings are also swing movement evaluation indicators.

Also, if the highest racket angular velocity $\omega\omega$ is high, it means that there is a large amount of control of the surface of the racket 210 by the player 250, which means that that racket 210 is not a good match for the player 250. Accordingly, the highest racket angular velocity $\omega\omega$ is material for determining whether that racket 210 is suited to the player 250. In fitting, a racket 210 whose highest racket angular velocity $\omega\omega$ is less than the highest racket angular velocity $\omega\omega$ of the reference racket is recommended to the player 250.

It should be noted that the rows included in the table list T1 (five rows in FIG. 25) are in one-to-one correspondence with the rackets in the target racket group. Specifically, each row in the table list T1 corresponds to a unit of swing movement analysis, and each row is provided with a field displaying the name of the corresponding racket. Accordingly, the table list T1 is data that displays multiple evaluation indicators at the same time in the form in which the evaluation indicators are associated with respectively corresponding tennis rackets 210. As a result, the operator can easily compare specific types of evaluation indicators between rackets in the target racket group by looking up and down the table list T1. Also, the operator can make a comprehensive determination regarding the compatibility between a specific tennis racket 210 and the player 250 based on multiple types of evaluation indicators by looking across the table list T1.

Also, as shown in FIG. 25, the table list T1 is provided with a "recommended racket" field that shows whether the rackets 210 corresponding to the rows are suited to the player 250. More specifically, a comprehensive indicator expression whose parameters are the various evaluation indicators and a later-described variation value is stored in the software management area 2232 of the storage unit 223. The screen creation unit 224b obtains a comprehensive indicator value for each racket 210 by substituting the various evaluation indicators and the later-described variation value corresponding to that racket 210 into the comprehensive indicator expression. The screen creation unit 224b then compares the comprehensive indicator values with a predetermined threshold value and selects one or more specific rackets 210 that are suited to the player 250 from the target racket group. The screen creation unit 224b then adds a "O" (circle) sign to the "recommended racket" field of the rows that correspond to the selected one or more rackets 210 in the table list T1, and adds an "X" (cross) sign to the same field of the remaining rows. In other words, here, the screen creation unit 224b indirectly compares the various evaluation indicators and the later-described variation values via a threshold value in the target racket group, and displays the results of that comparison. However, instead of or in addition to this aspect, a configuration is possible in which the comprehensive indicator values corresponding to the rackets 210 included in the target racket group are directly compared with each other, and a ranking or the like of the rackets 210 included in the target racket group is displayed in the GUI screen as the result of the comparison.

Also, instead of or in addition to the above-described aspect of comparing the rackets 210 included in the target racket group with each other using comprehensive indicators, the screen creation unit 224*b* may compare the rackets 210 included in the target racket group with each other separately for each type of evaluation indicator. In this case as well, the screen creation unit 224*b* can display a ranking or the like of the rackets 210 included in the target racket group in the GUI screen as the result of the comparison.

2-3-2. Swing Trajectory

Figure 18:
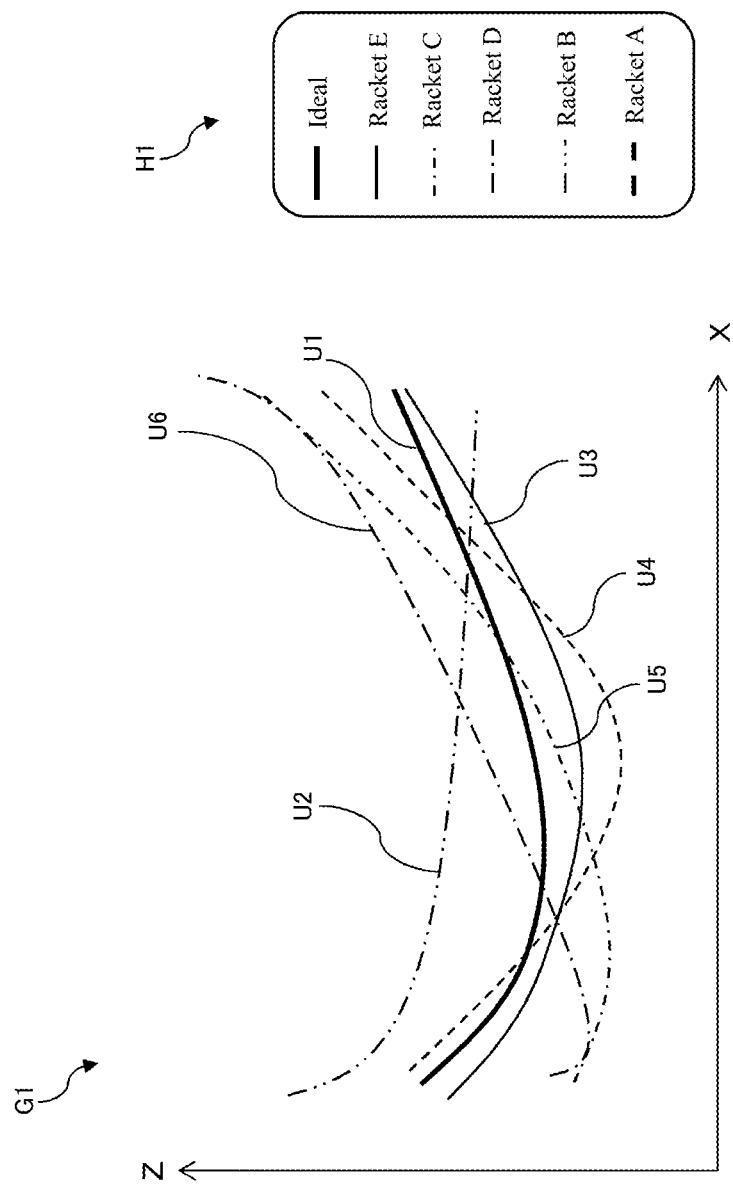
FIG. 18 is a diagram showing a swing trajectory graph.

As shown in FIG. 18, the screen creation unit 224*b* displays a graph area G1 in the GUI screen. In the graph area G1, the screen creation unit 224*b* displays objects of lines U2 to U6 and a line U1 at the same time. The lines U2 to U6 indicate the swing trajectories corresponding to the rackets 210 included in the target racket group and the line U1 indicates an ideal swing trajectory. Although the swing trajectory is derived the sample number of times for each racket 210 as described above, the average value of the swing trajectories is displayed in the graph area G1. The lines U2 to U6 are plots of the X-axis and Z-axis components of the swing trajectory. Note that although the graph area G1 is a two-dimensional area in which the X axis and the Z axis are displayed as the mutually orthogonal horizontal axis and vertical axis, there is no limitation to only a combination of the X axis and the Z axis, and any two axes selected from among the X axis, the Y axis, and the Z axis may be displayed as the mutually orthogonal horizontal axis and vertical axis. Also, the X axis, the Y axis, and the Z axis may be displayed three-dimensionally.

Also, next to the graph area G1, the screen creation unit 224*b* displays a legend H1 at the same time. The legend H1 associates the lines U1 to U6 with the names of the rackets 210 (product numbers or the like). Accordingly, the operator can easily find out which of the lines U2 to U6 correspond to which of the rackets 210. Accordingly, this graph can also be said to be data that displays multiple evaluation indicators (swing trajectories) at the same time in the form in which the evaluation indicators are associated with respectively corresponding rackets 210. As a result, the operator can understand the swing trajectories of the rackets 210 by viewing the lines U1 to U6. The operator can also easily compare the rackets 210 included in the target racket group from the viewpoint of the swing trajectory by viewing the lines U1 to U6.

Also, a configuration is possible in which the screen creation unit 224*b* compares the swing trajectory of each racket 210 included in the target racket group with the ideal swing trajectory, determines whether the racket 210 is suited to the player 250, and displays a ranking or the like of the rackets 210 included in the target racket group in the GUI screen as the result of the comparison.

2-3-3. Graph of Highest Head Velocity Component Ratio II

Figure 19:
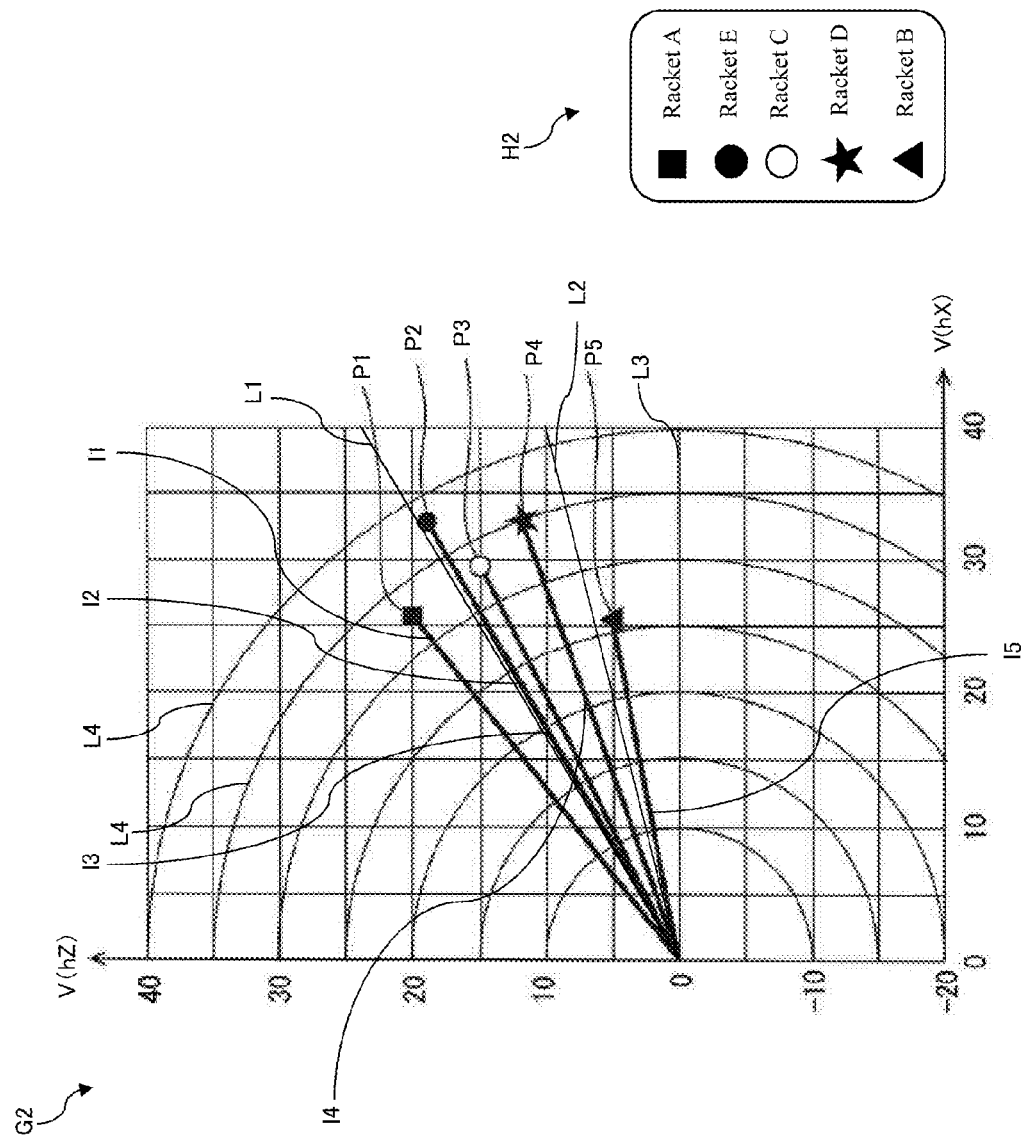
FIG. 19 is a diagram showing a highest head velocity component ratio graph.

As shown in FIG. 19, the screen creation unit 224*b* displays a graph area G2 in the GUI screen. In the graph area G2, the screen creation unit 224*b* displays objects of bold lines 11 to 15 at the same time. The bold lines 11 to 15 corresponds to the rackets 210 included in the target racket group. Here, the horizontal axis in the graph area G2 indicates the head velocity V(hX) in the X axis direction at the time instant when the highest head velocity VV(h) is obtained, and the vertical axis indicates the head velocity V(hz) in the Z axis direction at the time instant at which the highest head velocity VV(h) is obtained. Accordingly, the slopes of the bold lines 11 to 15 in the graph area G2 indicate the highest head velocity component ratios II. Note that although the head velocity V(hX) and the head velocity V(hz) at the time instant when the highest head velocity VV(h) is obtained are derived the sample number of times for each racket 210, their average values are displayed in the graph area G2.

The bold lines 11 to 15 are in one-to-one correspondence with the rackets in the target racket group. In other words, the bold lines 11 to 15 each correspond to a unit of swing movement analysis. Here, as shown in FIG. 19, the screen creation unit 224*b* displays objects of points P1 to P5 and a legend H2 at the same time. The points P1 to P5 are displayed at the tips of the bold lines 11 to 15. The legend H2 is displayed next to the graph area G2, and associates the points P1 to P5 with the names of the rackets 210 (product numbers or the like). The points P1 to P5 are displayed in different display formats with respect to color, pattern, or the like. Accordingly, the operator can easily find out which of the bold lines 11 to 15 correspond to which of the rackets 210. Accordingly, this graph can also be said to be data that displays multiple evaluation indicators (highest head velocity component ratios II) at the same time in the form in which the evaluation indicators are associated with respectively corresponding rackets 210. As a result, the operator can also easily compare the rackets 210 included in the target racket group from the viewpoint of the type of swing by viewing the bold lines 11 to 15.

It should be noted that the screen creation unit 224*b* further displays objects of three straight lines L1 to L3 at the same time in the graph area G2. Here, these straight lines L1 to L3 are expressed by the following expressions.

Straight line $L1$: $V(hZ)=0.60*V(hX)$

Straight line $L2$: $V(hZ)=0.25*V(hX)$

Straight line $L3$: $V(hZ)=0.00$

Specifically, the area above the straight line L1 is the area in which the head velocity component ratio I is greater than or equal to 0.60 (topspin type), the area between the straight line L1 and the straight line L2 is the area in which the head velocity component ratio I is greater than or equal to 0.25 and less than 0.60 (drive type), the area between the straight line L2 and the straight line L3 is the area in which the head velocity component ratio I is greater than or equal to 0.00 and less than 0.25 (flat type), and the area below the straight line L3 is the area in which the head velocity component ratio I is less than 0.00 (slice type). In other words, the straight lines L1 to L3 are auxiliary lines for dividing the graph area G2 into multiple areas indicating types of swings, and for indicating boundaries between the types of swings. Accordingly, the operator can easily find out which type of swing the player 250 made with each of the rackets 210 by viewing the graph area G1. Also, although not clear from FIG. 19, the four areas divided by the straight lines L1 to L3 are displayed in different display formats with respect to color, pattern, or the like in order to facilitate understanding.

Also, in the graph area G2, the distance from the origin to an arbitrary point (V(hX),V(hZ)) indicates the magnitude V(h) of the head velocity when assuming that the head velocity V(hY) in the Y axis direction is zero (referred to hereinafter as the head velocity V'). Accordingly, as shown in FIG. 19, the screen creation unit 224*b* displays objects of many arcs L4 centered about the origin (0,0) in the graph area G2.

These arcs L4 are auxiliary lines for allowing the operator to easily find out the magnitude of the head velocity V' for each racket 210 by viewing this graph.

2-3-4. Graph of Variation in Highest Head Velocity Component Ratio II

As shown in FIGS. 20 to 23, the screen creation unit 224b displays graphs showing variation in the highest head velocity component ratio II at the same time in the GUI screen in order to evaluate the stability of the swing movement made by the user using a specific racket 210. The number of these graphs is the same as the number of rackets 210 included in the target racket group. Here, the properties of the vertical axis and the horizontal axis in the graph area G3 are similar to those in the graph area G1. Also, auxiliary lines L1 to L4 similar to those in graph area G1 are displayed in the graph area G3. Moreover, four areas in the graph area G3 that are divided by straight lines L1 to L3 are also displayed in different display formats with respect to color, pattern, or the like, similarly to the graph area G1.

Here, as previously described, the highest head velocity component ratio II is derived the predetermined sample number of times for each racket 210. For this reason, whereas the average value of the sample number of highest head velocity component ratios II for the same racket 210 is displayed in the graph area G1, the sample number of highest head velocity component ratios II before averaging are displayed in the graph area G3. Accordingly, objects of the same number of bold lines m1 to m5 and points n1 to n5 as the sample number are shown in each graph area G3. FIGS. 20 to 23 show the case where the sample number is 5. Accordingly, each of these graphs is data showing the sample number of evaluation indicators (highest head velocity component ratios II), which are records of swing movements made using the same racket 210, in graph form at the same time. As a result, the operator viewing the graphs can intuitively determine variation in swing movements made with the rackets 210 corresponding to the graphs.

Also, the screen creation unit 224b may quantitatively calculate the value of variation and display it next to the graph area G3 at the same time, for each racket 210. In this case, the operator can easily find out the degree of variation in a quantitative manner as well. Note that examples of quantitative variation values include a dispersion and a standard deviation.

Figure 20:
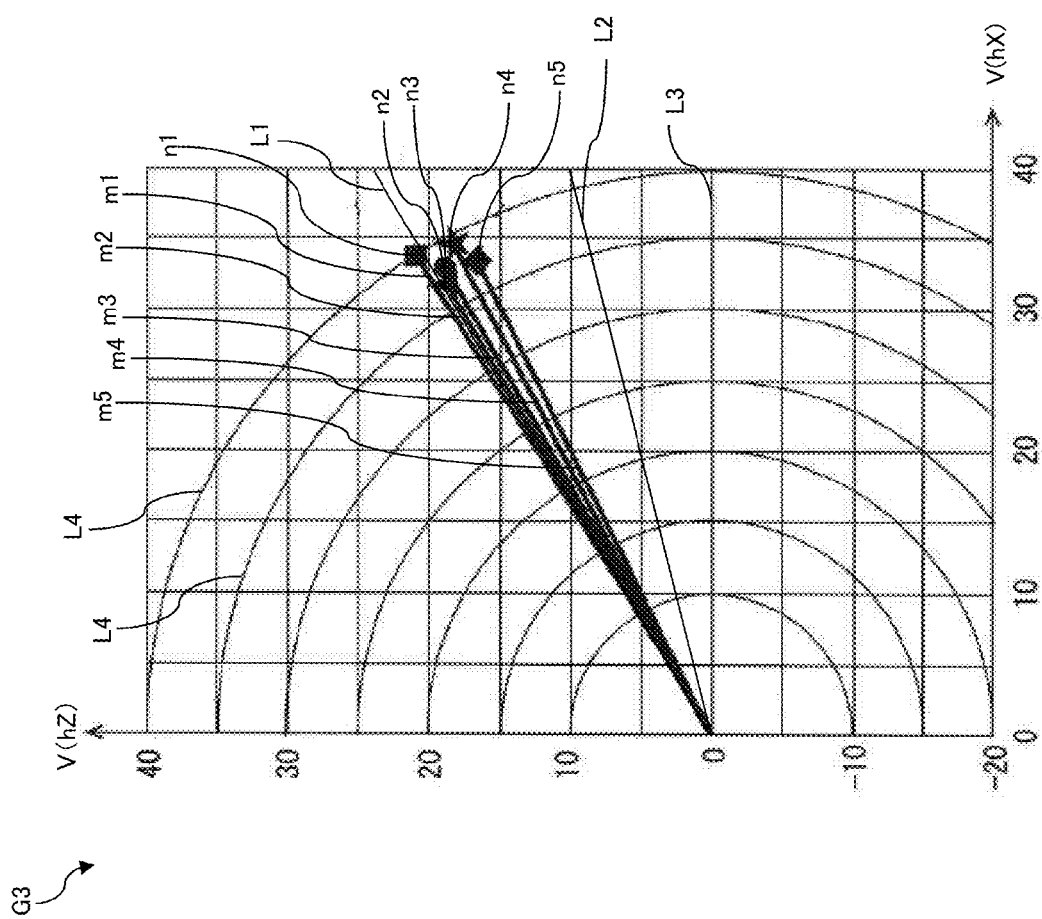
FIG. 20 is a diagram showing a graph that shows variation between highest head velocity component ratios.
Figure 21:
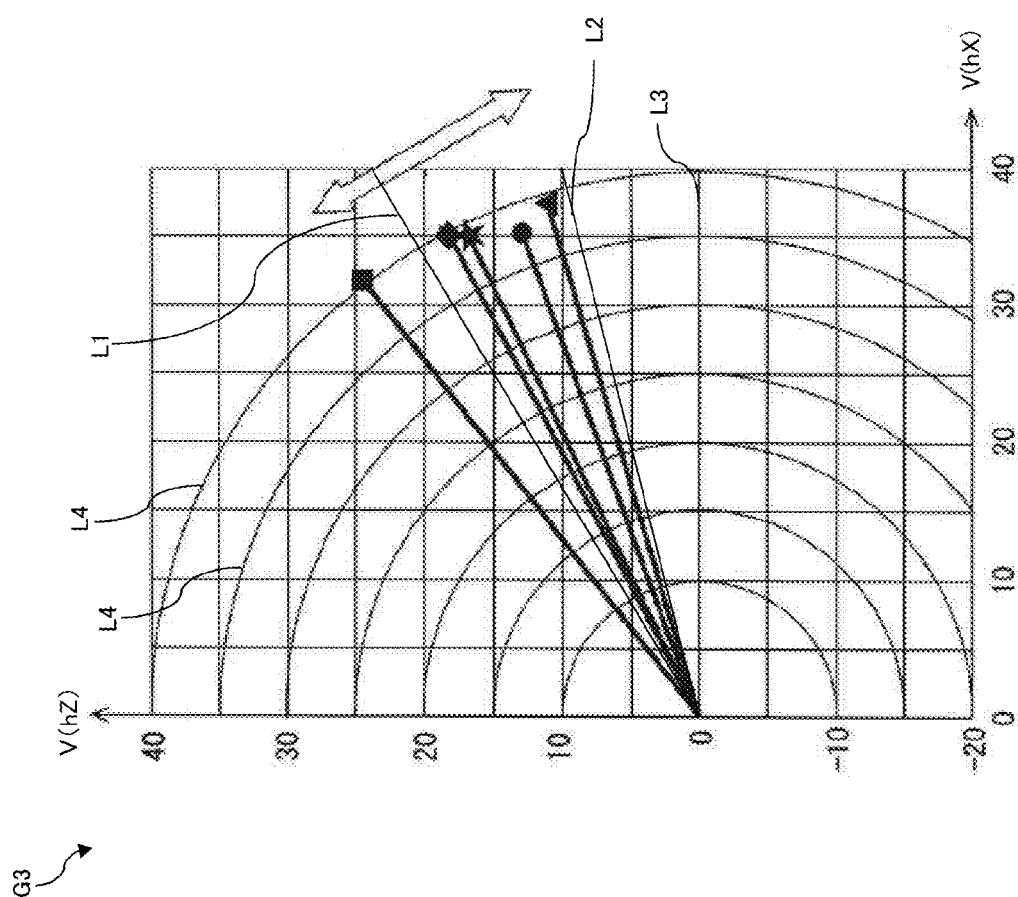
FIG. 21 is another diagram showing a graph that shows variation between highest head velocity component ratios.
Figure 22:
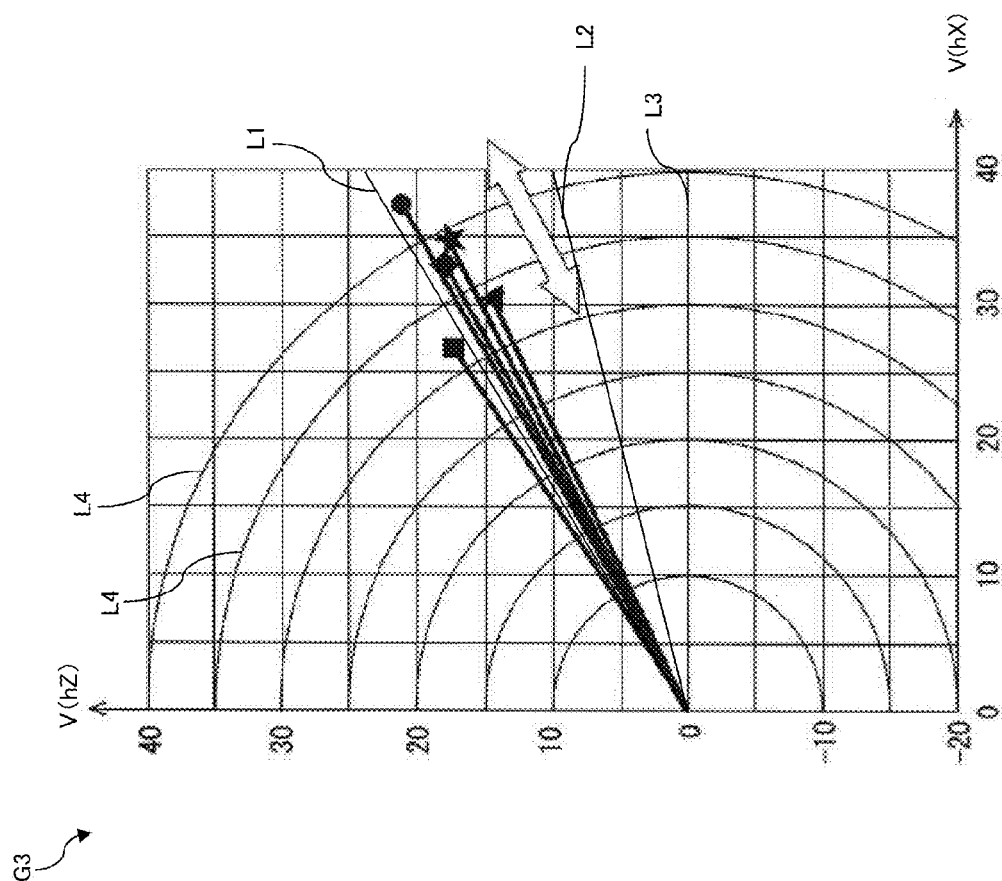
FIG. 22 is yet another diagram showing a graph that shows variation between highest head velocity component ratios.
Figure 23:
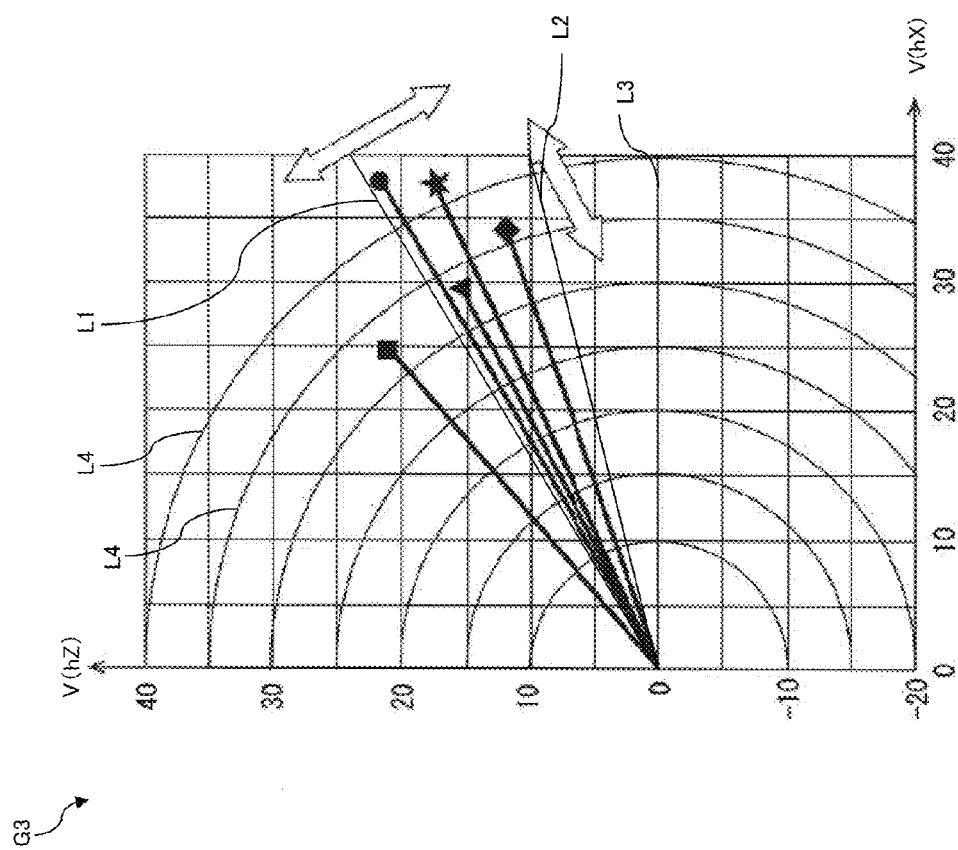
FIG. 23 is still another diagram showing a graph that shows variation between highest head velocity component ratios.

Here, in FIG. 20, the bold lines m1 to m5 are grouped in the radius direction and the circumference direction centered about the origin. In FIG. 21, the bold lines m1 to m5 are grouped in the radius direction centered about the origin, but are dispersed in the circumference direction. In FIG. 22, the bold lines m1 to m5 are dispersed in the radius direction centered about the origin, but are grouped in the circumference direction. In FIG. 23, the bold lines m1 to m5 are dispersed in the radius direction and the circumference direction centered about the origin.

Accordingly, the following can be determined from FIGS. 20 to 23.

(1) With the swing made with the racket 210 corresponding to FIG. 20, there is little variation in the head velocity V', and there is also little variation in the type of swing.

(2) With the swing made with the racket 210 corresponding to FIG. 21, there is little variation in the head velocity V', but there is a large amount of variation in the type of swing.

(3) With the swing made with the racket 210 corresponding to FIG. 22, there is a large amount of variation in the head velocity V', but there is little variation in the type of swing.

(4) With the swing made with the racket 210 corresponding to FIG. 23, there is a large amount of variation in the head velocity V', and there is also a large amount of variation in the type of swing.

Accordingly, the operator can easily compare multiple rackets 210 with each other from the viewpoint of variation by a visual comparison of the graphs in FIGS. 20 to 23. In fitting, the racket 210 corresponding to FIG. 20 is recommended since there is little variation in the head velocity V' and also little variation in the type of swing.

2-3-5. Graph of Highest Racket Angular Velocity $\omega\omega$

Figure 24:
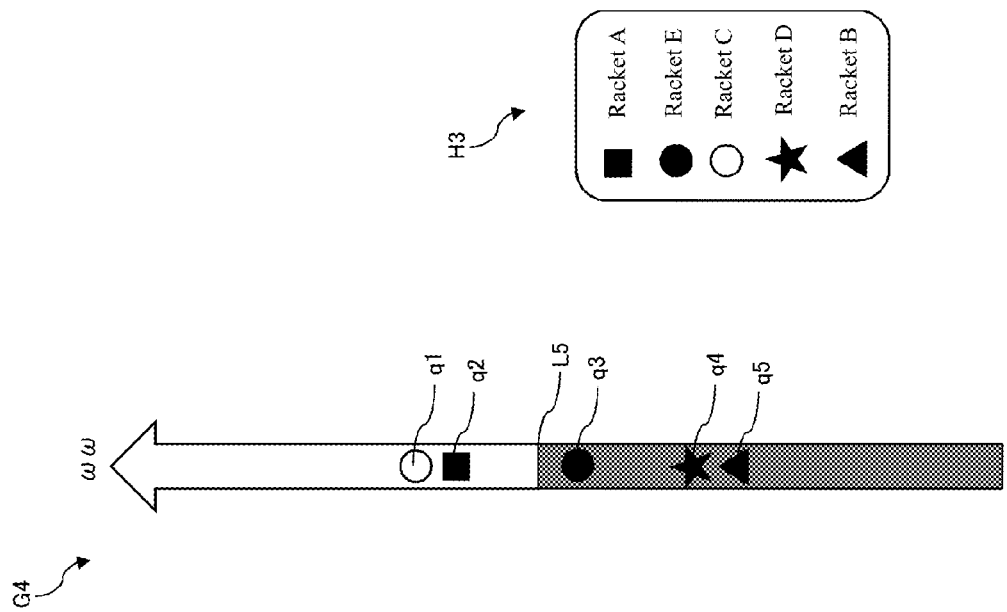
FIG. 24 is a diagram showing a highest racket angular velocity graph.

As shown in FIG. 24, the screen creation unit 224b displays a graph area G4 in the GUI screen. In the graph area G4, the screen creation unit 224b displays objects of points q1 to q5 at the same time. The points q1 to q5 correspond to the rackets 210 included in the target racket group. The points q1 to q5 are displayed in different display formats with respect to color, pattern, or the like. Here, the graph area G4 is a one-dimensional graph, and the vertical axis, which is the only axis, indicates the highest racket angular velocity $\omega\omega$.

The points q1 to q5 are in one-to-one correspondence with the rackets in the target racket group. In other words, the points q1 to q5 each correspond to a unit of swing movement analysis. Here, as shown in FIG. 24, the screen creation unit 224b displays a legend H3 next to the graph area G4 at the same time. The legend H3 associates the points q1 to q5 with the names of the rackets 210 (product numbers or the like). Accordingly, the operator can easily find out which of the points q1 to q5 correspond to which of the rackets 210. Accordingly, this graph can also be said to be data that displays multiple evaluation indicators (highest racket angular velocities $\omega\omega$) at the same time in the form in which the evaluation indicators are associated with respectively corresponding rackets 210. As a result, the operator viewing the points q1 to q5 can also easily compare the rackets 210 included in the target racket group from the viewpoint of the type of swing.

It should be noted that the screen creation unit 224b further displays one line segment L5 object in the graph area G4. Here, this line segment L5 is expressed by the following expression.

$$\text{Line segment } L5: \omega\omega = 0.00$$

Specifically, the area above the line segment L5 is the area in which the highest racket angular velocity cow is greater than or equal to 0.00 (the type of swing in which the tennis ball is hit while the face 302 is closed), and the area below the line segment L5 is the area in which the highest racket angular velocity $\omega\omega$ is less than 0.00 (the type of swing in which the tennis ball is hit while the face 302 is open). In other words, the line segment L5 is an auxiliary line for dividing the graph area G4 into multiple areas indicating types of swings, and for indicating boundaries between the types of swings. Accordingly, the operator viewing the graph area G4 can easily find out which type of swing the player 250 made with each of the rackets 210. Also, as shown in FIG. 24, the two areas divided by the line segment L5 are displayed in different display formats with respect to color, pattern, or the like in order to facilitate understanding.

2-4. Variations

Although an embodiment of the present invention has been described above, the present invention is not limited to this embodiment, and various modifications can be made without departing from the gist of the invention. For example, the following modifications can be made.

2-4-1

The analyzing system of the present invention is applicable to not only the case of tennis racket fitting as in the above embodiment, but also cases such as string tension fitting and tennis coaching. As an example of the former, it is sufficient that the sampling data relates to multiple tennis rackets having different string tensions, not different types of tennis rackets.

2-4-2

The method for sampling the sampling data is not limited to that described above, and for example, in addition to or instead of installing the measuring device 201, one or more cameras may be disposed at appropriate locations on the tennis court 270. In the case of using cameras, the analyzing apparatus 202 can calculate necessary parameters by performing sequential image processing on image data in a time series. Various indicators may be calculated from values output from these sensors.

2-4-3

The method for sending sampling data from the measuring device 201 to the analyzing apparatus 202 is not limited to the aspect described above. For example, a configuration is possible in which sampling data is saved in a memory inserted to the measuring device 201 during measurement, and then the memory is connected to the analyzing apparatus 202 at an appropriate time after measurement, and the sampling data is loaded into the analyzing apparatus 202.

2-4-4

The output unit that outputs the GUI screen is not limited to the form of a display, and may be a plotter and/or a printer, for example.

2-4-5

The types of evaluation indicators are not limited to those described above, and may be the velocity, the acceleration, the angular velocity, and the position of a tennis ball that is returned by a swing movement, as well as any combination of them, for example. Also, in the above embodiment, among the grip velocity, grip acceleration, head velocity, head acceleration, head velocity component ratio, and racket angular velocity per time instant, particularly the values at the time instant at which the head velocity is the highest are selected as evaluation indicators. However, the grip velocity, grip acceleration, head velocity, head acceleration, head velocity component ratio, racket angular velocity, and the like at another specific time instant, such as the time instants at which their values are the highest, may be selected.

2-4-6

Data regarding practice swings may be collected as the sampling data.

2-4-7

The sample number is an appropriately selected value, and may be 1, for example.

3. Third Embodiment

The following describes an analyzing apparatus, an analyzing system, an analyzing program, and an analyzing method for analyzing a user's tennis racket swing movement according to an embodiment of the present invention, with reference to the drawings.

3-1. Overview of analyzing system

Figure 26:
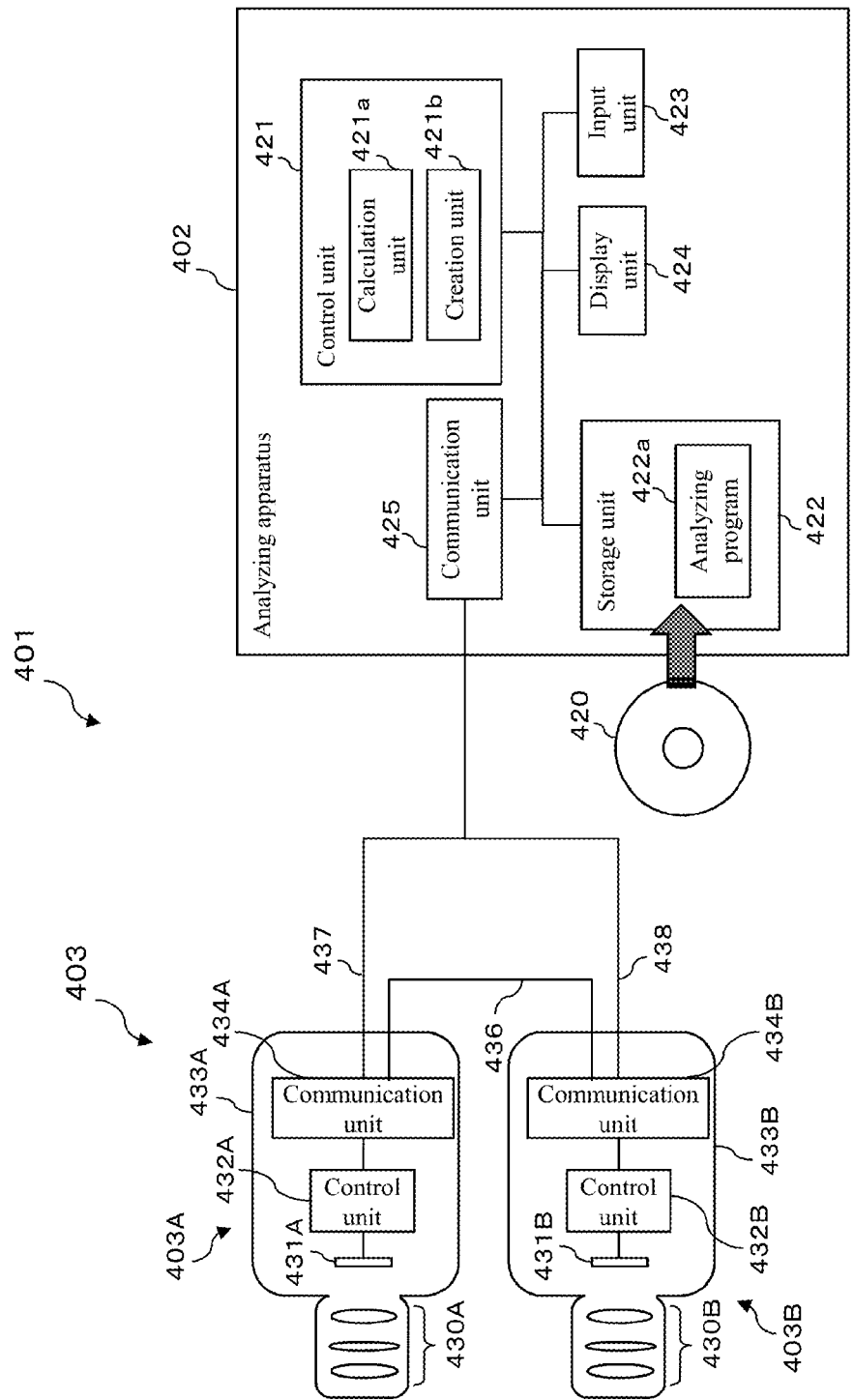
FIG. 26 is a block diagram of an analyzing system according to a third embodiment of the present invention.

As shown in FIG. 26, an analyzing system 401 according to an embodiment of the present invention has an imaging system 403 that samples a user's swing movement of a tennis racket 410, and an analyzing apparatus 402 that analyzes a user's swing movement of the tennis racket 410 based on sampling data sent from the imaging system 403. The analyzing apparatus 402 of the present embodiment is an apparatus for analyzing the user's swing movement of the tennis rackets 410 so as to mainly present determination material for the user to select a tennis racket 410 that is suited to himself from among various tennis rackets 410. In other words, the analyzing system 401 is a system for assisting the user in selecting a tennis racket 410 that is suited to himself, and would be mainly installed in tennis goods stores in which tennis rackets 410 are sold, tennis schools, and the like. Note that the term "swing" includes any action for swinging the tennis racket 410, such as not only a groundstroke, but also a volley, a serve, and the like.

Figure 27:
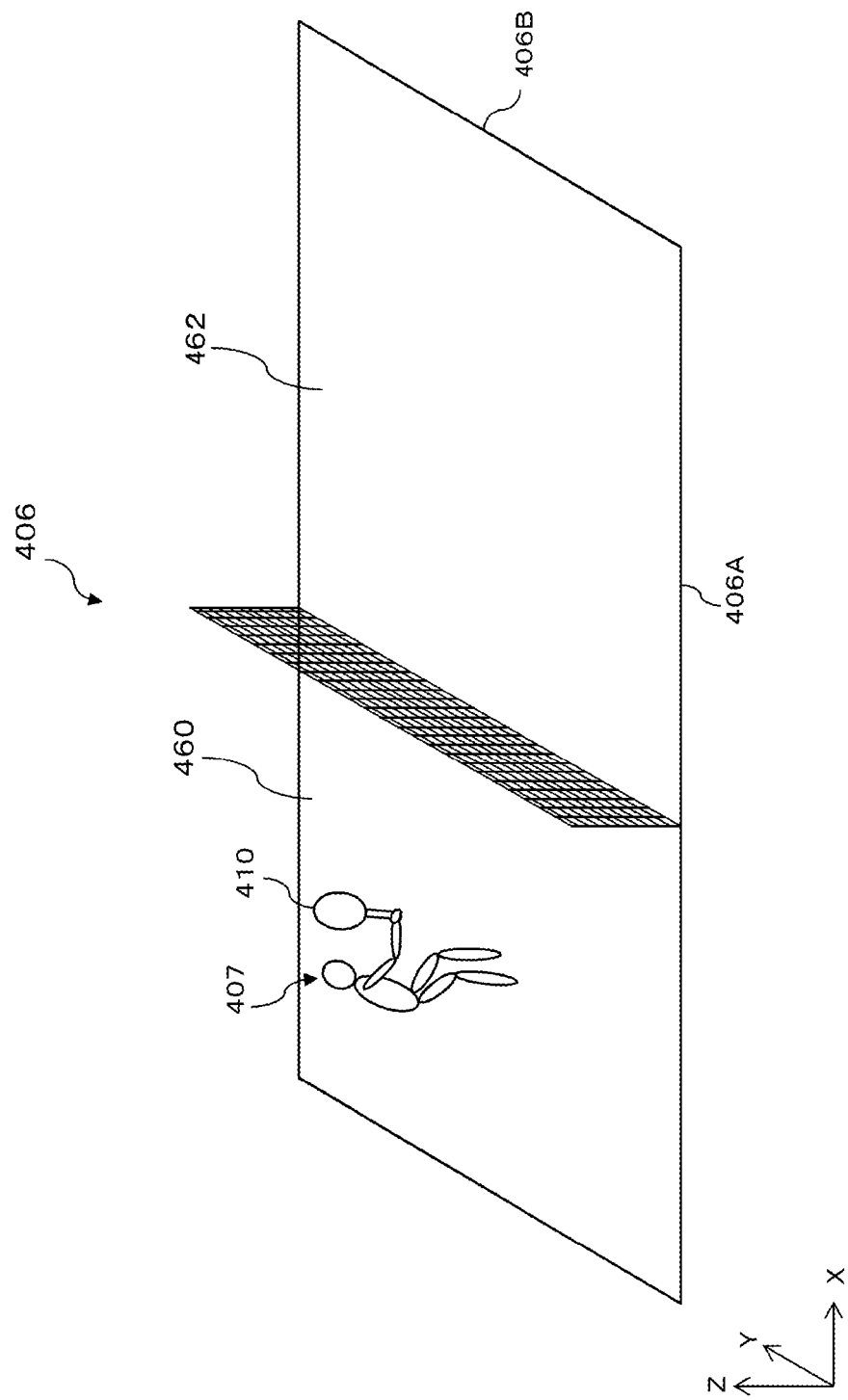
FIG. 27 is a perspective view of a tennis court.

In the present embodiment, imaging of the user's swing movements by the imaging system 403 is performed on a tennis court 406 shown in FIG. 27. The situation that is to be imaged by the imaging system 403 is the situation in which the user, who is a player 407, swings the tennis racket 410 and returns a tennis ball that is coming from the front.

As shown in FIG. 27, an X axis, a Y axis, and a Z axis that make up a three-dimensional rectangular coordinate system are defined on the tennis court 406. Here, the X axis is parallel to a sideline 406A of the tennis court 406, and the positive X axis direction is the direction from the player 407's own side 460 to an opponent's side 462. The Y axis is parallel to an end line 406B of the tennis court 406, and the positive Y axis direction is the direction from right to left from the viewpoint of the player 407 when facing the opponent's side 462. The Z axis is parallel to the vertical direction, and the positive Z axis direction is the vertically upward direction. This XYZ coordinate system is a coordinate system based on the tennis court 406, or in other words, is an absolute coordinate system based on the ground.

Figure 28:
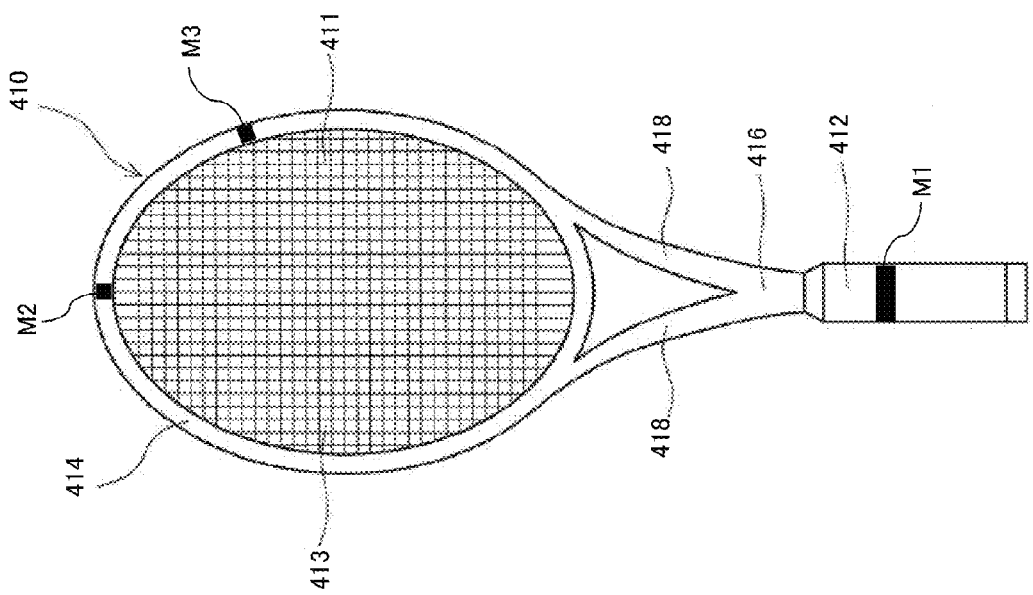
FIG. 28 is an external view of a tennis racket.

As shown in FIG. 28, the tennis racket 410 has a grip 412 for the player 407 to grip with his hand, a head 414 that has an elliptical ring shape, and a shaft 416 and a pair of throats 418 that connect the grip 412 and the head 414. The tennis racket 410 also has a face 411 formed by a string 413 that is vertically and horizontally stretched across the inside of the head 414.

As will be described later, in the present embodiment, it is important to track the trajectory of the grip 412 and the head 414 during swing movement. Accordingly, it is preferable that marks to be used during image processing are provided at appropriate positions on the grip 412 and the head 414 of the sample tennis racket 410 that is used in the measurement of the swing movement made by the user. In the present embodiment, as shown in FIG. 28, a mark M1 is provided in the vicinity of the center of the shaft of the grip 412, a mark M2 is provided at the upper end of the head 414 (on an extension line of the shaft of the grip 412), and a mark M3 is provided at a position a little lower than the upper end of the head 414 (not on an extension line of the shaft of the grip 412). Also, the tennis racket 410 may be modified so as to be at least partially transparent so as to enable reliable tracking of these marks during image processing. Note that this modification is assumed to be a modification that substantially does not change attributes that influence functionality of a tennis racket, such as the weight of the tennis racket 410.

3-2. Details of Units

The following describes details of the units of the analyzing system 401.

3-2-1. Imaging System

As shown in FIG. 26, the imaging system 403 has two cameras 403A and 403B so as to enable three-dimensional capturing of the swing movement made by the player 407. The cameras 403A and 403B are high-speed digital cameras that have optical systems 430A and 430B made up of various lenses, imaging elements 431A and 431B that receive light via the optical systems 430A and 430B, and housings 433A and 433B that accommodate these systems and elements. The cameras 403A and 403B further include, in the housings 433A and 433B, control units 432A and 432B that control imaging operations performed by the imaging elements 431A and 431B, and communication units 434A and 434B that enable communication with external apparatuses. The imaging range (angle of view) and focus of the cameras 403A and 403B are adjusted such that particularly the vicinity of the player 407 on his own side 460 can be accurately captured.

Figure 29:
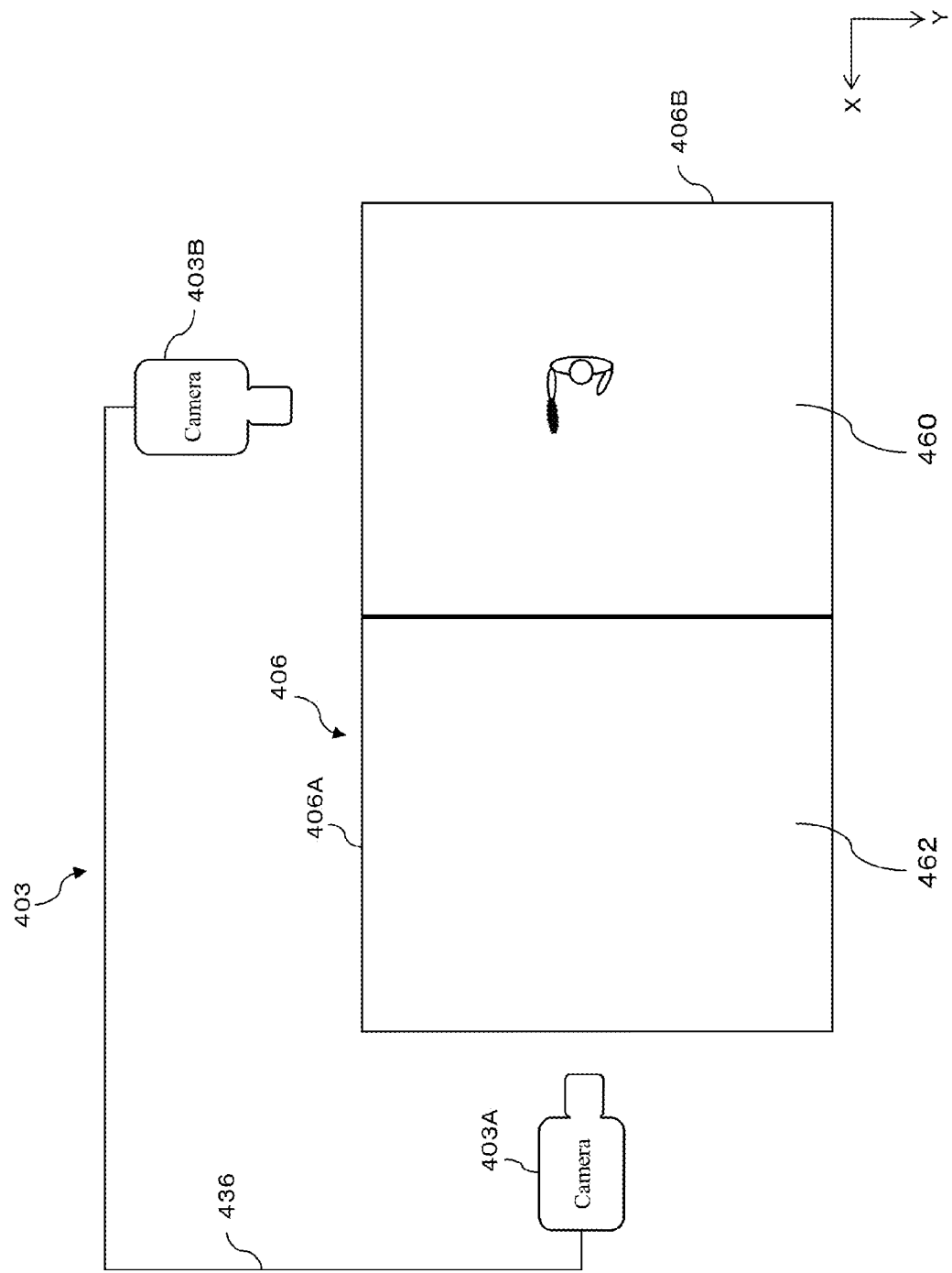
FIG. 29 is a plan view of a tennis court on which an imaging system is arranged.

As shown in FIG. 29, the cameras 403A and 403B are fixed in the vicinity of the tennis court 406 such that their optical axes are orthogonal to each other. More specifically, the camera 403A is arranged in the vicinity of the end line 406B on the opponent's side 462 such that the imaging direction is orthogonal to the YZ plane and faces the negative X axis direction, and the camera 403B is arranged in the vicinity of the sideline 406A on the player's own side 460 such that the imaging direction is orthogonal to the ZX plane and faces the positive Y axis direction. In particular, envisioning the case where the player 407 serving as the subject is right-handed, the camera 403B is arranged in the vicinity of the sideline 406A on the negative Y axis direction side, that is to say, the right-hand side in terms of the player 407 when facing the opponent's side 462 from the player's own side 460. Accordingly, in the case where the player 407 is left-handed, it is preferable that the camera 403B is arranged such that the imaging direction is orthogonal to the ZX plane and faces the negative Y axis direction.

The control units 432A and 432B are configured from a CPU, a RAM, a ROM, and the like, and control overall operations of the cameras 403A and 403B by executing a program that has been stored in advance. The control units 432A and 432B synchronize imaging operations performed by the imaging elements 431A and 431B while communicating with each other via the communication units 434A and 434B. Note that the communication units 434A and 434B are connected to each other via a communication line 436. Also, the imaging operations are repeatedly executed at a predetermined imaging speed (e.g., 500 to 1000 FPS) while the swing movement is performed one time by the player 407. As a result, each time the imaging operation is performed, two images capturing the swing movement performed by the player 407 from two different angles are captured, namely an image parallel to the YZ plane (referred to hereinafter as the YZ image) and an image parallel to the ZX plane (referred to hereinafter as the ZX image). Accordingly, with the imaging system 403, two channels of synchronized time series image groups are sampled for one swing movement performed by the player 407.

The control units 432A and 432B can also communicate with the analyzing apparatus 402 via the communication units 434A and 434B, and sequentially encode the time series image groups captured by the imaging elements 431A and 431B and transfer the encoded image data to the analyzing apparatus 402 in real-time. These two sets of image data are used in analysis of the swing movement performed by the player 407 in the analyzing apparatus 402. Note that the communication units 434A and 434B are connected to the analyzing apparatus 402 via communication lines 437 and 438. It should also be noted that a configuration is possible in which the image data is not transmitted from the cameras 403A and 403B to the analyzing apparatus 402 from moment to moment as imaging is performed, but rather is temporarily saved in a predetermined storage unit provided in the cameras 403A and 403B, and then collectively transmitted to the analyzing apparatus 402 when swing movements corresponding to one or plural rackets 410 have ended.

3-2-2. Analyzing Apparatus

The analyzing apparatus 402 is manufactured by an analyzing program 422a that is stored on a computer-readable recording medium 420 such as a CD-ROM, a DVD-ROM, a Blu-ray disc, or a USB memory being installed in a general-purpose personal computer. The analyzing program 422a is software for performing imaging processing on the two sets of image data (sampling data) that were sampled by the imaging system 403, and causing a display unit 424 to display determination material for the user to select a tennis racket 410 that is suited to himself. The analyzing program 422a causes the analyzing apparatus 402 to execute later-described operations.

As shown in FIG. 26, the analyzing apparatus 402 has a control unit 421, a storage unit 422, an input unit 423, a display unit 424, and a communication unit 425, and these units 421 to 425 can communicate with each other via a bus line or the like. In the present embodiment, the control unit 421 is configured from a CPU, a ROM, a RAM, and the like, and the storage unit 422 is configured from an internal or external hard disk or the like. The analyzing program 422a is stored in the storage unit 422, and the control unit 421 operates as a calculation unit 421a and a creation unit 421b by reading out the analyzing program 422a from the storage unit 422 and executing it. The operations of the calculation unit 421a and the creation unit 421b will be described later. The input unit 423 is configured by a mouse, a keyboard, a touch panel, or the like, and is a user interface for receiving user operations performed on the analyzing apparatus 402. The display unit 424 is configured from a liquid crystal display or the like, and is a user interface for displaying various screens to the user. The communication unit 425 is a communication interface for connecting the analyzing apparatus 402 to external devices such as the cameras 403A and 403B and the like.

3-3. Analyzing Method

The following describes a swing movement analyzing method realized by the analyzing system 401.

First, the user who is searching for a tennis racket 410 that is suited to himself is placed on the tennis court 406 as the player 407. The player 407 is then continuously supplied with tennis balls from another player or a tennis ball machine placed on the opponent's side 462. Note that it is preferable that the balls are supplied to the player 407 in a constant direction and at a constant velocity. While endeavoring to return the balls to the opponent's side 462, the player 407 swings the racket 410 held in his hand so as to continuously return the coming balls. In other words, the swing movements performed by the player 407 that are to be subjected to analysis by the analyzing system 401 are not so-called practice swings.

The imaging system 403 then records the situation in which the player 407 performs the above-described swing movement using different types of candidate rackets 410. Note that the different types of rackets referred to here include, for example, rackets that have different frame sizes, masses, or the like, and rackets that have different types of string 413. In the present embodiment, the record of the swing movement is sampled a predetermined sample number of times (e.g., 5 times) for each racket 410. This is done in order to accurately evaluate compatibility between the user and each racket 410 by averaging records regarding multiple swing movements performed with the same racket 410. This also enables evaluating the stability of the swing movement performed with a specific racket 410. Accordingly, it is preferable that the sample number is approximately 3 to 10, for example. Note that in the present embodiment, if a hit ball does not fall on the opponent's side 462, that swing movement is excluded from the sample number count and not subjected to the subsequent analysis. Similarly, even when a hit tennis ball falls on the opponent's side 462, if it is clearly a mishit, that swing movement is excluded from the sample number count and not subjected to the subsequent analysis.

During the swing movement performed by the player 407, image data (sampling data) corresponding to the two time series image groups capturing the swing movement is transmitted from the cameras 403A and 403B to the analyzing apparatus 402 from moment to moment. Accordingly, in the analyzing apparatus 402, the two sets of image data are acquired by the communication unit 425 and sequentially accumulated in the storage unit 422.

The operator operating the analyzing apparatus 402 organizes the two sets of image data in the storage unit 425 according to swing movement sorting units using a method such as creating an appropriate directory structure. Note that the swing movement sorting unit in the present embodiment is a set of the predetermined sample number of swing movements performed using the same racket 410. Also, at this time, image data originating from misfits and the like are excluded from the sorting and organization. It should also be noted that the operator referred to here may be the player 407 himself, a salesclerk at a tennis goods store, a coach at a tennis school, or the like. Furthermore, this sorting and organization processing may be automatically executed by the control unit 421 using an appropriate image processing algorithm such as pattern matching.

Figure 30:
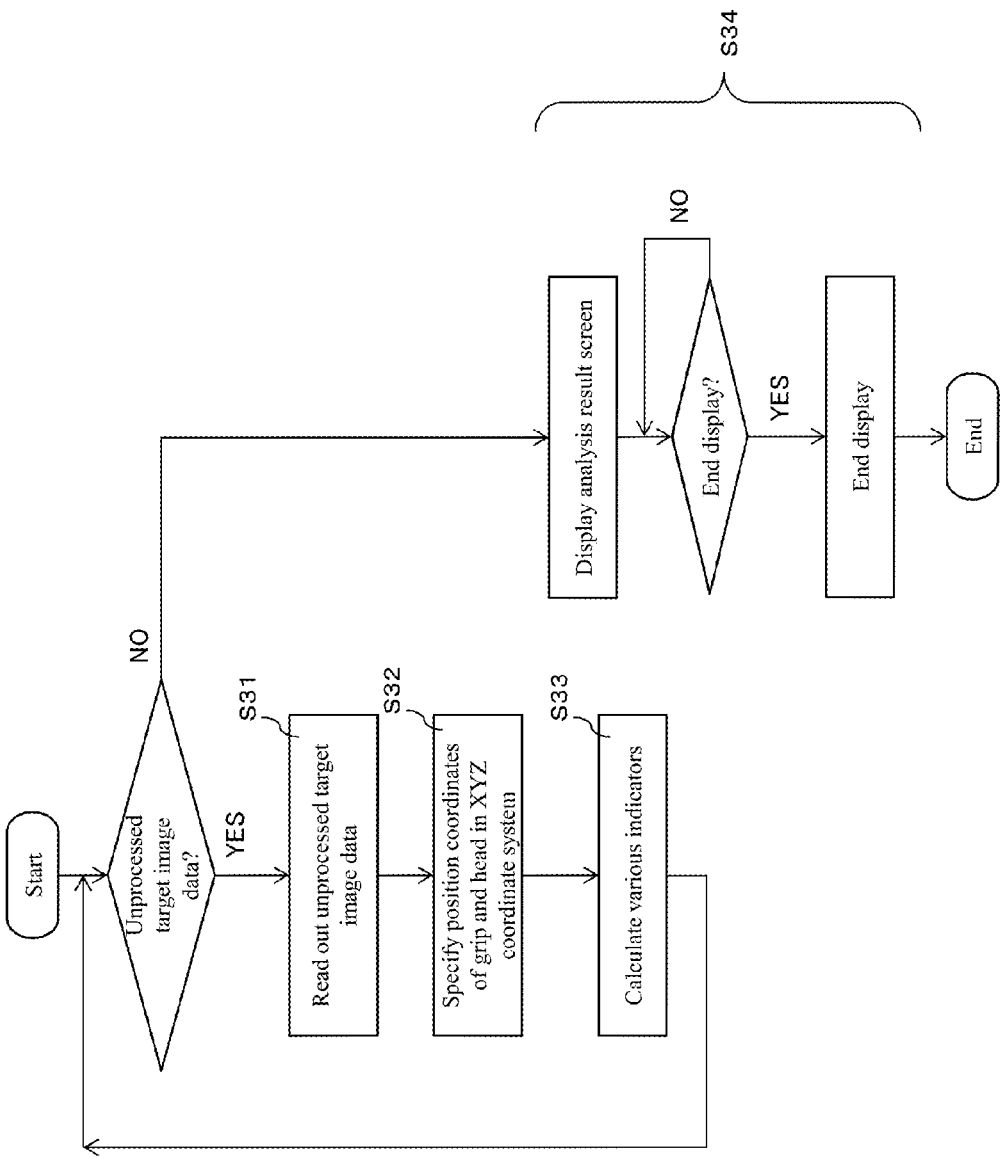
FIG. 30 is a flowchart showing a flow of analysis processing performed by an analyzing apparatus.

When the above-described sorting and organization of image data ends, the analyzing apparatus 402 enters a state in which the analysis processing shown in FIG. 30 can be executed. The analysis processing shown in FIG. 30 starts when the operator performs a predetermined operation via the input unit 423.

First, in step S31, the calculation unit 421a references a predetermined directory in the storage unit 422 and reads out a swing movement sorting unit of image data that has not been processed yet (referred to hereinafter as target image data).

In subsequent steps S32 and S33, the calculation unit 421a calculates various swing movement-related indicators by performing image processing on the target image data having two sets of image data along the time axis for each set. The indicator referred to here is the position, the velocity, the acceleration, or the angular velocity of the tennis racket 410, or a variable defined by an arbitrary combination of these values, and may be expressed quantitatively, or may be expressed qualitatively using "high", "moderate", and "low", or the like. Also, "arbitrary combination" refers to the combining of physical quantities in an arbitrary form while performing a calculation such as multiplication by a coefficient or addition/subtraction/multiplication/division one or multiple times. In other words, the swing indicator can be thought to be a variable defined using physical quantity that indicates the behavior of the tennis racket 410 during a swing movement. The indicators in the present embodiment are the grip velocity, the grip acceleration, the head velocity, the head acceleration, the head velocity component ratio, the swing trajectory, and the racket angular velocity. Details of these indicators will be described later.

In step S32, the position coordinates of the grip 412 and the head 414 in the XYZ coordinate system that change from moment to moment are specified, as basic data for calculating all of the indicators, from the target image data that was read out in the immediately previous step S31. More specifically, for each image included in the time series image groups corresponding to the target image data, the calculation unit 421a specifies the positions of the mark M1 on the grip 412 and the marks M2 and M3 on the head 414 that appear in the image. Here, since the imaging range of the cameras 403A and 403B is fixed to the tennis court 406, the coordinates of the grip 412 and the head 414 in the image are easily converted into position coordinates in the XYZ coordinate system. For the sake of simplicity, the X-axis, Y-axis, and Z-axis components of the position coordinates of the mark M1 on the grip 412 will hereinafter be respectively expressed by $dg_X(t)$, $dg_Y(t)$, and $dg_Z(t)$, as functions of time instant t. Also, the X-axis, Y-axis, and Z-axis components of the position coordinates of the mark M2 on the head 414 will be respectively expressed by $dh_{X2}(t)$, $dh_{Y2}(t)$, and $dh_{Z2}(t)$, as functions of time instant t. Also, the X-axis, Y-axis, and Z-axis components of the position coordinates of the mark M3 on the head 414 will be respectively expressed by $dh_{X3}(t)$, $dh_{Y3}(t)$, and $dh_{Z3}(t)$, as functions of time instant t. In actuality, these functions $dg_X(t)$ to $dh_{Z3}(t)$ are sets of position coordinate values aligned along a time axis at time intervals corresponding to the imaging speed (FPS) of the cameras 403A and 403B.

Although clearly understood from the above description, the number of swing movements that are recorded in the target image data is the predetermined sample number of swing movements made with the same racket 410. Also, one of the sets included in target image data originates from the camera 403A for capturing images projected on the YZ plane and includes information on the Y-axis and Z-axis components of the position coordinates of the grip 412 and the head 414, and the other set included in of target image data originates from the camera 403B for capturing images projected on the ZX plane and includes information on the Z-axis and X-axis components of the position coordinates of the grip 412 and the head 414. Accordingly, if the sample number is 5, for example, 5 values are obtained for both the X-axis and Y-axis components of the position coordinates, and 10 values are obtained for the Z-axis component. Here, the number of Z-axis components is made the same as the number of X-axis and Y-axis components by averaging two values obtained at the same time or ignoring one of them. Accordingly, in step S32, the functions $dg_X(t)$, $dg_Y(t)$, $dg_Z(t)$, $dh_{X2}(t)$, $dh_{Y2}(t)$, $dh_{Z2}(t)$, $dh_{X3}(t)$, $dh_{Y3}(t)$, and $dh_{Z3}(t)$ indicating the position coordinates of the grip 412 and the head 414 are obtained the sample number of times each.

Subsequently, in step S33, the calculation unit 421a calculates the various swing movement-related indicators based on the sample number of functions $dg_X(t)$, $dg_Y(t)$, $dg_Z(t)$, $dh_{X2}(t)$, $dh_{Y2}(t)$, $dh_{Z2}(t)$, $dh_{X3}(t)$, $dh_{Y3}(t)$, and $dh_{Z3}(t)$ that were calculated in step S32. The following describes specific methods for calculating these indicators.

Grip Velocity

First, regarding the grip velocity, the calculation unit 421a calculates functions $vg_X(t)$, $vg_Y(t)$, and $vg_Z(t)$ indicating the X-axis, Y-axis, and Z-axis components of the velocity of the grip 412 by performing first-order temporal differentiation on each of the functions $dg_X(t)$, $dg_Y(t)$, and $dg_Z(t)$ indicating the X-axis, Y-axis, and Z-axis components of the position coordinates of the mark M1 on the grip 412. More specifically, it is sufficient that the values making up the functions $dg_X(t)$, $dg_Y(t)$, and $dg_Z(t)$ are reduced by their immediately previous values along the time axis and then multiplied by the imaging speed. Thereafter, the calculation unit 421a uses the following expression to calculate the function vg(t) indicating the velocity of the grip 412 based on the functions $vg_X(t)$, $vg_Y(t)$, and $vg_Z(t)$ indicating the X-axis, Y-axis, and Z-axis components.

$$vg(t)=SQRT(vg_X(t)^2+vg_Y(t)^2+vg_Z(t)^2)$$

Subsequently, from among the values included in the function vg(t), the calculation unit 421a selects the value at the time instant T at which the later-described highest head velocity vh is obtained, as a highest grip velocity vg.

Here, since there are the sample number of the functions $dg_X(t)$, $dg_Y(t)$, and $dg_Z(t)$ each, the highest grip velocity vg is also derived the sample number of times. Accordingly, the calculation unit 421a calculates a single highest grip velocity Vg as a representative value of the swing movement sorting unit by averaging the sample number of highest grip velocities vg.

Grip Acceleration

Next, regarding the grip acceleration, the calculation unit 421a calculates functions $ag_X(t)$, $ag_Y(t)$, and $ag_Z(t)$ indicating the X-axis, Y-axis, and Z-axis components of the acceleration of the grip 412 by performing first-order temporal differentiation on each of the functions $vg_X(t)$, $vg_Y(t)$, and $vg_Z(t)$ indicating the X-axis, Y-axis, and Z-axis components of the velocity of the grip 412. More specifically, it is sufficient that the values making up the functions $vg_X(t)$, $vg_Y(t)$, and $vg_Z(t)$ are reduced by their immediately previous values along the time axis and then multiplied by the imaging speed. Thereafter, the calculation unit 421a uses the following expression to calculate a function ag(t) indicating the acceleration of the grip 412 based on the functions $ag_X(t)$, $ag_Y(t)$, and $ag_Z(t)$ indicating the X-axis, Y-axis, and Z-axis components.

$$ag(t)=SQRT(ag_X(t)^2+ag_Y(t)^2+ag_Z(t)^2)$$

Subsequently, from among the values included in the function ag(t), the calculation unit 421a selects the value at the time instant T at which the later-described highest head velocity vh is obtained, as a highest grip acceleration ag.

Here, since there are the sample number of the functions $vg_X(t)$, $vg_Y(t)$, and $vg_Z(t)$ each, the highest grip acceleration ag is also derived the sample number of times. Accordingly, the calculation unit 421a calculates a single highest grip acceleration Ag as a representative value of the swing movement sorting unit by averaging the sample number of highest grip accelerations ag.

Head Velocity

Next, regarding the head velocity, the calculation unit 421a calculates functions $vh_X(t)$, $vh_Y(t)$, and $vh_Z(t)$ indicating the X-axis, Y-axis, and Z-axis components of the velocity of the head 414 by performing first-order temporal differentiation on each of the functions $dh_{X2}(t)$, $dh_{Y2}(t)$, and $dh_{Z2}(t)$ indicating the X-axis, Y-axis, and Z-axis components of the position coordinates of the mark M2 on the head 414. More specifically, it is sufficient that the values making up the functions $dh_{X2}(t)$, $dh_{Y2}(t)$, and $dh_{Z2}(t)$ are reduced by their immediately previous values along the time axis and then multiplied by the imaging speed. Thereafter, the calculation unit 421a uses the following expression to calculate a function vh(t) indicating the velocity of the head 414 based on the functions $vh_X(t)$, $vh_Y(t)$, and $vh_Z(t)$ indicating the X-axis, Y-axis, and Z-axis components.

$$vh(t)=SQRT(vh_X(t)^2+vh_Y(t)^2+vh_Z(t)^2)$$

Subsequently, the calculation unit 421a selects the highest value from among the values included in the function vh(t) as the highest head velocity vh. Here, since there are the sample number of the functions $dh_{X2}(t)$, $dh_{Y2}(t)$, and $dh_{Z2}(t)$ each, the highest head velocity vh is also derived the sample number of times. Accordingly, the calculation unit 421a calculates a single highest head velocity Vh as a representative value of the swing movement sorting unit by averaging the sample number of highest head velocities vh.

Head Acceleration

Next, regarding the head acceleration, the calculation unit 421a calculates functions $ah_X(t)$, $ah_Y(t)$, and $ah_Z(t)$ indicating the X-axis, Y-axis, and Z-axis components of the acceleration of the head 414 by performing first-order temporal differentiation on each of the functions $vh_X(t)$, $vh_Y(t)$, and $vh_Z(t)$ indicating the X-axis, Y-axis, and Z-axis components of the velocity of the head 414. More specifically, it is sufficient that the values making up the functions $vh_X(t)$, $vh_Y(t)$, and $vh_Z(t)$ are reduced by their immediately previous values along the time axis and then multiplied by the imaging speed. Thereafter, the calculation unit 421a uses the following expression to calculate a function ah(t) indicating the acceleration of the head 414 based on the functions $ah_X(t)$, $ah_Y(t)$, and $ah_Z(t)$ indicating the X-axis, Y-axis, and Z-axis components.

$$ah(t)=SQRT(ah_X(t)^2+ah_Y(t)^2+ah_Z(t)^2)$$

Subsequently, from among the values included in the function ah(t), the calculation unit 421a selects the value at the time instant T at which the highest head velocity vh is obtained, as a highest head acceleration ah. Here, since there are the sample number of the functions $vh_X(t)$, $vh_Y(t)$, and $vh_Z(t)$ each, the highest head acceleration ah is also derived the sample number of times. Accordingly, the calculation unit 421a calculates a single highest head acceleration Ah as a representative value of the swing movement sorting unit by averaging the sample number of highest head accelerations ah.

Head Velocity Component Ratio

Next, regarding the head velocity component ratio, the calculation unit 421a calculates the head velocity component ratio i using the following expression.

$$i=vh_Z(T)/vh_X(T)$$

Here, T is the time instant at which the highest head velocity vh is obtained. Note that the head velocity vh(t) gradually increases from when the swing movement starts, and then rapidly decreases upon impact between the tennis racket 410 and the tennis ball. Accordingly, the time instant T at which the highest head velocity vh is obtained is the time instant immediately before impact, which is thought to be the time instant that is suited to determining compatibility between the player 407 and the racket 410. Note that since there are the sample number of the functions $vh_X(t)$ and $vh_Z(t)$ each, the head velocity component ratio i is also derived the sample number of times. Accordingly, the calculation unit 421a calculates a single head velocity component ratio I as a representative value of the swing movement sorting unit by averaging the sample number of head velocity component ratios i.

Swing Trajectory

Next, regarding the swing trajectory, the calculation unit 421a first calculates a function $eh_X(t)$ in which the function $dh_{X2}(t)$ indicating the X-axis component of the position coordinate of the mark M2 on the head 414 is parallel translated such that the point when t=0 (time instant when the swing movement starts) coincides with the origin. Subsequently, the calculation unit 421a obtains functions $eh_Y(t)$ and $eh_Z(t)$ by similarly performing parallel translation on functions $dh_{Y2}(t)$ and $dh_{Z2}(t)$ indicating the Y-axis and Z-axis components of the position coordinates of the mark M2 on the head 414.

Here, similarly to the functions $dh_{X2}(t)$, $dh_{Y2}(t)$, and $dh_{Z2}(t)$, the functions $eh_X(t)$, $eh_Y(t)$, and $eh_Z(t)$ are also derived the sample number of times. Accordingly, first, for each time instant t, the calculation unit 421a calculates a single function $Eh_X(t)$ indicating the X-axis component of the position coordinates as a representative value of the swing movement sorting unit by averaging the values of the sample number of functions $eh_X(t)$. Also, the calculation unit 421a similarly calculates a single function $Eh_Y(t)$ and $Eh_Z(t)$ indicating the Y-axis and Z-axis components of the position coordinates as a representative value of the swing movement sorting unit.

The functions $Eh_X(t)$, $Eh_Y(t)$, and $Eh_Z(t)$ obtained as described above express the swing trajectory (trajectory of the head 414 during the swing movement).

Racket Angular Velocity

Lastly, regarding the racket angular velocity, the calculation unit 421a first calculates functions $f_X(t)$, $f_Y(t)$, and $f_Z(t)$ indicating the relative position coordinates of the mark M3 relative to a line segment connecting the marks M1 and M2 based on the functions $dh_{X2}(t)$, $dh_{Y2}(t)$, $dh_{Z2}(t)$, $dh_{X3}(t)$, $dh_{Y3}(t)$, and $dh_{Z3}(t)$ indicating the X-axis, Y-axis, and Z-axis components of the position coordinates of the marks M2 and M3 on the head 414, and the functions $dg_X(t)$, $dg_Y(t)$, and $dg_Z(t)$ indicating the X-axis, Y-axis, and Z-axis components of the position coordinates of the mark M1 on the grip 412. Here, the functions $f_X(t)$, $f_Y(t)$, and $f_Z(t)$ express the locus of the mark M3 about the axis of the grip 412. The calculation unit 421a calculates a racket angular velocity $\omega(t)$ indicating the angular velocity of the racket 410 about the axis of the grip 412 based on the functions $f_X(t)$, $f_Y(t)$, and $f_Z(t)$ and a distance r from the mark M3 to the line segment connecting the marks M1 and M2.

Subsequently, from among the values included in the function $\omega(t)$, the calculation unit 421a selects the value at the time instant T at which the highest head velocity vh is obtained, as the racket angular velocity $\omega$. Here, since there are the sample number of the functions $dh_{X2}(t)$, $dh_{Y2}(t)$, $dh_{Z2}(t)$, $dh_{X3}(t)$, $dh_{Y3}(t)$, $dh_{Z3}(t)$, $dg_X(t)$, $dg_Y(t)$, and $dg_Z(t)$ each, the racket angular velocity $\omega$ is also derived the sample number of times. Accordingly, the calculation unit 421a calculates a single racket angular velocity W as a representative value of the swing movement sorting unit by averaging the sample number of racket angular velocities $\omega$.

As described above, various swing movement-related indicators are calculated from the sorting unit of target image data that was selected in step S31. The calculation unit 421a then repeats steps S31 to S33 as long as the storage unit 422 includes an unprocessed sorting unit of target image data. Accordingly, the above-described set of indicators is calculated for each racket 410 swung by the user.

Subsequently, in step S34, the creation unit 421b creates an analysis result screen in which the indicators are directly displayed or appropriately manipulated and displayed in various formats such as a table format or a graph format, and displays the analysis result screen on the display unit 424. If the operator then inputs a command to close the analysis result screen via the input unit 423, the control unit 421 ends the display of the analysis result screen on the display unit 424 and ends the analysis processing shown in FIG. 30. Note that the original data for creating the analysis result screen remains stored in the storage unit 422, and the operator can re-display the same analysis result screen on the display unit 424 by performing a predetermined operation on the input unit 423.

The following describes various items displayed in the analysis result screen.

Table list of highest grip velocity, highest grip acceleration, highest head velocity, highest head acceleration, head velocity component ratio, and racket angular velocity As shown in FIG. 36, the creation unit 421b displays, in the analysis result screen, a table list T1 including the highest grip velocity Vg, the highest grip acceleration Ag, the highest head velocity Vh, the highest head acceleration Ah, the head velocity component ratio I, and the racket angular velocity W.

Here, if the highest grip velocity Vg is high, it means that the player 407 had little arm strain and hand looseness, and this therefore means that that racket 410 is a good match for the player 407. Accordingly, the highest grip velocity Vg is material for determining whether that racket 410 is suited to the player 407. In fitting, a racket 410 whose highest grip velocity Vg is greater than the highest grip velocity Vg of a reference racket is recommended to the player 407. The reference racket is the racket regularly used by the player 407, for example. Accordingly, if the player 407's own racket is one of the tennis rackets 410 used during swing movement measurement (referred to hereinafter as the target racket group), it is possible to select a new racket 410 by comparing it with the player's current racket. The same follows for the other items displayed in the analysis result screen.

Also, if the highest grip acceleration Ag is high, it means that the player 407 had little arm strain and hand looseness and that the player 407 was able to forcefully hit the tennis ball, and this therefore means that that racket 410 is a good match for the player 407. Accordingly, the highest grip acceleration Ag is material for determining whether that racket 410 is suited to the player 407. In fitting, a racket 410 whose highest grip acceleration Ag is greater than the highest grip acceleration Ag of the reference racket is recommended to the player 407.

Also, if the highest head velocity Vh is high, it means that the player 407 was able to forcefully hit the tennis ball, and this therefore means that that racket 410 is a good match for the player 407. Accordingly, the highest head velocity Vh is material for determining whether that racket 410 is suited to the player 407. In fitting, a racket 410 whose highest head velocity Vh is greater than the highest head velocity Vh of the reference racket is recommended to the player 407.

Also, if the highest head acceleration Ah is high, it means that the player 407 was able to forcefully hit the tennis ball by applying greater kinetic energy, and this therefore means that that racket 410 is a good match for the player 407. Accordingly, the highest head acceleration Ah is material for determining whether that racket 410 is suited to the player 407. In fitting, a racket 410 whose highest head acceleration Ah is greater than the highest head acceleration Ah of the reference racket is recommended to the player 407.

Also, the head velocity component ratio I is correlated with the type of swing made by the player 407. Here, the following can generally be said. With a swing in which the head velocity component ratio I has a high absolute value and is a positive value, topspin tends to be applied to the tennis ball. With a swing in which the head velocity component ratio I has a high absolute value and is a negative value, slice spin tends to be applied to the tennis ball. With a swing in which the head velocity component ratio I has an absolute value close to zero, spin tends to not be applied to the tennis ball.

As shown in FIG. 36, the table list T1 is provided with a field that shows the head velocity component ratio I itself as well as a field that shows the type of swing that can be determined based on the head velocity component ratio I. Accordingly, viewing the table list T1 enables selecting a racket 410 that is suited to the type of swing made by the player 407. Note that the type of swing is determined by the calculation unit 421a using the following algorithm.

Specifically, the calculation unit 421a determines whether the head velocity component ratio I is greater than or equal to 0.60 or greater than or equal to 0.25 and less than 0.60, greater than or equal to 0.00 and less than 0.25, or less than 0.00. If the head velocity component ratio I is greater than or equal to 0.60, the swing type is determined to be the topspin type; if greater than or equal to 0.25 and less than 0.60, the swing type is determined to be the drive type; if greater than or equal to 0.00 and less than 0.25, the swing type is determined to be the flat type; and if less than 0.00, the swing type is determined to be the slice type.

Also, if the racket angular velocity W is a positive value, it means that the swing is of the swing type in which the tennis ball is hit while the face 411 is closed. Note that with the racket angular velocity W, the positive direction is the clockwise direction when viewing the racket 410 from the direction facing the grip 412 from the head 414 along the axis of the grip 412. Also, if the racket angular velocity W is a negative value, it means that the swing is of the swing type in which the tennis ball is hit while the face 411 is open. Accordingly, viewing the value of the racket angular velocity W in the table list T1 enables selecting a racket 410 that is suited to the type of swing made by the player 407. Also, similarly to the case of the type of swing based on the head velocity component ratio I, the table list T1 may be provided with a field that shows the racket angular velocity W itself as well as a field that shows the type of swing based on the racket angular velocity W. Note that since the type of swing based on the head velocity component ratio I and the racket angular velocity W is obtained by qualitatively evaluating the head velocity component ratio I and the racket angular velocity W, in this sense it can be said that these types of swings are also swing movement evaluation indicators.

Also, if the racket angular velocity W is high, it means that there is a large amount of control of the surface of the racket 410 by the player 407, which means that that racket 410 is not a good match for the player 407. Accordingly, the racket angular velocity W is material for determining whether that racket 410 is suited to the player 407. In fitting, a racket 410 whose racket angular velocity W is less than the racket angular velocity W of the reference racket is recommended to the player 407.

It should be noted that the rows included in the table list T1 (five rows in FIG. 36) are in one-to-one correspondence with the rackets in the target racket group. Specifically, each row in the table list T1 corresponds to the above-described swing movement sorting unit, and each row is provided with a field displaying the name of the corresponding racket. Accordingly, the table list T1 is data that displays multiple indicators (highest grip velocity Vg, highest grip acceleration Ag, highest head velocity Vh, highest head acceleration Ah, head velocity component ratio I, and racket angular velocity W) at the same time in the form in which the indicators are associated with respectively corresponding tennis rackets 410. As a result, the operator can easily compare specific types of indicators between rackets in the target racket group by looking up and down the table list T1. Also, the operator can make a comprehensive determination regarding the compatibility between a specific tennis racket 410 and the player 407 based on the above types of indicators by looking across the table list T1.

Also, as shown in FIG. 36, the table list T1 is provided with a "recommended racket" field that shows whether the rackets 410 corresponding to the rows are suited to the player 407. More specifically, a comprehensive indicator expression whose parameters are the various indicators and a later-described variation value is stored in the storage unit 422. The creation unit 421b obtains a comprehensive indicator value for each racket 410 by substituting the various indicators and the later-described variation value corresponding to the racket 410 into the comprehensive indicator expression. The creation unit 421b then compares the comprehensive indicator values with a predetermined threshold value and selects one or more specific rackets 410 that are suited to the player 407 from the target racket group. The creation unit 421b then adds a "O" (circle) sign to the "recommended racket" field of the rows that correspond to the selected one or more rackets 410 in the table list T1, and adds an "X" (cross) sign to the same field of the remaining rows. In other words, here, the creation unit 421b indirectly compares the various indicators and the later-described variation values via a threshold value in the target racket group, and displays the results of that comparison. However, instead of or in addition to this aspect, a configuration is possible in which the comprehensive indicator values corresponding to the rackets 410 included in the target racket group are directly compared with each other, and a ranking or the like of the rackets 410 included in the target racket group is displayed as the result of the comparison.

Also, instead of or in addition to the above-described aspect of comparing the rackets 410 included in the target racket group with each other using comprehensive indicators, the creation unit 421b may compare the rackets 410 included in the target racket group with each other separately for each type of indicator. In this case as well, the creation unit 421b can display a ranking or the like of the rackets 410 included in the target racket group for each type of indicator as the result of the comparison.

Swing Trajectory

The creation unit 421b displays lines, which indicate the swing trajectories corresponding to the rackets 410 included in the target racket group, at the same time in the analysis result screen. The names of the corresponding rackets 410 (product numbers or the like) are also displayed at the same time next to the swing trajectory lines. Accordingly, these lines can also be said to be data that displays multiple indicators (swing trajectories) at the same time in the form in which the indicators are associated with respectively corresponding rackets 410. As a result, the operator viewing these lines can understand the swing trajectories of the rackets 410. The operator can also easily compare the rackets 410 included in the target racket group from the viewpoint of the swing trajectory by viewing these lines.

Also, a configuration is possible in which the creation unit 421b compares the swing trajectories of the rackets 410 included in the target racket group with ideal data, and displays a ranking or the like of the rackets 410 included in the target racket group as the result of the comparison.

Graph of head velocity component ratio I

Figure 31:
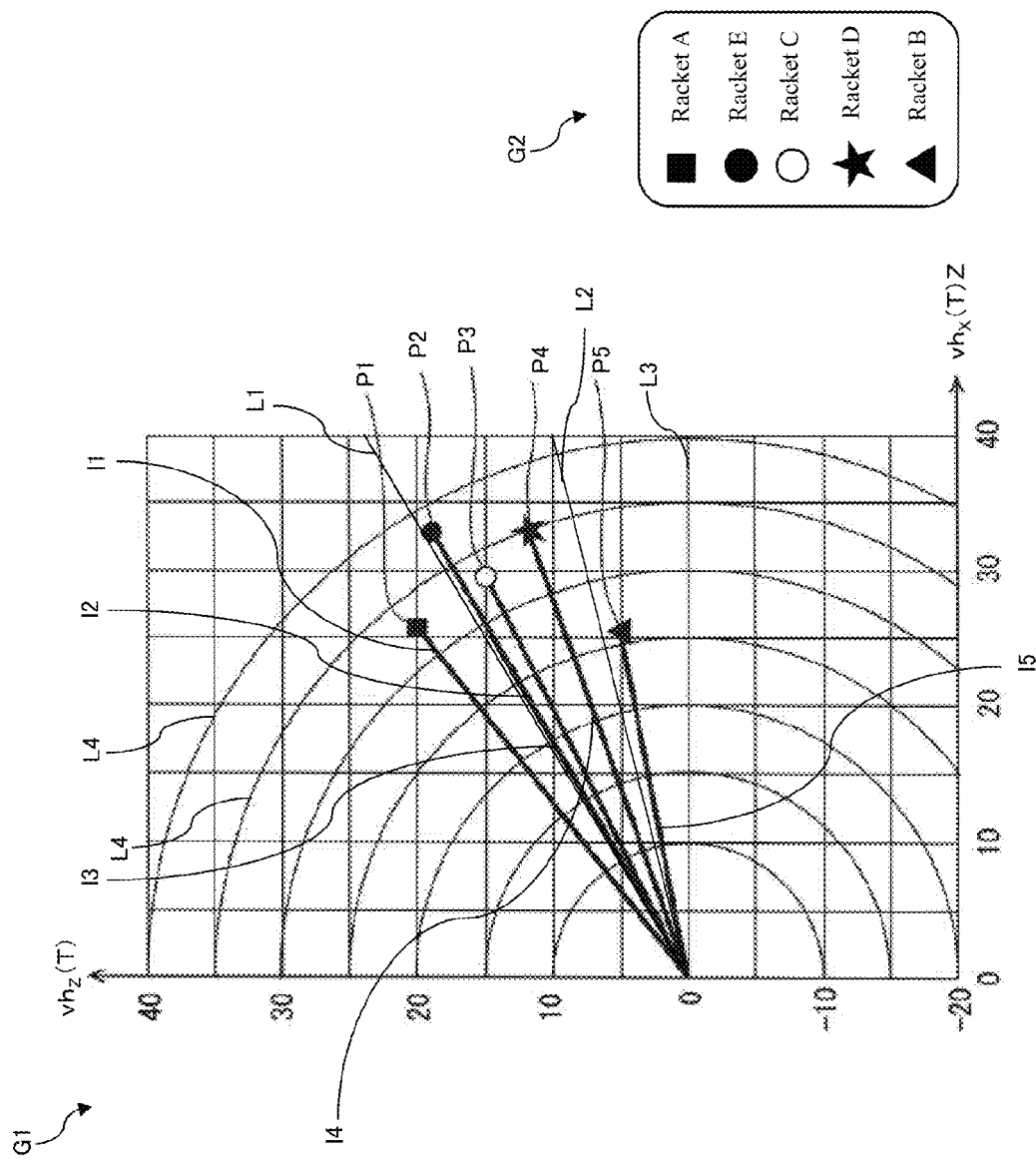
FIG. 31 is a diagram showing a head velocity component ratio graph.

As shown in FIG. 31, the creation unit 421b displays, in the analysis result screen, a graph G1 of the head velocity component ratio I.

Multiple (five in FIG. 31) bold lines 11 to 15 are displayed at the same time in the graph G1. Here, the horizontal axis in the graph G1 indicates the velocity $vh_X(T)$ of the head 414 in the X axis direction at the time instant T when the highest head velocity vh is obtained, and the vertical axis indicates the velocity $vh_Z(T)$ of the head 414 in the Z axis direction at the time instant T at which the highest head velocity vh is obtained. Accordingly, the slopes of the bold lines 11 to 15 in the graph G1 indicate the head velocity component ratios I.

Also, the bold lines 11 to 15 in the graph G1 are in one-to-one correspondence with the rackets in the target racket group. In other words, the bold lines 11 to 15 in the graph G1 respectively correspond to the above-described swing movement sorting units. Here, as shown in FIG. 31, points P1 to P5 that have different shapes are arranged at the tips of the bold lines 11 to 15 in the graph G1, and also a legend G2 that associates the points P1 to P5 with the names of the rackets 410 (product numbers or the like) is displayed at the same time next to the graph G1. Accordingly, the operator can easily find out which of the bold lines 11 to 15 correspond to which of the rackets 410. Accordingly, the graph G1 can also be said to be data that displays multiple indicators (head velocity component ratios I) at the same time in the form in which the indicators are associated with respectively corresponding rackets 410. As a result, the operator viewing the graph G1 can also easily compare the rackets 410 included in the target racket group from the viewpoint of the type of swing.

Also, three straight lines L1 to L3 are displayed in the graph G1. Here, these straight lines L1 to L3 are expressed by the following expressions.

Straight line $L1: vh_Z(T)=0.60*vh_X(T)$

Straight line $L2: vh_Z(T)=0.25*vh_X(T)$

Straight line $L3: vh_Z(T)=0.00$

Specifically, the area above the straight line L1 is the area in which the head velocity component ratio I is greater than or equal to 0.60 (topspin type), the area between the straight line L1 and the straight line L2 is the area in which the head velocity component ratio I is greater than or equal to 0.25 and less than 0.60 (drive type), the area between the straight line L2 and the straight line L3 is the area in which the head velocity component ratio I is greater than or equal to 0.00 and less than 0.25 (flat type), and the area below the straight line L3 is the area in which the head velocity component ratio I is less than 0.00 (slice type). In other words, the straight lines L1 to L3 are auxiliary lines for allowing the operator viewing the graph G1 to easily find out the type of swing made by the player 407 using the rackets 410. Also, it is preferable that the four areas divided by the straight lines L1 to L3 are displayed in different display formats with respect to color, pattern, or the like in order to facilitate understanding.

Also, in the graph G1, the distance from the origin to an arbitrary point $(vh_X(T), vh_Z(T))$ indicates the head velocity vh(T) when assuming that the head velocity $vh_Y(T)$ in the Y axis direction is zero (referred to hereinafter as the head velocity vh' (T)). Accordingly, as shown in FIG. 31, many arcs L4 centered about the origin (0,0) are displayed in the graph G1, and these arcs L4 are auxiliary lines for allowing the operator viewing the graph G1 to easily find out the magnitude of the head velocity vh' (T) for each racket 410.

Graph of Variation in Head Velocity Component Ratio i

As shown in FIGS. 32 to 35, the creation unit 421b displays graphs G3 showing variation in the head velocity component ratio i at the same time in the analysis result screen in order to evaluate the stability of the swing movement made by the user. The number of graphs G3 that are displayed is the same as the number of rackets 410 in the target racket group. Here, the properties of the vertical axis and the horizontal axis in the graphs G3 are similar to those in the graph G1. Also, auxiliary lines L1 to L4 similar to those in graph G1 are displayed in the graphs G3.

In the graphs G3, each head velocity component ratio i is indicated by a set of one bold line and one point similarly to the head velocity component ratio I in the graph G1. Here, as previously described, the number of head velocity component ratios i that are derived for a certain racket 410 is the same as the number of times the swing movement is made using that racket 410, that is to say, the sample number. Accordingly, the same number of bold lines and points as the sample number are displayed in each graph G3. Accordingly, the graph G3 is data showing multiple indicators (head velocity component ratios i), which are records of swing movements made using the same racket 410, at the same time. As a result, the operator viewing the graphs G3 can intuitively determine variation in swing movements made with the corresponding rackets 410.

Also, the creation unit 421b quantitatively calculates the value of variation and display it next to the graph G3 at the same time, for each racket 410. Accordingly, the operator can easily find out the degree of variation in a quantitative manner as well. Note that examples of quantitative variation values include a dispersion and a standard deviation. In other words, it can be said that the creation unit 421b compares the values of the head velocity component ratios i for each racket 410, and displays the results of the comparison.

Figure 32:
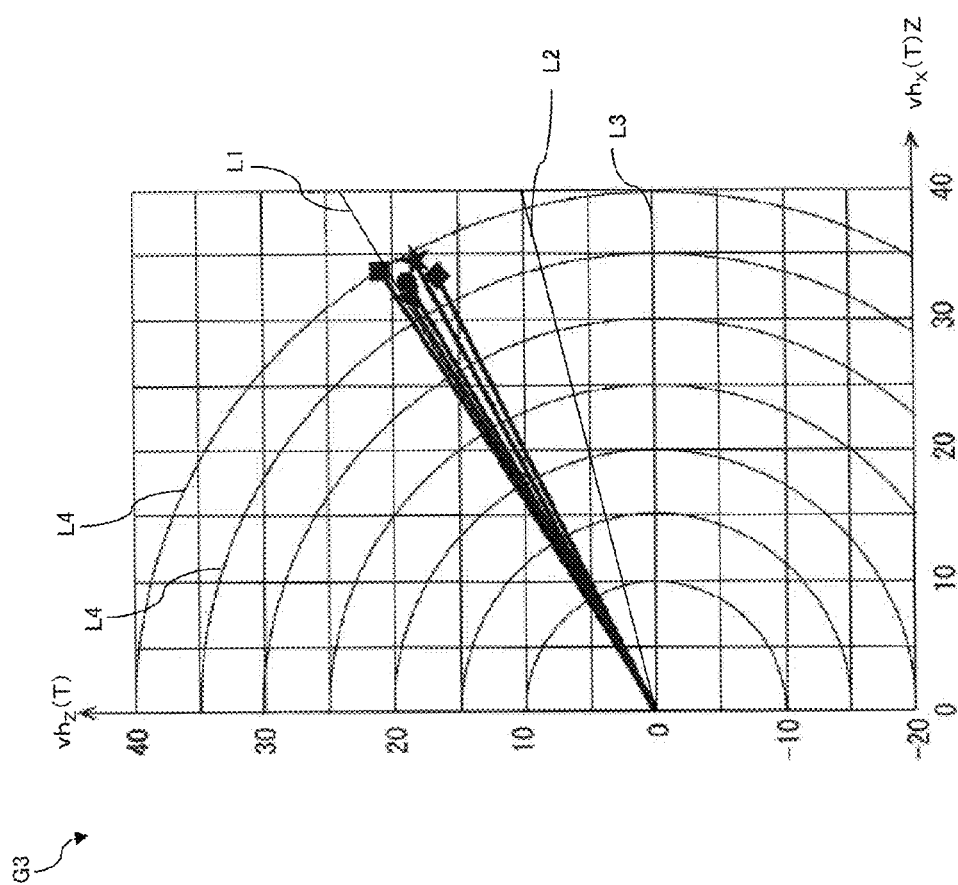
FIG. 32 is a diagram showing a graph that shows variation between head velocity component ratios.
Figure 33:
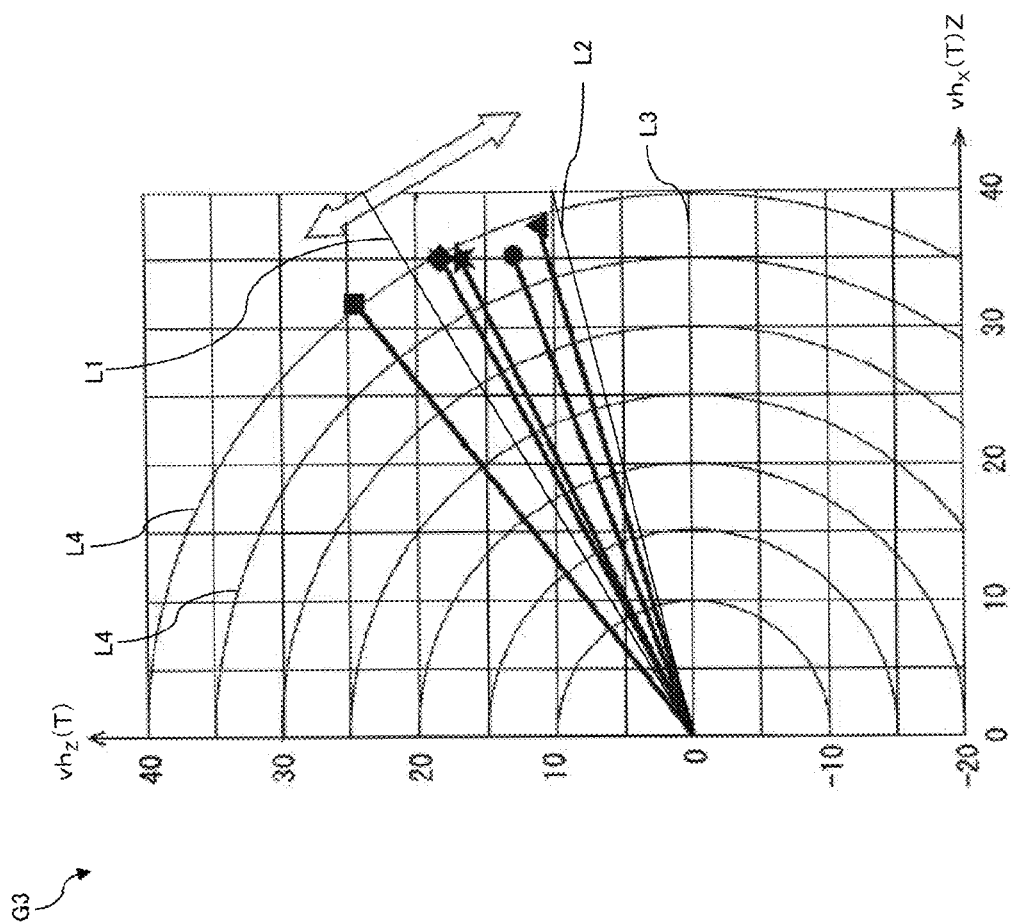
FIG. 33 is another diagram showing a graph that shows variation between head velocity component ratios.
Figure 34:
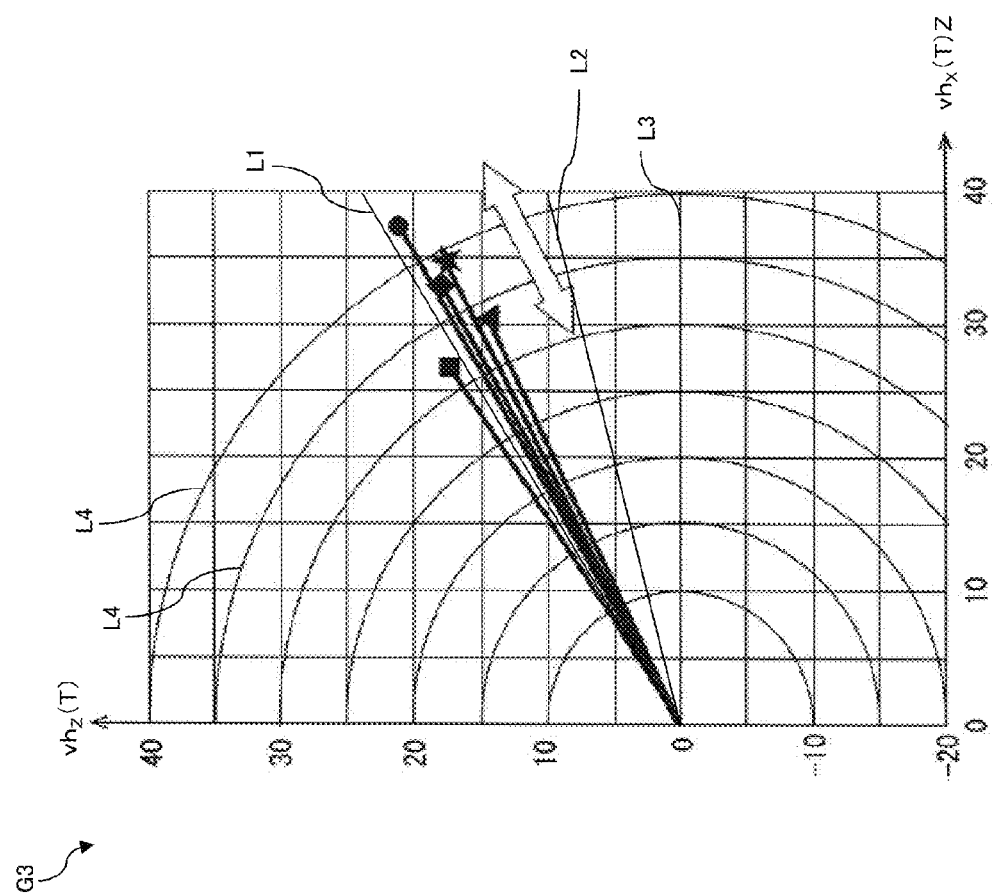
FIG. 34 is yet another diagram showing a graph that shows variation between head velocity component ratios.
Figure 35:
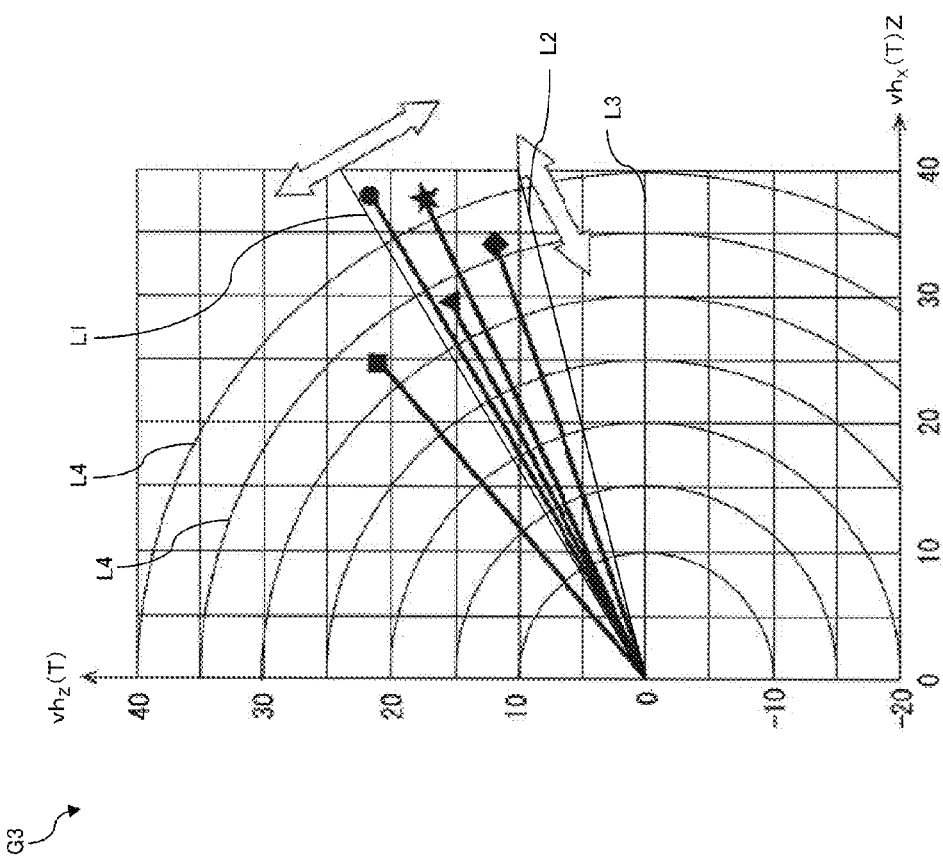
FIG. 35 is still another diagram showing a graph that shows variation between head velocity component ratios.

Here, in FIG. 32, the bold lines are grouped in the radius direction and the circumference direction centered about the origin. In FIG. 33, the bold lines are grouped in the radius direction centered about the origin, but are dispersed in the circumference direction. In FIG. 34, the bold lines are dispersed in the radius direction centered about the origin, but are grouped in the circumference direction. In FIG. 35, the bold lines are dispersed in the radius direction centered about the origin and the circumference direction.

Accordingly, the following can be determined from FIGS. 32 to 35.

(1) With the swing made with the racket 410 corresponding to FIG. 32, there is little variation in the head velocity vh' (T), and there is also little variation in the type of swing.

(2) With the swing made with the racket 410 corresponding to FIG. 33, there is little variation in the head velocity vh' (T), but there is a large amount of variation in the type of swing.

(3) With the swing made with the racket 410 corresponding to FIG. 34, there is a large amount of variation in the head velocity vh' (T), but there is little variation in the type of swing.

(4) With the swing made with the racket 410 corresponding to FIG. 35, there is a large amount of variation in the head velocity vh' (T), and there is also a large amount of variation in the type of swing.

Accordingly, the operator can easily compare multiple rackets 410 with each other from the viewpoint of variation by a visual comparison of the graphs G3 in FIGS. 32 to 35. In fitting, the racket 410 corresponding to FIG. 32 is recommended since there is little variation in the head velocity vh' (T) and also little variation in the type of swing.

3-4. Variations

Although an embodiment of the present invention has been described above, the present invention is not limited to this embodiment, and various modifications can be made without departing from the gist of the invention. For example, the following modifications can be made.

3-4-1

The analyzing system of the present invention is applicable to not only the case of tennis racket fitting as in the above embodiment, but also cases such as string tension fitting and tennis coaching. As an example of the former, it is sufficient that the sampling data relates to multiple tennis rackets having different string tensions, not different types of tennis rackets.

3-4-2

The configuration of the imaging system 403 is not limited to the configuration described above, and as long as necessary parameters can be obtained, there may be one camera, or three or more cameras in order to increase precision. The camera arrangement can also be appropriately selected as long as necessary parameters can be obtained.

3-4-3

The method for sampling the sampling data is not limited to the method described above, and for example, in addition to or instead of disposing the imaging system 403 on the tennis court 406, a configuration is possible in which a triaxial acceleration sensor and/or a triaxial gyroscope are attached to the tennis racket 410, and various indicators are calculated from values output by these sensors.

3-4-4

The method for sending sampling data from the imaging system 403 to the analyzing apparatus 402 is not limited to the aspect described above. For example, a configuration is possible in which sampling data is saved in a memory inserted to the imaging system 403 during measurement, and then the memory is connected to the analyzing apparatus 402 at an appropriate time after measurement, and the sampling data is loaded into the analyzing apparatus 402.

3-4-5

The output unit that outputs the comparison data is not limited to the form of a display, and may be a plotter and/or a printer, for example.

3-4-6

The types of indicators are not limited to those described above, and may be the position, the velocity, the acceleration, and the angular velocity of a tennis ball that is returned by a swing movement, as well as any combination of them, for example. Also, in the above embodiment, among the grip velocity, grip acceleration, head velocity, head acceleration, head velocity component ratio, and racket angular velocity per time instant, particularly the values at the time instant at which the head velocity is the highest are selected as indicators. However, the grip velocity, grip acceleration, head velocity, head acceleration, head velocity component ratio, racket angular velocity, and the like at another specific time instant, such as the time instants at which their values are the highest, may be selected. Alternatively, the entirety of the functions indicating the grip velocity, grip acceleration, head velocity, head acceleration, head velocity component ratio, and racket angular velocity per time instant may be output as the indicators.

3-4-7

Data regarding practice swings may be collected as the sampling data.

3-4-8

The sample number is an appropriately selected value, and may be 1, for example.

The invention claimed is:

1. A tennis swing movement analyzing apparatus comprising:
    a communication interface configured to acquire sampling data obtained by sampling a swing movement of a tennis racket by a user measured by at least one of a sensor unit and a camera; and
    a CPU,
        configured to, based on the sampling data, calculate an indicator, the indicator being a head velocity component ratio of the tennis racket of a first directional component of a head velocity to a second directional component of the head velocity, the first directional component being different from the second directional component, and
        configured to create a GUI screen on an output unit displaying at least one graph area that is each divided into a plurality of areas respectively indicating user's swing types and displaying the indicator in the graph area,
    wherein the graph area is an area defined by a first axis and a second axis, in which the first directional component of the head velocity of the tennis racket corresponds to the first axis, and the second directional component of the head velocity of the tennis racket, being orthogonal to the first directional component, corresponds to the second axis that is orthogonal to the first axis, and
    wherein the plurality of areas correspond to different head velocity component ratios of the tennis rackets and are defined to represent different swing types, respectively.

2. The analyzing apparatus according to claim 1, wherein the GUI screen displays an auxiliary line for indicating a boundary between the plurality of areas in the graph area.

3. The analyzing apparatus according to claim 2, wherein the auxiliary line is inclined to the axis of the graph area.

4. The analyzing apparatus according to claim 2, wherein the graph area does not have a time axis.

5. The analyzing apparatus according to claim 1, wherein the GUI screen displays the plurality of areas included in the graph area in different display formats.

6. The analyzing apparatus according to claim 1, wherein the indicator is the velocity of the tennis racket.

7. The analyzing apparatus according to claim 1, wherein the CPU is configured to calculate a plurality of types of the indicators including a first indicator and a second indicator, and the graph area is an area in which the first indicator corresponds to a first axis, and the second indicator corresponds to a second axis that is orthogonal to the first axis.

8. The analyzing apparatus according to claim 1, wherein the CPU is configured to calculate the indicator for each unit of the swing movement, and the GUI screen displays a plurality of the indicators in the graph area at the same time, the plurality of the indicators respectively corresponding to a plurality of units of the swing movement.

9. The analyzing apparatus according to claim 8, wherein the communication interface is configured to acquire the sampling data obtained by sampling the swing movement of different tennis rackets by the user, and the CPU is configured to calculate the indicator based on the sampling data for each unit of the swing movement belonging to the different tennis rackets.

10. A tennis swing movement analyzing system comprising: the analyzing apparatus according to claim 1; and a sampling apparatus configured to generate the sampling data by sampling the swing movement, and transmit the sampling data to the communication interface.

11. A tennis swing movement analyzing apparatus comprising:
    a communication interface configured to acquire sampling data obtained by sampling a swing movement of a tennis racket by a user measured by at least one of a sensor unit and a camera; and
    a CPU,
    configured to calculate an indicator for each unit of the swing movement based on the sampling data, the indicator being a head velocity component ratio of the tennis racket of a first directional component of a head velocity to a second directional component of the head velocity, the first directional component being different from the second directional component, and
    configured to create a GUI screen on an output unit displaying a graph area and a plurality of values of the same one indicator in the same one graph area at the same time, the values of the indicator in the graph area respectively corresponding to different swing movements,
    wherein the graph area is an area defined by a first axis and a second axis, in which the first directional component of the head velocity of the tennis racket corresponds to the first axis, and the second directional component of the head velocity of the tennis racket, being orthogonal to the first directional component, corresponds to the second axis that is orthogonal to the first axis, and wherein the plurality of areas correspond to different head velocity component ratios of the tennis rackets and are defined to represent different swing types, respectively.

12. A tennis swing movement analyzing system comprising: the analyzing apparatus according to claim 11; and a sampling apparatus configured to generate the sampling data by sampling the swing movement, and transmit the sampling data to the communication interface.

13. A non-transitory computer-readable recording medium storing an analyzing program for causing a computer to perform the steps of:
  acquiring sampling data obtained by sampling a swing movement of a tennis racket by a user;
  calculating, based on the sampling data, an indicator, the indicator being a head velocity component ratio of the tennis racket of a first directional component of a head velocity to a second directional component of the head velocity, the first directional component being different from the second directional component; and
  creating a GUI screen displaying at least one graph area that is each divided into a plurality of areas respectively indicating user's swing types and displaying the indicator in the graph area,
  wherein the graph area is an area defined by a first axis and a second axis, in which the first directional component of the head velocity of the tennis racket corresponds to the first axis, and the second directional component of the head velocity of the tennis racket, being orthogonal to the first directional component, corresponds to the second axis that is orthogonal to the first axis, and
  wherein the plurality of areas correspond to different head velocity component ratios of the tennis rackets and are defined to represent different swing types, respectively.

14. A non-transitory computer-readable recording medium storing an analyzing program for causing a computer to perform the steps of:
  acquiring sampling data obtained by sampling a swing movement of a tennis racket by a user;
  calculating an indicator for each unit of the swing movement based on the sampling data, the indicator being a head velocity component ratio of the tennis racket of a first directional component of a head velocity to a second directional component of the head velocity, the first directional component being different from the second directional component; and
  creating a GUI screen displaying a graph area and a plurality of values of the same one indicator in the same one graph area at the same time, the values of the indicator in the graph area respectively corresponding to different swing movements,
  wherein the graph area is an area defined by a first axis and a second axis, in which the first directional component of the head velocity of the tennis racket corresponds to the first axis, and the second directional component of the head velocity of the tennis racket, being orthogonal to the first directional component, corresponds to the second axis that is orthogonal to the first axis, and
  wherein the plurality of areas correspond to different head velocity component ratios of the tennis rackets and are defined to represent different swing types, respectively.

15. An analyzing method comprising the steps of:
  acquiring by using a computer, sampling data obtained by sampling a swing movement of a tennis racket by a user;
  calculating by using the computer, based on the sampling data, an indicator, the indicator being a head velocity component ratio of the tennis racket of a first directional component of a head velocity to a second directional component of the head velocity, the first directional component being different from the second directional component; and
  creating by using the computer, a GUI screen displaying at least one graph area that is each divided into a plurality of areas respectively indicating user's swing types and displaying the indicator in the graph area,
  wherein the graph area is an area defined by a first axis and a second axis, in which the first directional component of the head velocity of the tennis racket corresponds to the first axis, and the second directional component of the head velocity of the tennis racket, being orthogonal to the first directional component, corresponds to the second axis that is orthogonal to the first axis, and
  wherein the plurality of areas correspond to different head velocity component ratios of the tennis rackets and are defined to represent different swing types, respectively.

16. An analyzing method comprising the steps of:
  acquiring by using a computer, sampling data obtained by sampling a swing movement of a tennis racket by a user;
  calculating by using the computer, an indicator for each unit of the swing movement based on the sampling data, the indicator being a head velocity component ratio of the tennis racket of a first directional component of a head velocity to a second directional component of the head velocity, the first directional component being different from the second directional component; and
  creating by using the computer, a GUI screen displaying a graph area and a plurality of values of the same one indicator in the same one graph area at the same time, the values of the indicator in the graph area respectively corresponding to different swing movements,
  wherein the graph area is an area defined by a first axis and a second axis, in which the first directional component of the head velocity of the tennis racket corresponds to the first axis, and the second directional component of the head velocity of the tennis racket, being orthogonal to the first directional component, corresponds to the second axis that is orthogonal to the first axis, and
  wherein the plurality of areas correspond to different head velocity component ratios of the tennis rackets and are defined to represent different swing types, respectively.

* * * * *